(12) United States Patent
Tanaka et al.

(10) Patent No.: US 10,036,909 B2
(45) Date of Patent: Jul. 31, 2018

(54) DISPLAY DEVICE

(71) Applicant: Sharp Kabushiki Kaisha, Sakai, Osaka (JP)

(72) Inventors: Kohhei Tanaka, Sakai (JP); Tomohiro Kimura, Sakai (JP); Masahiro Mitani, Sakai (JP); Takayuki Nishiyama, Sakai (JP); Hisashi Watanabe, Sakai (JP); Youhei Nakanishi, Sakai (JP); Ryuzo Yuki, Sakai (JP); Masayuki Kanehiro, Sakai (JP); Seiichi Uchida, Sakai (JP); Toshihiro Yanagi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/550,816

(22) PCT Filed: Mar. 3, 2016

(86) PCT No.: PCT/JP2016/056594
§ 371 (c)(1),
(2) Date: Aug. 14, 2017

(87) PCT Pub. No.: WO2016/143659
PCT Pub. Date: Sep. 15, 2016

(65) Prior Publication Data
US 2018/0031898 A1 Feb. 1, 2018

(30) Foreign Application Priority Data
Mar. 10, 2015 (JP) .................................. 2015-047182

(51) Int. Cl.
*G02F 1/1333* (2006.01)
*G02F 1/1362* (2006.01)
(Continued)

(52) U.S. Cl.
CPC ....... *G02F 1/133308* (2013.01); *G02B 6/009* (2013.01); *G02B 6/0068* (2013.01);
(Continued)

(58) Field of Classification Search
CPC ......... G02F 1/133308; G02F 1/136286; G02F 1/1339; G02F 1/1341; G02F 2201/56;
(Continued)

(56) References Cited

U.S. PATENT DOCUMENTS

2003/0038770 A1   2/2003   Lee et al.
2009/0102758 A1*  4/2009   Anzai ................. G09G 3/3225
                                                         345/76
(Continued)

FOREIGN PATENT DOCUMENTS

JP   2003-075804 A   3/2003
JP   2009-116214 A   5/2009
(Continued)

OTHER PUBLICATIONS

Official Communication issued in International Patent Application No. PCT/JP2016/056594, dated May 24, 2016.

*Primary Examiner* — Nathanael R Briggs
(74) *Attorney, Agent, or Firm* — Keating & Bennett, LLP

(57) ABSTRACT

A liquid crystal display device (a display device) includes a liquid crystal panel (a display panel) having an outer peripheral edge portion having a substantially circular shape and including linear edge portions that are linear at a part of the outer peripheral edge portion, and flexible printed circuit boards (mounting components) mounted in an outer portion of the liquid crystal display panel to match arrangement of the linear edge portions in a circumferential direction.

12 Claims, 29 Drawing Sheets

(51) Int. Cl.
*F21V 8/00* (2006.01)
*G02F 1/1339* (2006.01)
*G02F 1/1341* (2006.01)
*G09G 3/36* (2006.01)

(52) U.S. Cl.
CPC ...... *G02F 1/136286* (2013.01); *G02F 1/1339* (2013.01); *G02F 1/1341* (2013.01); *G02F 2201/56* (2013.01); *G09G 3/3677* (2013.01); *G09G 2300/0408* (2013.01); *G09G 2300/0426* (2013.01); *G09G 2320/0233* (2013.01); *G09G 2380/02* (2013.01)

(58) Field of Classification Search
CPC .... G02B 6/0068; G02B 6/009; G09G 3/3677; G09G 2300/0408; G09G 2300/0426; G09G 2320/0233; G09G 2380/02
See application file for complete search history.

(56) References Cited

U.S. PATENT DOCUMENTS

| | | | |
|---|---|---|---|
| 2009/0195481 A1* | 8/2009 | Taguchi | G02B 5/201 345/55 |
| 2010/0134743 A1* | 6/2010 | Shin | G02F 1/13 349/143 |
| 2016/0019856 A1 | 1/2016 | Tanaka et al. | |

FOREIGN PATENT DOCUMENTS

| | | |
|---|---|---|
| JP | 2009-122636 A | 6/2009 |
| JP | 2009-180961 A | 8/2009 |
| JP | 2009-199971 A | 9/2009 |
| JP | 2010-020221 A | 1/2010 |
| JP | 5177875 B2 | 4/2013 |
| WO | 2014/142183 A1 | 9/2014 |

* cited by examiner

DISPLAY DEVICE

TECHNICAL FIELD

The present invention relates to a display device.

BACKGROUND ART

Liquid crystal display devices include a liquid crystal panel having a liquid crystal layer between substrates and the liquid crystal panel displays characters and images in a display area thereof. Patent Document 1 discloses a liquid crystal display device having a circular display area. The liquid crystal display device includes a substrate having a first area and a second area. The first area is surrounded by a curved exposed edge surface and a curved non-exposed edge surface. The curved exposed edge surface is a surface of a cut portion of the substrate that is formed when the substrate is cut out. The curved non-exposed edge surface is inside the substrate. The second area is surrounded by the non-exposed edge surface and three linear exposed edge surfaces.

RELATED ART DOCUMENT

Patent Document

Patent Document 1: Japanese Patent No. 5177875

Problem to be Solved by the Invention

In Patent Document 1, the liquid crystal panel has a reduced size thereof with a larger display area. However, as the resolution of display images is enhanced and the number of traces within the display area is increased, an area in the substrate where the terminals are formed is increased and a width of the flexible printed circuit board that is to be connected to the terminals is also increased. If the area where the terminals are formed is increased and the width of the flexible printed circuit board connected to the area is increased, the second area is also necessary to be increased, accordingly, and a largest outer diameter of the substrate is also increased. If the liquid crystal display device has an outer shape as a whole following an outer shape of the substrate, the shape of a casing of the liquid crystal display device will be complicated. Therefore, it is preferable to form the outer shape of the liquid crystal display device to be a simple circular shape. However, in such a configuration, a diameter of the liquid crystal display device is necessarily equal to the largest outer diameter of the substrate of the liquid crystal panel. Therefore, a frame width of the liquid crystal display device is necessarily increased and an exterior size of the liquid crystal display device is also necessarily increased.

DISCLOSURE OF THE PRESENT INVENTION

The technology disclosed herein was made in view of the above circumstances. An object is to reduce a frame width and suppress increase in size.

Means for Solving the Problem

A display device according to the present technology includes a display panel having an outer peripheral edge portion having a substantially circular or ellipsoidal shape and including linear edge portions at the outer peripheral edge portion, each of the linear edge portions being linear at a part of the outer peripheral edge portion, and mounting components mounted on an outer portion of the display panel to match arrangement of the linear edge portions in a circumferential direction.

According to such a configuration, the mounting components are mounted on the outer portion of the display panel so as to substantially match the positions of the linear edge portions in the circumferential direction, and the linear edge portions are obtained by forming linear portions on the outer peripheral edge portion of the display panel. With such a configuration, each of the mounting components can be reduced in size and a length of each of the linear edge portions can be reduced. Accordingly, a width of the outer portion of the display panel, that is, the frame width is reduced and the frame width of the display device is preferably reduced and the display device is less likely to be increased in size. In mounting of the mounting components, positions of the mounting components can be adjusted with respect to the display panel using the linear edge portions.

The present technology may preferably have following configurations.

(1) The display panel may be divided into a display area displaying images and a non-display area that is in the outer portion and surrounds the display area, and display elements that are arranged in a matrix and a scanning circuit portion that scans the display elements sequentially and selectively drives the display elements are at least arranged in the display area. According to such a configuration, the non-display area is reduced and the frame width is preferably reduced compared to a configuration in that the scanning circuit portion is arranged in the non-display area that is in the outer portion of the display panel.

(2) Data lines connected to the display elements may be arranged in the display area of the display panel, data connection lines connecting the mounting components and one end portions of the data lines and scanning connection lines connecting the mounting components and the scanning circuit portion may be at least arranged in the non-display area of the display panel, and the mounting components may be arranged closer to the one end portions of the data lines than another end portions of the data lines, and the scanning connection lines may connect the other end portions of the data lines and the scanning circuit portion. According to such a configuration, the data connection lines and the scanning connection lines are arranged dispersedly in the non-display area. Therefore, the non-display area is further reduced in size and the frame width is preferably reduced. The mounting components are arranged closer to the one end portions of the data lines that are to be connected to the data connection lines. Therefore, the extending length of the data connection liens is reduced and distortion is less likely to be caused in the signals transmitted through the data lines. The signals transmitted through the scanning connection lines may be amplified by the scanning circuit portion although the extending length of the scanning connection lines is relatively greater than the extending length of the data connection lines. Therefore, the distortion of the signals is less likely to be caused.

(3) The display panel may be divided into a display area displaying images and a non-display area that is in the outer portion and surrounds the display area, and display elements that are arranged in a matrix may be at least arranged in the display area, and a scanning circuit portion that scans the display elements sequentially and selectively drives the display elements may be at least arranged in the non-display area. According to such a configuration, an area that effectively contributes to display in the display area is increased compared to a configuration in that a scanning circuit portion is arranged in the display area. Therefore, luminance of display images is improved and display quality is improved.

(4) The display panel may be divided into a display area displaying images and a non-display area that is in the outer portion and surrounds the display area, display elements that are arranged in a matrix and data lines connected to the display elements may be at least arranged in the display area, the display panel may be divided into a first half area and a second half area by a center line that is parallel to the data lines, and the mounting components may include at least a first mounting component that is arranged in the first half area and is connected to the data lines arranged in the first half area and a second mounting component that is arranged in the second half area and is connected to the data lines arranged in the second half area. According to such a configuration, the display elements and the data lines arranged in the first half area are assigned to the first mounting component mounted in the first half area and the display elements and the data lines arranged in the second half area are assigned to the second mounting component mounted in the second half area. Therefore, the signals for display can be effectively supplied to each of the display elements in the display area.

(5) Data connection lines connecting the mounting components and one end portions of the data lines may be at least arranged in the non-display area of the display panel, the first mounting component may be arranged such that a center of the first mounting component with respect to an extending direction of the linear edge portions substantially corresponds to a center of the first half area with respect to a direction perpendicular to the data lines in the first half area, and the second mounting component may be arranged such that a center of the second mounting component with respect to an extending direction of the linear edge portions substantially corresponds to a center of the second half area with respect to a direction perpendicular to the data lines in the second half area. According to such a configuration, the data connection lines that are extended from each of the mounting components to the one end portions of the data lines arranged in each of the half areas are arranged evenly on both sides with respect to the center of each mounting component. Accordingly, the non-display area is further reduced and the frame width is preferably reduced.

(6) One of the linear edge portions may be included to correspond to the first mounting component in the circumferential direction and another one of the linear edge portions may be included to correspond to the second mounting component in the circumferential direction, and the linear edge portions may be arranged such that a central angle formed between lines connecting a center of each of the linear edge portions with respect to an extending direction thereof and a center of the display panel is approximately 90 degrees. According to such a configuration, the extending directions of the linear edge portions, which are provided in the non-display area of the display panel so as to substantially correspond to the positions of the first mounting component and the second mounting component in the circumferential direction, are perpendicular to each other. Therefore, in mounting the first mounting component and the second mounting component, a position of the display panel can be determined with respect to two directions that are perpendicular to each other with using the linear edge portions that are provided to substantially match positions of the first mounting component and the second mounting component in the circumferential direction. Accordingly, the first mounting component and the second mounting component can be mounted in correct positions with high accuracy.

(7) Data connection lines connecting the mounting components and the data lines may be at least arranged in the non-display area of the display panel, the first mounting component and the second mounting component may be arranged such that a central angle formed between lines connecting a center of each of the linear edge portions with respect to an extending direction thereof and a center of the display panel is approximately 180 degrees, and the data connection lines may include the data connection lines that are connected to one end portions of the data lines and the data connection lines that are connected to another end portions of the data lines that are arranged adjacent to the data lines whose one end portions are connected to the data connection lines. According to such a configuration, the data connection lines are arranged dispersedly in the non-display area. Therefore, even if the number of data connection lines is increased according to higher resolution, the non-display area is not increased and the resolution can be enhanced with smaller frame width.

(8) The first mounting component may include at least two first mounting components that are mounted in the non-display area of the display panel and the second mounting component may include at least two second mounting components that are mounted in the non-display area, and the first mounting components and the second mounting components may be arranged dispersedly on both sides with respect to a second center line that is perpendicular to the center line and may be connected to the one end portions and the other end portions of the data lines. According to such a configuration, at least four mounting components can be provided and the resolution can be preferably enhanced. At least two first mounting components and at least two second mounting components are arranged in two areas that are opposite each other with respect to the second center line that is perpendicular to the center line and connected to the one end portions and the other end portion of the data lines. Therefore, even with the at least four mounting components, the non-display area is maintained small and the frame width can be preferably reduced.

(9) The first mounting component may include at least two first mounting components that are mounted in the non-display area of the display panel and the second mounting component may include at least two second mounting components that are mounted in the non-display area, the first mounting components and the second mounting components may be arranged collectively on one side with respect to a second center line that is perpendicular to the center line and are connected to the one end portions of the data lines. According to such a configuration, at least four mounting components are provided and the resolution is preferably enhanced. Further, at least two first mounting components and at least two second mounting components are arranged collectively in one side area with respect to the second center line that is perpendicular to the center line and are connected to one end portions of the data lines. Therefore, processing of signals supplied to the data lines is simplified.

(10) The display panel may be divided into a display area displaying images and a non-display area that is in the outer portion and surrounds the display area, display elements that are arranged in a matrix and data lines that are connected to the display elements may be at least arranged in the display area, data connection lines connecting the mounting components and the data lines may be at least arranged in the non-display area, the mounting components may be arranged dispersedly on one side and another side of the display panel with respect to a center line that is perpendicular to the data lines, and the data lines whose one end portions are connected to the mounting component arranged on the one side with respect to the center line and the data lines whose other end portions are connected to the mounting component on the other side with respect to the center line maybe alternately arranged. According to such a configuration, the one end portions and the other end portions of the data lines are alternately connected to each of the mounting components that are arranged in the one side area and the other side area with respect to the center line that is perpendicular to the data lines. Therefore, distribution density of the data connection lines in a direction along the center line is decreased and the resolution can be preferably increased.

(11) A number of the linear edge portions included at the outer peripheral edge portion of the display panel may be greater than a number of the mounting components that are mounted on the display panel, and the linear edge portions may include one linear edge portion where the mounting component is not arranged, and the one linear edge portion where the mounting component is not arranged may be provided such that a central angle formed between a line connecting a center of the one linear edge portion where the mounting component is not arranged and a center of the display panel and a line connecting a center of the linear edge portion where the mounting component is arranged and the center of the display panel may be approximately 90 degrees. According to such a configuration, in mounting the mounting components, a position of the display panel is adjusted with respect to two directions that are perpendicular to each other with using the linear edge portions. Accordingly, the mounting components can be mounted with high positioning accuracy.

(12) The display panel may include a first substrate, a second substrate bonded to the first substrate, a liquid crystal layer sandwiched between the first substrate and the second substrate, a sealing member extending along the circumferential direction to seal a periphery of the liquid crystal layer and having an inlet hole through which liquid crystal material of the liquid crystal layer is injected, and an inlet hole cover covering the inlet hole. A number of the linear edge portions included at the outer peripheral edge portion of the display panel may be greater than a number of the mounting components that are mounted on the display panel, and the linear edge portions may include one linear edge portion where the mounting component is not arranged and the one linear edge portion where the mounting component is not arranged may be disposed such that a position thereof in the circumferential direction matches the inlet hole. According to such a configuration, even if the inlet hole cover covering the inlet hole of the sealing member is disposed to project outwardly from the outer peripheral edge portion, the outline of the display panel having the substantially perfect circle is less likely to be increased in size.

(13) A number of the linear edge portions included at the outer peripheral edge portion of the display panel may be greater than a number of the mounting components that are mounted on the display panel, and the linear edge portions may include one linear edge portion where the mounting component is not arranged and a functional component may be arranged adjacent to and outside the one linear edge portion, with a plan view, where the mounting component is not arranged. According to such a configuration, the functional component is less likely to project outside the outline of the display panel having substantially a circular or ellipsoidal shape and the display device is less likely to be increased in size.

(14) The display device may further include a lighting device providing the display panel with light, the lighting device including at least light sources arranged at intervals along the circumferential direction, and a light guide plate guiding light from the light sources. The light sources may be arranged such that a central angle formed between lines connecting each of the light sources that are adjacent to each other in the circumferential direction and a center of the display panel may be equal to or greater than a central angle formed between lines connecting each of two side edges of the mounting component with respect to an extending direction of the linear edge portion and the center of the display panel. According to such a configuration, the mounting component is arranged between the light sources that are adjacent to each other in the circumferential direction with a plan view. The light sources are arranged at equal intervals in the circumferential direction and therefore, light emitted by the light sources entering the light guide plate is even in the circumferential direction and uneven luminance is less likely to be caused in the exit light from the lighting device.

Advantageous Effect of the Invention

According to the technology disclosed in this specification, the frame width is reduced with restricting increase in size.

MODES FOR CARRYING OUT THE INVENTION

First Embodiment

Figure 7:
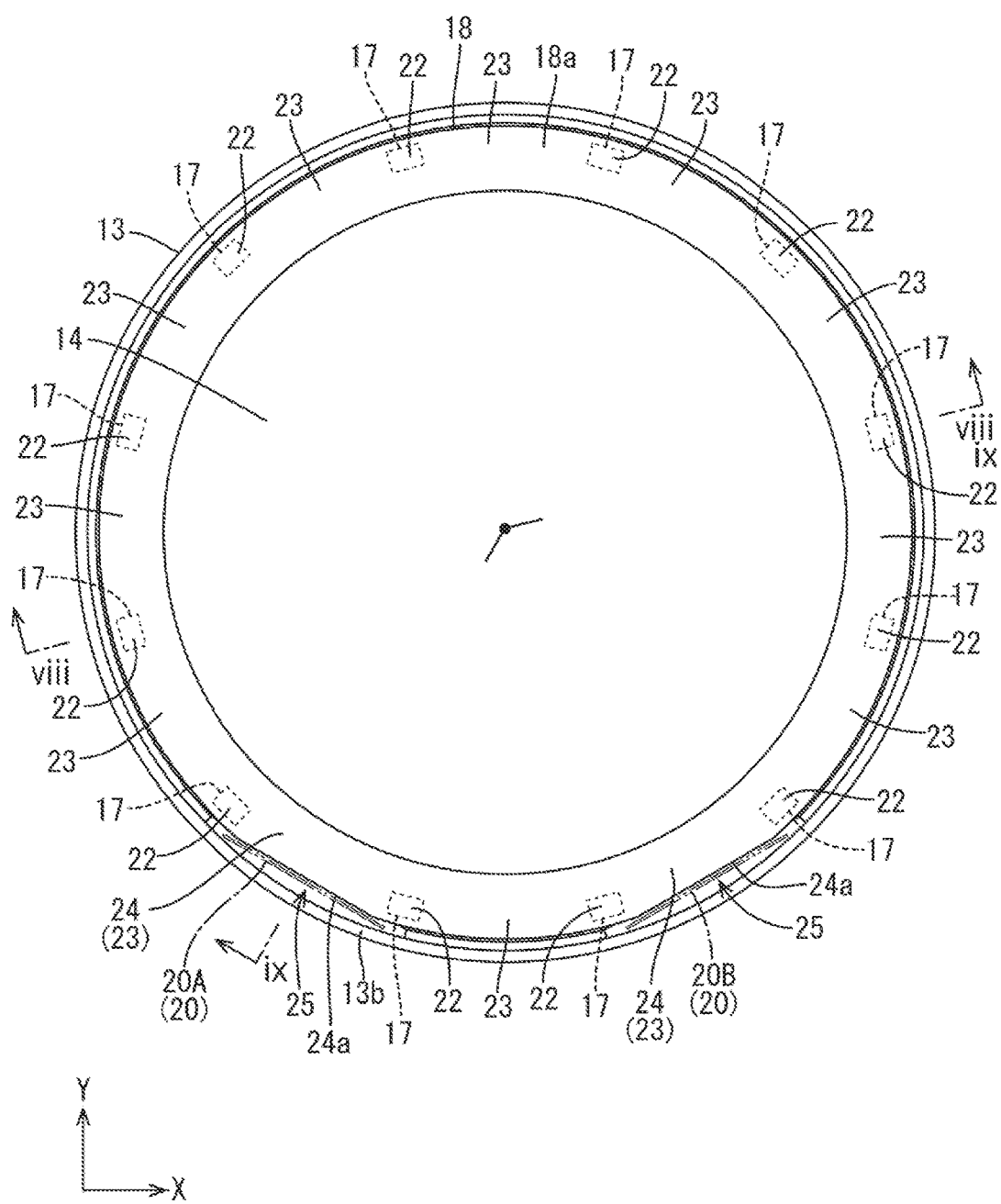
FIG. 7 is a plan view of a backlight device included in a liquid crystal display device.
Figure 8:
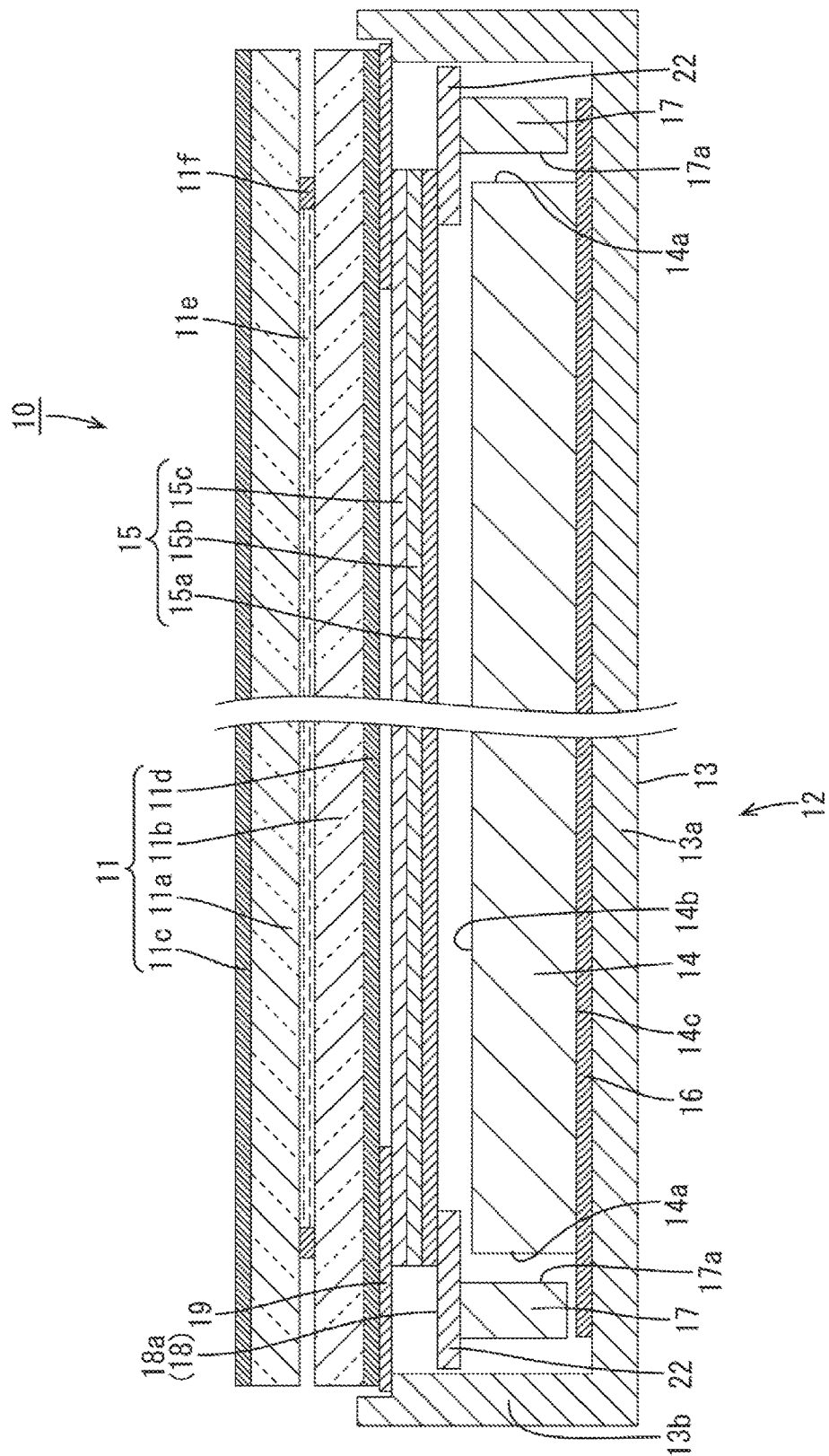
FIG. 8 is a cross-sectional view taken along line viii-viii in FIGS. 6 and 7.
Figure 9:
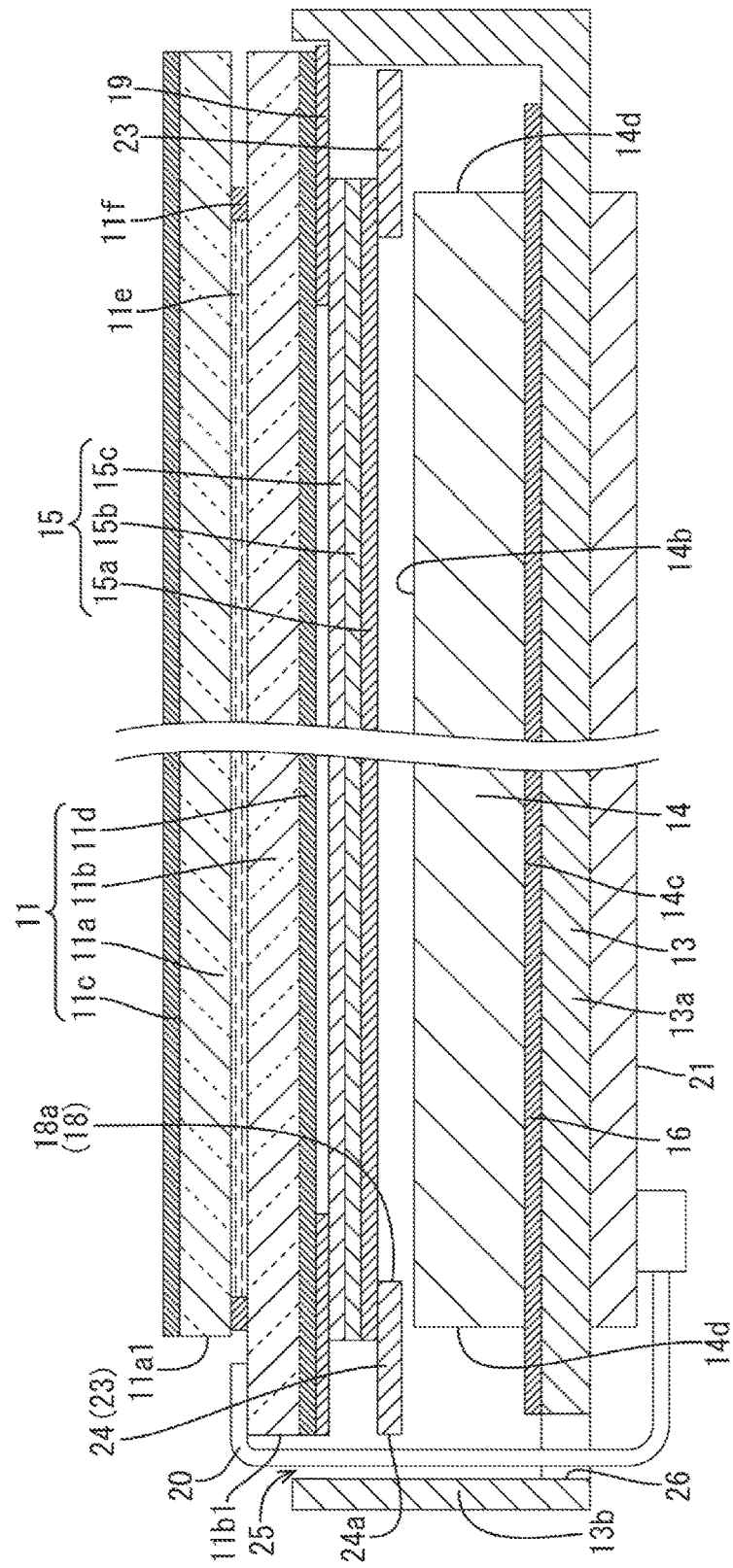
FIG. 9 is a cross-sectional view taken along line ix-ix in FIGS. 6 and 7.

A first embodiment will be described with reference to FIGS. 1 to 11. In the present embodiment, a liquid crystal display device (a display device) 10 including a liquid crystal panel 11 as a display panel will be described. X-axis, Y-axis and Z-axis may be indicated in the drawings. The axes in each drawing correspond to the respective axes in other drawings. A vertical direction in FIGS. 8 and 9 is a reference vertical direction and an upper side and a lower side in FIGS. 8 and 9 are a front side and a rear side, respectively.

Figure 1:
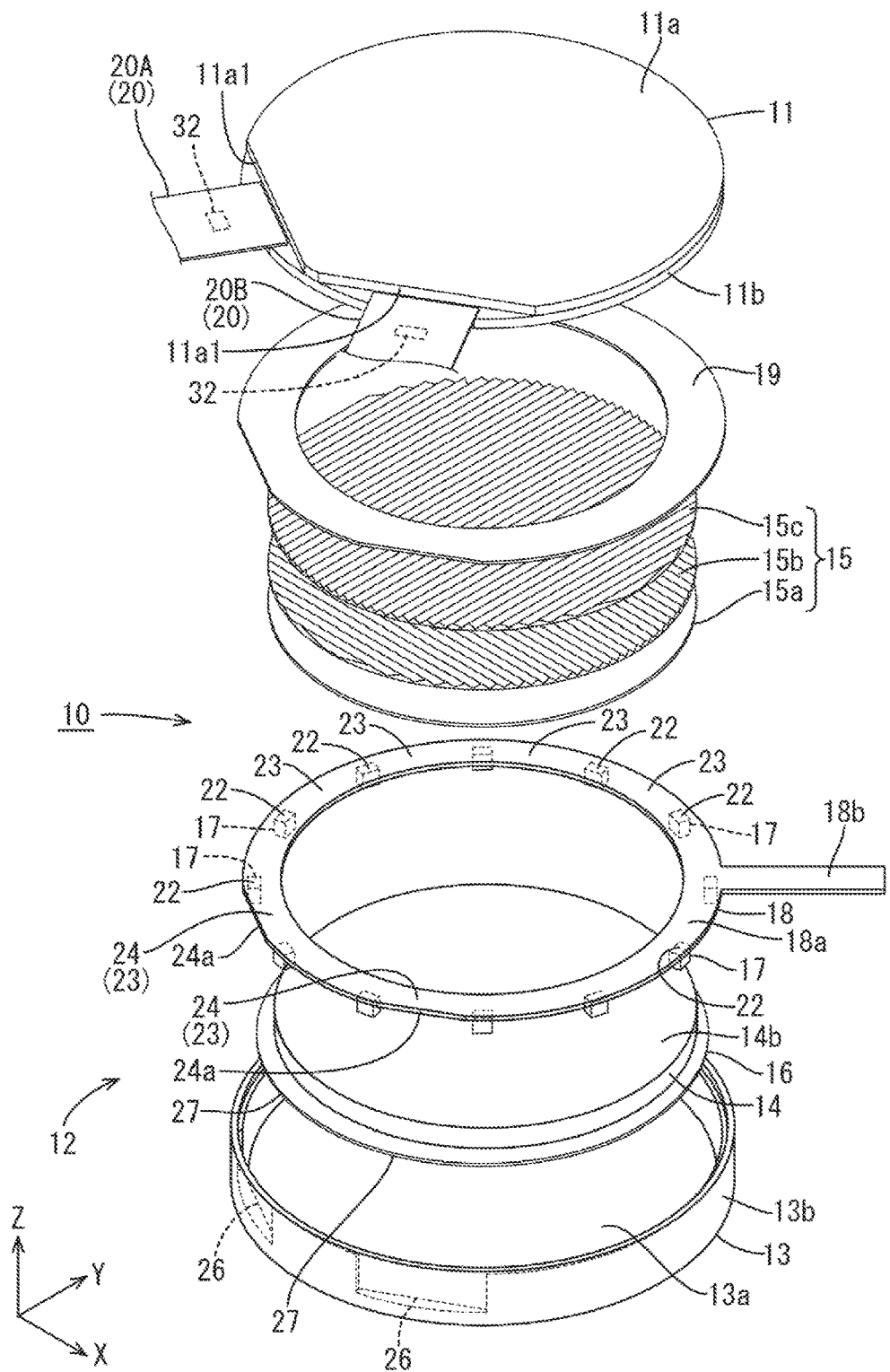
FIG. 1 is an exploded perspective view illustrating a liquid crystal display device according to a first embodiment.

As illustrated in FIG. 1, the liquid crystal display device 10 has a substantially circular shape as a whole. The liquid crystal display device 10 at least includes a liquid crystal panel (a display panel) 11 for displaying images thereon, and a backlight device (a lighting device) 12 arranged on a rear side with respect to the liquid crystal panel 11 and providing light toward the liquid crystal panel 11. The liquid crystal display device 10 may include a bezel (not illustrated) and the bezel and the backlight device 12 may hold an outer peripheral edge portion of the liquid crystal panel 11 therebetween. The liquid crystal display device 10 according to the present embodiment is preferably used in electronic devices (not illustrated) such as mobile phones (including smart phones), laptop computers (including tablet-type laptop computers), mobile information terminals (including an electronic book and PDA), a digital photo frame, and portable video game players. However, the liquid crystal display device 10 may be used in other devices. The display size of the liquid crystal panel 11 included in the liquid crystal display device 10 is from several inches to a dozen inches. Namely, the liquid crystal panel 11 is generally classified as a small sized or a medium sized panel. However, the display size is not limited thereto.

Figure 2:
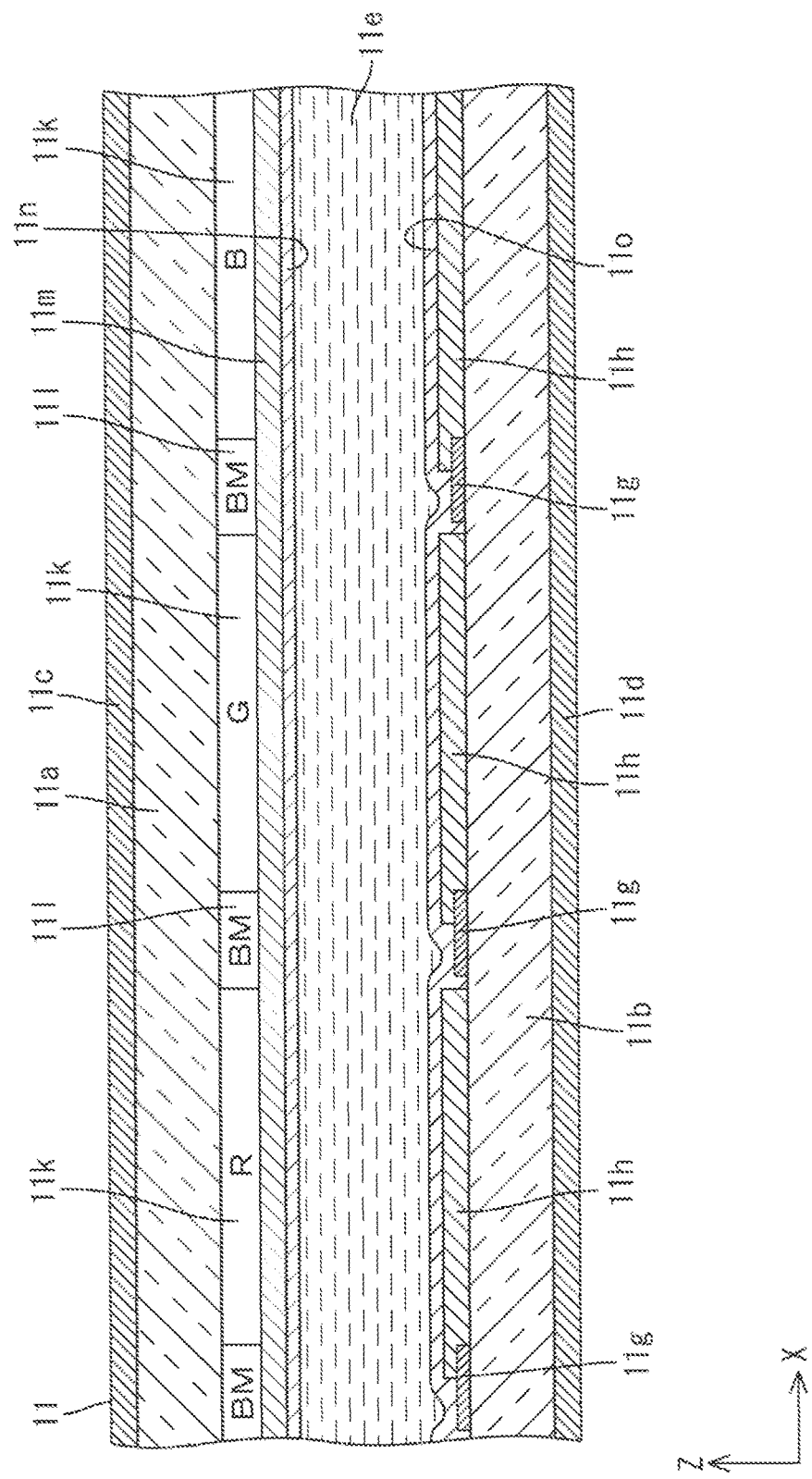
FIG. 2 is a cross-sectional view of a liquid crystal panel included in a liquid crystal display device.

The liquid crystal panel 11 will be described. As illustrated in FIG. 1, the liquid crystal panel 11 has a substantially circular plan view shape as a whole. As illustrated in FIG. 2, the liquid crystal panel 11 mainly includes a pair of glass substrates 11a, 11b that are substantially transparent and have highly transmissivity, a liquid crystal layer 11e between the substrates 11a and 11b and including liquid crystal molecules (liquid crystal material) that change optical properties thereof according to application of electric field, and a sealing member 11f extending along periphery of the liquid crystal layer 11e and the substrates 11a, 11b are bonded together with the sealing member 11f with keeping a gap of a thickness of the liquid crystal layer 11fe therebetween. In the liquid crystal panel 11, the liquid crystal layer 11e is held between the substrates 11a, 11b with a drop injection method. The liquid crystal panel 11 includes a display area (an active area) AA that is substantially circular and in a middle portion of a display screen and a non-display area (a non-active area) NAA that is substantially annular and outside the display area. The non-display area NAA is substantially annular and on an outer peripheral side of the display screen and surrounds the display area AA. Images appear on the display area and no images appear on the non-display area. The liquid crystal panel 11 displays images in the display area AA with using light provided by the backlight device 12 and the front side of the liquid crystal panel is a light exit side. Polarizing plates 11c, 11d are bonded to outer surfaces of the substrates 11a, 11b, respectively.

Figure 3:
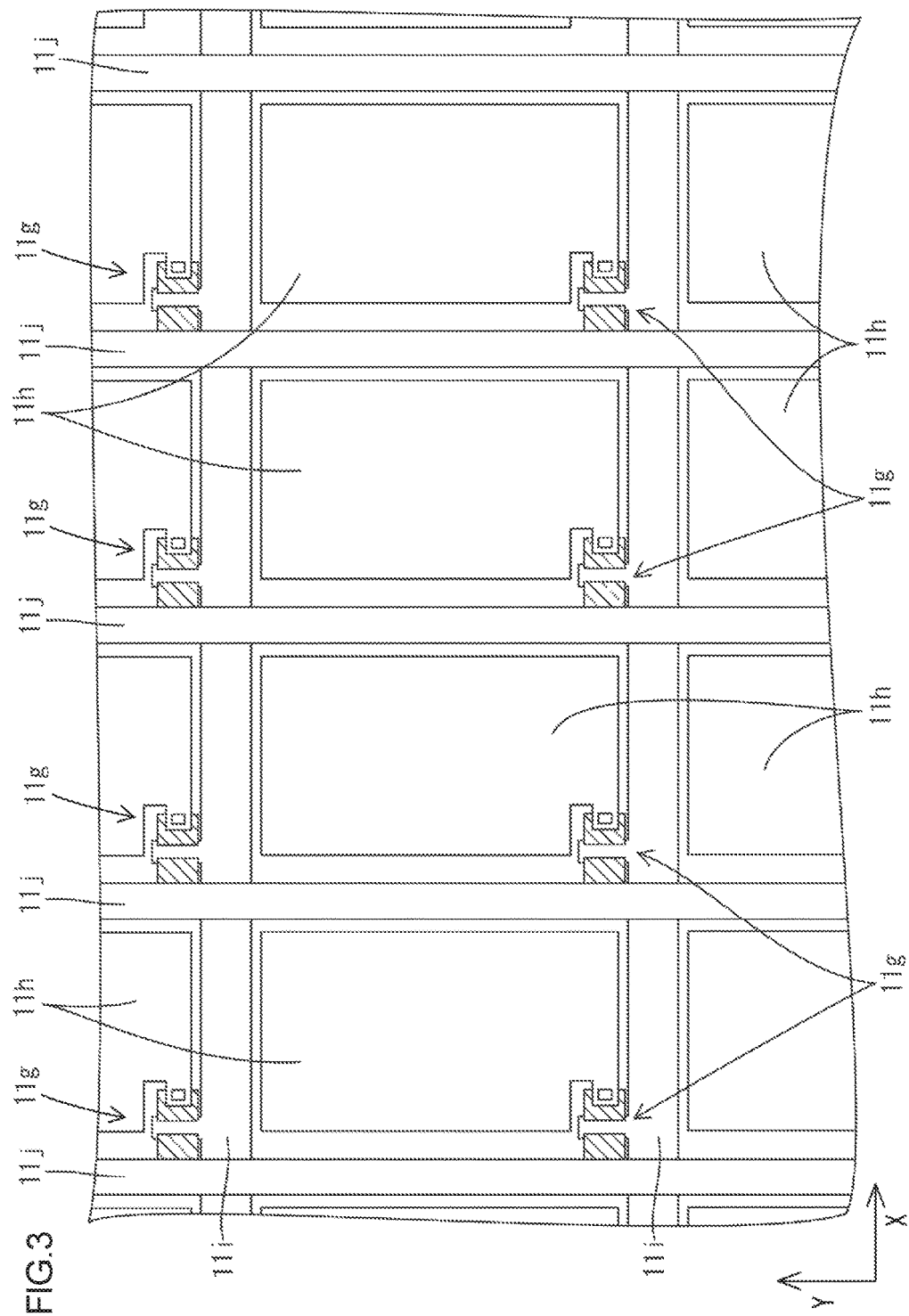
FIG. 3 is an enlarged plan view illustrating a plan configuration of an array substrate of a liquid crystal panel in the display area.

One of the substrates 11a, 11b on the front (a front-surface side) is a CF substrate 11a and the other one of the substrates 11a, 11b on the rear (a rear-surface side) is an array substrate 11b. As illustrated in FIGS. 2 and 3, the array substrate 11b includes thin film transistors (TFTs, display component) 11g that are switching components and pixel electrodes 11h that are arranged in a matrix (rows and columns) on an inner surface (a surface facing the liquid crystal layer 11c, an opposing surface opposite the CF substrate 11a) of the array substrate 11b in the display area AA. Gate lines (scanning lines) 11i and source lines (data lines) 11j are arranged in a matrix around the TFTs 11g and the pixel electrodes 11h on the array substrate 11b. The gate lines 11i and the source lines 11j are connected to the gate electrodes and the source electrodes of the TFTs 11g, respectively, and the pixel electrodes 11h are connected to drain electrodes of the TFTs 11g, respectively. The TFTs 11g are driven in response to the signals supplied to the gate lines 11i and the source lines 11j and supply of potential to the pixel electrodes 11h is controlled based on the driving. The TFT 11g includes a channel portion connecting the drain electrode and the source electrode and the channel portion is made of a semiconductor film. An oxide semiconductor material is used as the semiconductor film. The oxide semiconductor material included in the channel portion has electron mobility higher than that of amorphous silicon material, for example, 20 times to 50 times of the electron mobility of amorphous silicon material. Therefore, the TFTs 11g can be easily reduced in size and an amount of light transmitting through the pixel electrodes 11h (aperture ratio) is increased to the maximum, and the resolution is preferably enhanced and power consumption is preferably reduced. Each of the pixel electrodes 11h is arranged in a square area surrounded by the gate lines 11i and the source lines 11j and made of transparent electrodes including transparent and conductive materials such as indium tin oxide (ITO) or zinc oxide (ZnO). In the present embodiment, the gate lines 11i extend in the X-axis direction and the source lines 11j extend in the Y-axis direction in each drawing.

Figure 4:
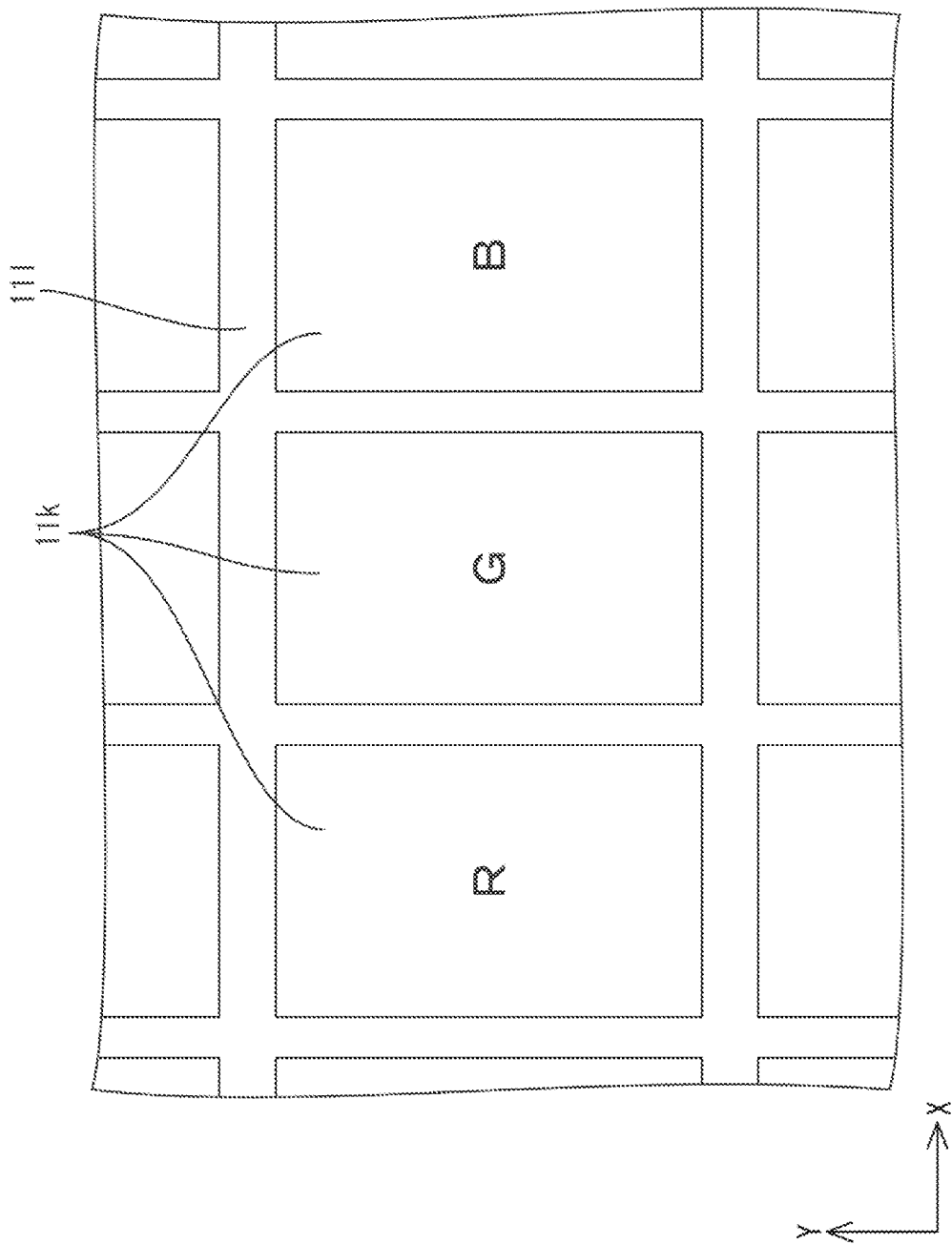
FIG. 4 is an enlarged plan view illustrating a plan configuration of a CF substrate of the liquid crystal panel in the display area.

As illustrated in FIGS. 2 and 4, color filters 11k are formed on an inner surface side of the CF substrate 11a in the display area AA. The color filters 11k include red (R), green (G), and blue (B) color filters 11k that are arranged in a matrix to be opposite the respective pixel electrodes 11h on the array substrate 11b. A light blocking layer 11l having a grid shape (a black matrix) is formed between the color filters 11k for reducing color mixture. The light blocking layer 11l is arranged to overlap the gate lines 11i and the source lines 11j in a plan view. A counter electrode 11m is formed in a solid pattern on surfaces of the color filters 11k and the light blocking layer 11l. The counter electrode 11m is opposed to the pixel electrodes 11h on the array substrate 11b. Alignment films 11n, 11o are provided on an inner surface side of the substrates 11a, 11b, respectively, to align the liquid crystal molecules in the liquid crystal layer lie. In the liquid crystal panel 11, the three color filters 11k of red (R), green (G), blue (B) and three pixel electrodes 11h opposed to the respective color filters form a display pixel that is a display unit. Each display pixel includes a red pixel including the R color filter 11k, a green pixel including the G color filter 11k, and a blue pixel including the B color filter ilk. The color pixels are repeatedly arranged along a row direction (the X-axis direction) on a plate surface of the liquid crystal panel 11 to form lines of pixels. The lines of pixels are arranged along the column direction (the Y-axis direction).

Figure 6:
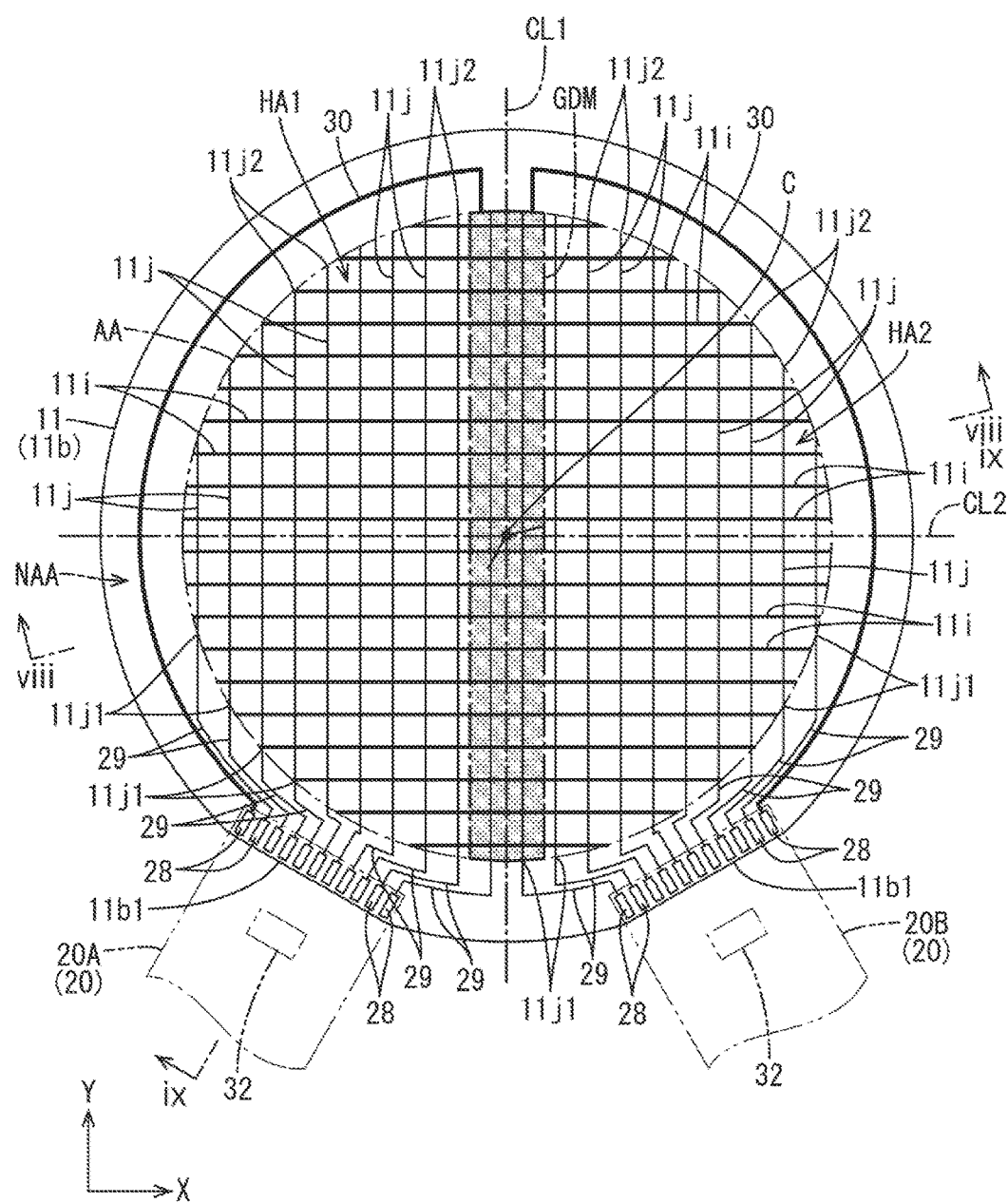
FIG. 6 is a plan view of the array substrate included in the liquid crystal panel.
Figure 11:
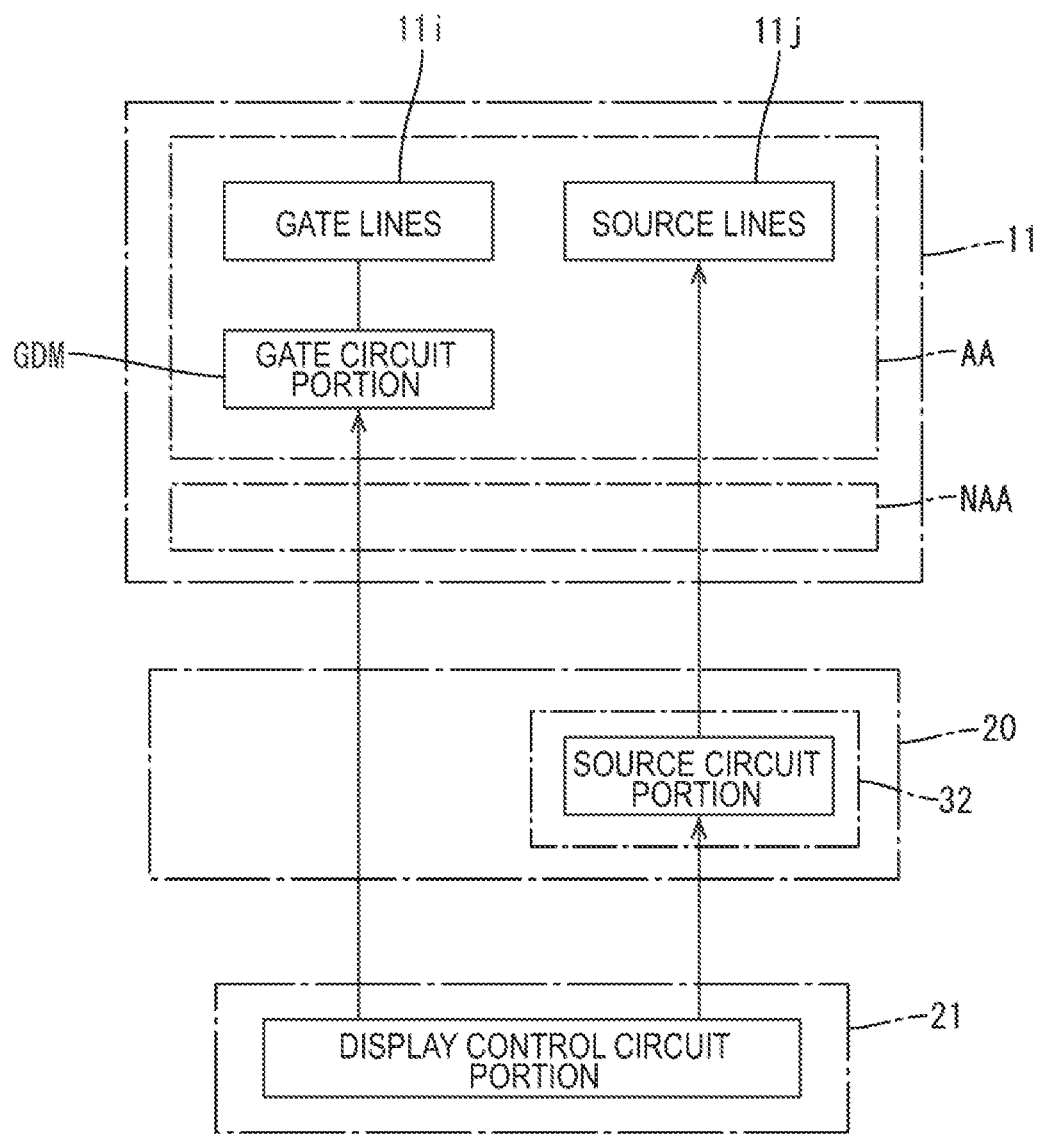
FIG. 11 is a block diagram relating display control of the liquid crystal display device.

As illustrated in FIGS. 6 and 11, the array substrate 11b includes a gate circuit portion (a scanning circuit portion) GDM in the display area AA. The gate circuit portion GDM supplies gate signals (scanning signals) to each of the gate lines 11i and scans each of the TFTs 11g sequentially and selectively drives the TFTs 11g. Specifically, the gate circuit portion GDM supplies gate signals sequentially from the most upper gate line 11i to the lowest gate line 11i with respect to the Y-axis direction in FIG. 6 in the display area AA. Accordingly, the gate lines 11i that are arranged in the Y-axis direction (the column direction) are scanned sequentially and a row of the TFTs 11g that are connected via the gate line 11i is collectively selected sequentially and driven. The scanning direction in which the TFTs 11g are scanned by the gate circuit portion GDM matches the Y-axis direction (the extending direction of the source line 11j). The gate circuit portion GDM is made of a semiconductor film (oxide semiconductor material) same as that of the TFTs 11g and is formed on the array substrate 11b in a monolithic way. Thus, the gate circuit portion GDM includes a control circuit for controlling supply of output signals (the gate signals) to the TFTs 11g. The control circuit includes a circuit that outputs gate signals at predetermined intervals and a buffer circuit that amplifies the gate signals. The control circuit includes a circuit element that may be a circuit TFT (a circuit switching element, not illustrated) including a semiconductor film as a channel portion. The control circuit includes circuit traces (not illustrated) that are made of a metal film same as that of the gate lines 11i and the source lines 11j. The gate circuit portion GDM includes control circuits (such as the circuit TFTs and the circuit traces) that are dispersedly arranged in each of the pixels in a belt-like area in a middle of the display area AA with respect to the X-axis direction. An area where the gate circuit portion GDM is formed is represented by a vertically-long belt-like area with shading and surrounded by a chain line in FIG. 6. Specifically, the control circuits included in the gate circuit portion GDM are dispersedly arranged in each color of the pixels defied by the gate lines 11i and the source lined 11j in the above-described belt-like area in the display area AA. Thus, the gate circuit portion GDM is arranged in the display area AA and therefore, the frame width of the non-display area NAA is reduced and the frame width of the liquid crystal panel 11 and the liquid crystal display device 10 can be reduced compared to a configuration including a gate circuit portion in the non-display area NAA. Since the gate circuit portion GDM is arranged in the display area AA, the external shape of the liquid crystal panel 11 can be designed in various shapes.

Figure 5:
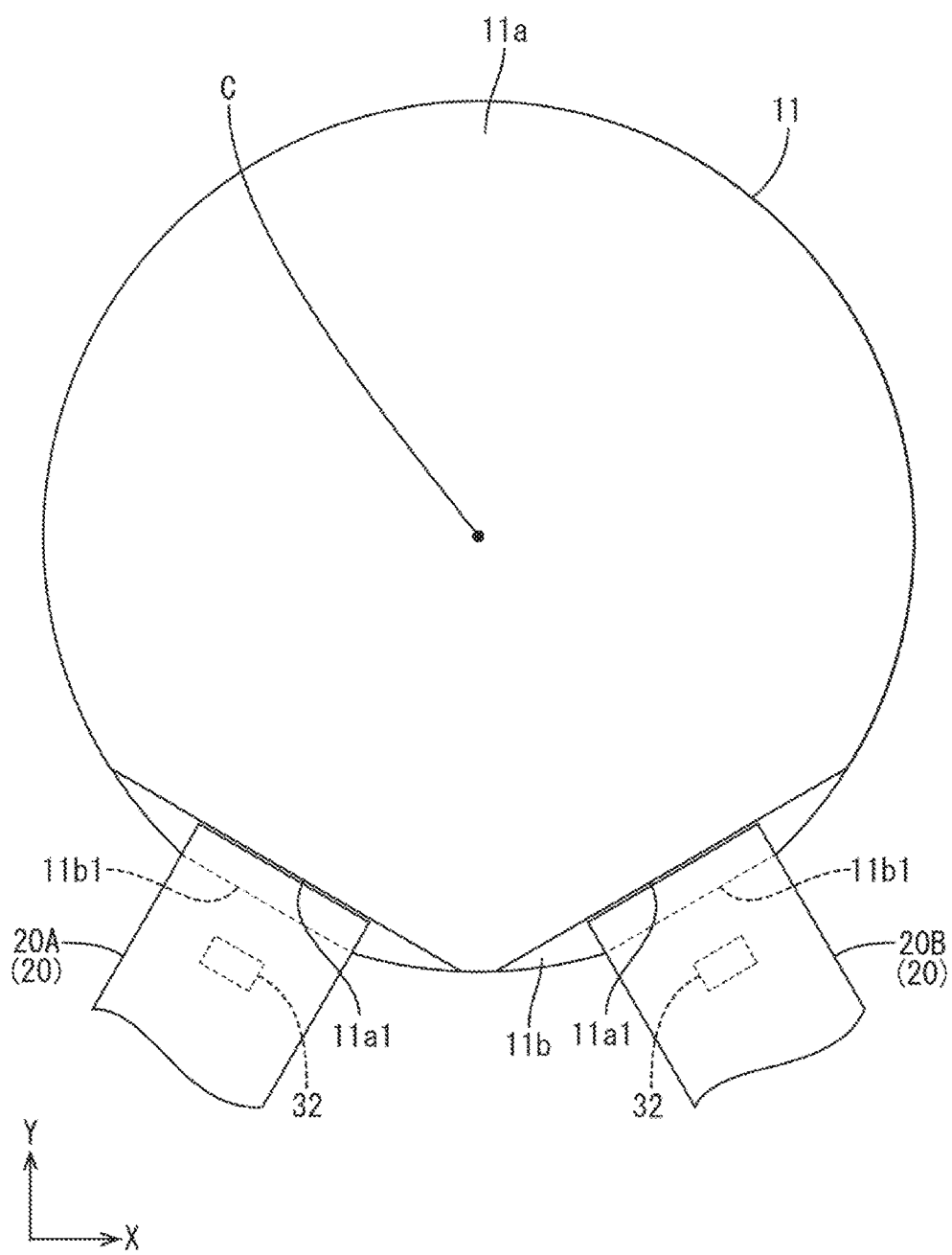
FIG. 5 is a plan view of the liquid crystal panel and a flexible printed circuit board.

As illustrated in FIGS. 1 and 5, the CF substrate 11a and the array substrate 11b included in the liquid crystal panel 11 have an outer peripheral edge portion having a substantially circular shape as a whole. The CF substrate 11a and the array substrate 11b include linear edge portions 11a1, 11b1 by cutting off parts of the outer peripheral edge portion linearly. A cut-off width in the CF substrate 11a is greater than that in the array substrate 11b. The linear edge portions of the CF substrate 11a are recessed further from those of the array substrate 11b. Therefore, the linear edge portions 11b1 of the array substrate 11b project outward from the linear edge portions 11a1 of the CF substrate in a radial direction. The cut-off portions of the CF substrate 11a and the array substrate 11b have an arched shape. As illustrated in FIGS. 5 and 6, in the non-display area NAA that is in the outer portion of the array substrate 11b, the flexible printed circuit boards (mounting components) 20 and panel-side terminals (terminals) 28 are mounted in positions that substantially match the positions of the linear edge portions 11b1 with respect to the circumferential direction. Signals relating display are supplied via the flexible printed circuit boards 20 and the panel-side terminals 28 are connected to flexible printed circuit board-side terminals (mounting component-side terminals, not illustrated) on the flexible printed circuit board 20. Mounting areas of the respective flexible printed circuit boards 20 in the non-display area NAA of the array substrate 11b and forming areas of the panel-side terminals 28 are included in a belt-like area having a certain width that is defined by the linear edge portions 11a1 of the CF substrate 11a and the linear edge portions 11b1 of the array substrate 11b with a plan view. The panel-side terminals 28 are arranged in an extending direction in which the linear edge portions 11a1, 11b1 extend and include unit terminals that are arranged at intervals. Source connection lines 29 that connect the panel-side terminals 28 and the source lines 11j and gate connection lines 30 that connect the pane-side terminals 28 and the gate circuit portion GDM are arranged in the non-display area NAA of the array substrate 11b. Configurations of the source connection lines 29 and the gate connection lines 30 will be described later. In FIG. 6, each line and each terminal such as the gate lines 11i, the source lines 11j, the panel-side terminals 29, the source connection lines 29, and the gate connection lines 30 is illustrated simply and the specific number and the specific arrangement of the lines and the terminals may be altered if necessary. Other than the source connection lines 29 and the gate connection lines 30, the lines for supplying common potential to the counter electrodes 11m are connected to the panel-side terminals 28 and are arranged in the non-display area NAA of the array substrate 11b.

As illustrated in FIGS. 5 and 9, one end portion of the flexible printed circuit board 20 is connected to a portion of the array substrate 11b in the non-display area NAA at a position that substantially match the position of the linear edge portion 11b1 with respect to the circumferential direction. Another end portion of the flexible printed circuit board 20 is connected to a control board (a display control board, a signal supply source) 21 disposed on the rear side of the backlight device 12. Thus, the flexible printed circuit board 20 is folded in a substantially U-shape as a whole. Each of the flexible printed circuit boards 20 is mounted on the array substrate 11b as described before such that a width direction thereof matches the extending direction (the X-axis direction) of the linear edge portions 11b1 and a length direction thereof is perpendicular to the extending direction of the linear edge portions 11b1. Each of the flexible printed circuit boards 20 at least includes a film base member 31 made of synthetic resin having insulating properties and flexibility (for example, polyimide resin), a driver (panel driving member 32) mounted on the film base member 31, multiple trace patterns (not illustrated) formed on the film base member 31, and a pair of flexible printed circuit board-side terminals arranged on ends of the film base member 31 with respect to the length direction thereof. As illustrated in FIG. 11, the driver 32 includes a source circuit portion (a data circuit portion) that generates source signals (data signals, image signals) based on signals output from the display control circuit portion included in the control board 21 and outputs the generated source signals. The source signals output from the source circuit portion of the driver 32 are transmitted to the source lines 11j in the display area AA through the panel-side terminals 28 and the source connection lines 29 on the array substrate 11b. The flexible printed circuit board 20 transmits the signals output from the display control circuit portion included in the control board 21 to the gate circuit portion GMD of the array substrate 11b through the panel-side terminals 28 and the gate connection lines 30 on the array substrate 11b. The flexible printed circuit board-side terminals include multiple source unit terminals and multiple gate unit terminals. The source unit terminals are connected to the panel-side terminals 28 that are connected to the source connection lines 29 and the gate unit terminals are connected to the panel-side terminals 28 that are connected to the gate connection lines 30. The unit terminals are arranged along the width of the flexible printed circuit board 20 at one end portion 20a thereof. According to such a configuration, the TFTs 11g within the display area AA of the liquid crystal panel 11 are driven based on the signals output from the display control circuit portion included in the control board 21 that is the signal supply source and display of images is controlled.

As described before, the panel-side terminals 28 are arranged along the linear edge portions 11a1, 11b1 of the liquid crystal panel 11. Therefore, the linear edge portions 11a1, 11b1 are used as a reference position for mounting the flexible printed circuit board 20 on the array substrate 11b. Specifically, for example, arrangement of the flexible printed circuit board-side terminals of the flexible printed circuit board 20 that is to be mounted may have a deviation in an parallel arrangement from the linear edge portions 11a1, 11b1, and as long as the deviation is a certain degree or less, the flexible printed circuit board-side terminals are appropriately positioned with respect to the panel-side terminals 28. In mounting the flexible printed circuit board 20, the liquid crystal panel 11 is fixed with the positioning pins (not illustrated) being in contact with the linear edge portion 11b1 of the array substrate 11b and the flexible printed circuit board 20 is set and mounted with keeping the deviation in the parallel arrangement between the array substrate 11b-side edge portion of the flexible printed circuit board 20 and the linear edge portions 11a1, 11b1 to be a certain value or less. Accordingly, the flexible printed circuit board-side terminals and the panel-side terminals 28 are connected to each other with being appropriately positioned.

Next, a configuration of the backlight device 12 will be described. The backlight device 12 has a block shape having a substantially circular plan view shape as a whole similar to that of the liquid crystal panel 11. As illustrated in FIGS. 1 and 7, the backlight device 12 at least includes a chassis (a casing) 13, light emitting diodes (LEDs) 17 that are light sources, an LED board (a light source board) 18 on which the LEDs 17 are mounted, a light guide plate 14, optical sheets 15, and a reflection sheet 16. The chassis 13 has a substantially box shape to be open toward the liquid crystal panel 11 side. The light guide plate 14 is disposed on the chassis 13 on the front side thereof and guides light from the LEDs 17. The optical sheets 15 are layered on the light guide plate 14 on the front side (the light exit side) and change optical property of the light exiting the light guide plate 14 toward the liquid crystal panel 11. The reflection sheet 16 is layered on the chassis 13 and sandwiched between the chassis 13 and the light guide plate 14 and reflects light toward the light guide plate 14. In the backlight device 12, the optical properties of the light emitted by the LEDs 17 are changed by the light guide plate 14, the optical sheets 15 and the reflection sheet 16 and the light is converted into planar light. The light exits through an opening portion of the chassis 13 toward the liquid crystal panel 11 on the front side. Namely, the front side with respect to the backlight device 12 is the light exit side. Hereinafter, components of the backlight device 12 will be described. The Z-axis direction in each of the drawings matches a normal line of a plate surface of each of the light guide plate 14, the optical sheets 15, and the reflection sheet and matches an overlapping direction in which the chassis 13, the light guide plate 14, the optical sheets 15, and the reflection sheet 16 are overlapped with each other.

The chassis 13 is made of synthetic resin or metal material and as illustrated in FIGS. 7 and 8, the chassis 13 has a substantially circular plan view shape and has a substantially box shape (a bottomed cylindrical shape) that is open toward the front side. The LED board 18, the light guide plate 14, the optical sheets 15, and the reflection sheet 16 are arranged within the chassis 13. The chassis 13 has a substantially circular plan view shape as a whole (seen in the Z-axis direction). The chassis 13 includes a substantially circle bottom portion 13a, and a side wall portion 13b that extends from an outer peripheral edge portion of the bottom portion 13a toward the front side. The bottom portion 13a has a plate surface that is parallel to each plate surface of the light guide plate 14, the optical sheets 15, the reflection sheet 16, and the liquid crystal panel 11 and supports the light guide plate 14, the optical sheets 15, and the reflection sheet 16 from the rear side. The side wall portion 13b is arranged to surround the light guide plate 14, the optical sheets 15, the reflection sheet 16, and the LED board 18 (LED 17) from the outer peripheral side and the side wall portion 13b has a substantially annular shape as a whole (substantially circular frame shape). A panel fixing tape 19 for fixing the liquid crystal panel 11 to the backlight device 12 is fixed on a distal end portion of the side wall portion 13b. A rear surface of an outer peripheral edge portion of the panel fixing tape 19 is adhered to the distal end portion of the side wall portion 13b. The panel fixing tape 19 is a double-sided adhesive tape including a base member having adhesive surfaces on both surfaces thereof. The panel fixing tape 19 extends from the side wall portion 13b and the optical sheets 15 (specifically a second lens sheet 15c, which will be described later) and is bonded on the wall side portion 13, the optical sheets 15, and the liquid crystal panel 11.

As illustrated in FIGS. 7 and 8, each LED 17 includes an LED chip (an LED component) that is a semiconductor light emitting component. The LED chip is arranged on a base board that is fixed on a plate surface of the LED board 18 and sealed with resin. The LED chip mounted on the base board has a single main light emission wavelength, and specifically the LED chip that emits light in a single color of blue is used. The resin that seals the LED chip contains phosphors dispersed therein. The phosphors emit light in a predetermined color (for example, green, red, yellow) when excited by blue light emitted from the LED chip. The LED 17 emits white light as a whole. The LED 17 is a side-surface-emitting type LED. The LED 17 has a mounting surface that is mounted on the LED board 18 and a side surface that is adjacent to the mounting surface and the side surface is a light emission surface 17a. The LED 17 has a height dimension that is smaller than a thickness of the light guide plate 14, which will be described later, and the height dimension of the LED 17 is approximately 0.4 mm. The LED 17 emits light having an optical axis that is parallel to a normal line to the light emission surface 17a. The optical axis is referred to as a traveling direction of rays of light having greatest light emission intensity among the rays of light emitted by the LED 17 and having a certain light distribution.

Figure 10:
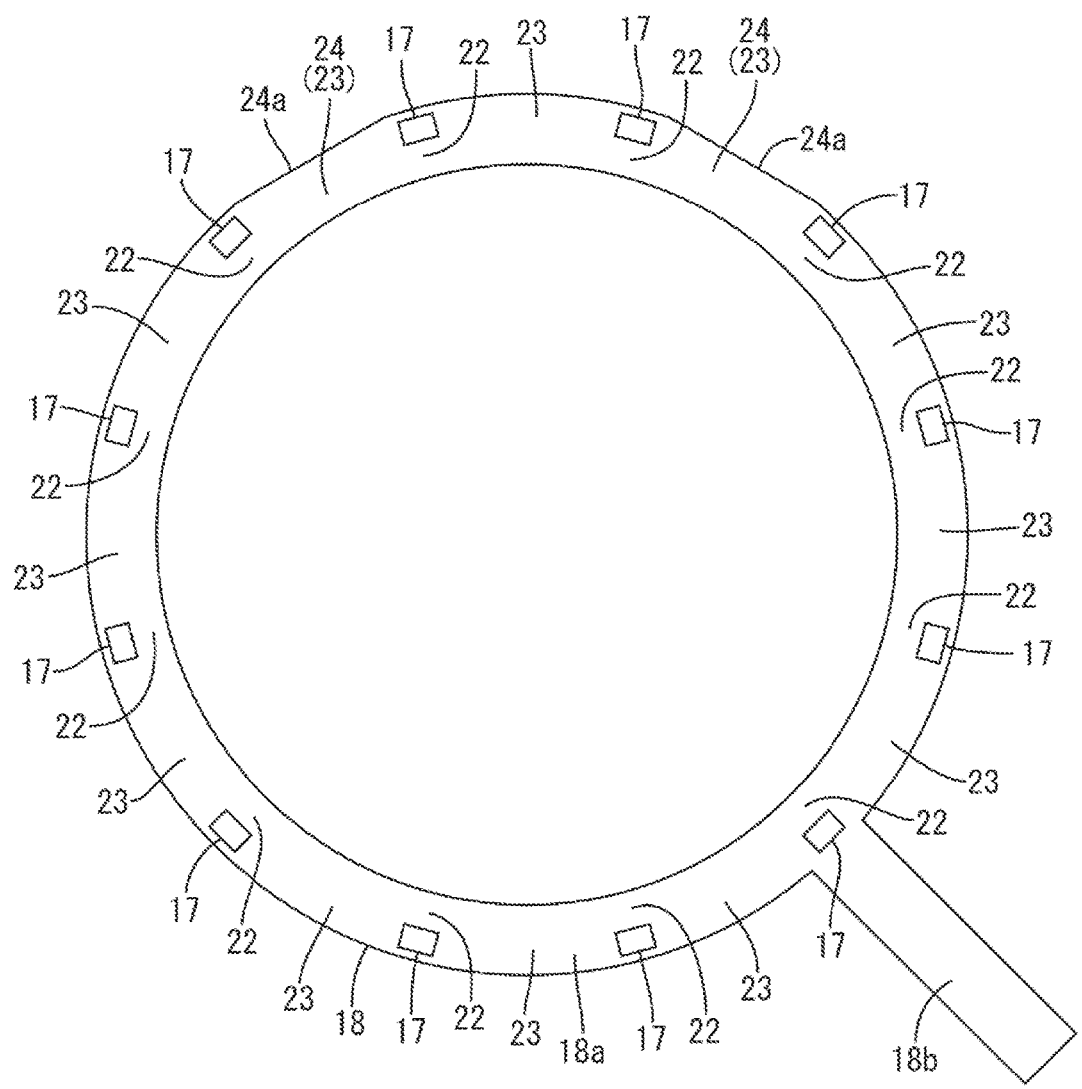
FIG. 10 is a bottom view of an LED board.

As illustrated in FIGS. 8 and 10, the LED board 18 is a base board film (sheet) made of insulating material (for example, polyimide resin) and having flexibility. The LED board 18 has a plate surface that is parallel to the plate surface of the bottom portion 13a and has a substantially circular outer shape. The LED board 18 includes a board body portion 18a and an extended portion 18b. The board body portion 18a extends along periphery of the light guide plate 14, the optical sheets 15, and the reflection sheet 16 and formed in an endless loop. The extended portion 18b extends outward from a part of the board body portion 18a in a radial direction. The board body portion 18a formed in the endless loop has an inner diameter dimension that is smaller than an outer diameter dimension of the light guide plate 14 and the reflection sheet 16, and has an outer diameter dimension that is substantially same as the outer diameter dimension of the reflection sheet 16. The board body portion 18a is overlapped with the light guide plate 14 at the outer peripheral portion thereof on the front side. The board body portion 18a is fixed to the optical sheets 15 layered thereon on the front side (specifically, a diffuser sheet 15a, which will be described later) via a fixing member (not illustrated). A double-sided adhesive tape or adhesive may be used as the fixing member. Traces (not illustrated) are formed with patterning on the board body portion 18a to supply power to the LEDs 17 mounted thereon. A distance from a center of a circular or an annular shape (such as the light guide plate 14 and the LED board 18) changes in the "radial direction" and the distance from the center does not change in the "circumferential direction".

As illustrated in FIGS. 8 and 10, the board body portion 18a of the LED board 18 has a front plate surface and a rear plate surface and the LEDs 17 are mounted on the rear plate surface. Each terminal of each LED 17 is bonded by soldering on the rear surface to achieve mechanical connection and electric connection therebetween. The LEDs 17 are mounted on the board body portion 18a to be arranged at intervals in an annular shape (in an annular and curved shape). Specifically, twelve LEDs 17 are arranged in the circumferential direction at equal intervals on the board body portion 18a and the adjacent LEDs 17 are arranged in the circumferential direction at an angular interval of approximately 30 degrees. Thus, the LEDs 17 are arranged at equal intervals in the circumferential direction and therefore, light emitted by each LED 17 enters the light guide plate 14 is even in the circumferential direction and uneven luminance is less likely to be caused in the exit light from the backlight device 12. A distance between the adjacent LEDs 17 in the circumferential direction on the board body portion 18a of the LED board 18 is obtained approximately by a formula of "2πr/n" where "r" is a radius and "π" is a circumference ratio. The radius is a distance from a center of an outer outline or an inner outline of the board body portion 18a to the LED 17. The LEDs 17 are arranged symmetrically with respect to the center of the outer outline or the inner outline of the board body portion 18a. The light emission surface 17a of each LED 17 faces the center of the light guide plate 14 (the center of the outer outline or the inner outline of the board body portion 18a) and the optical axes of light emitted by the LEDs 17 crosses at the center of the light guide plate 14.

Figure 19:
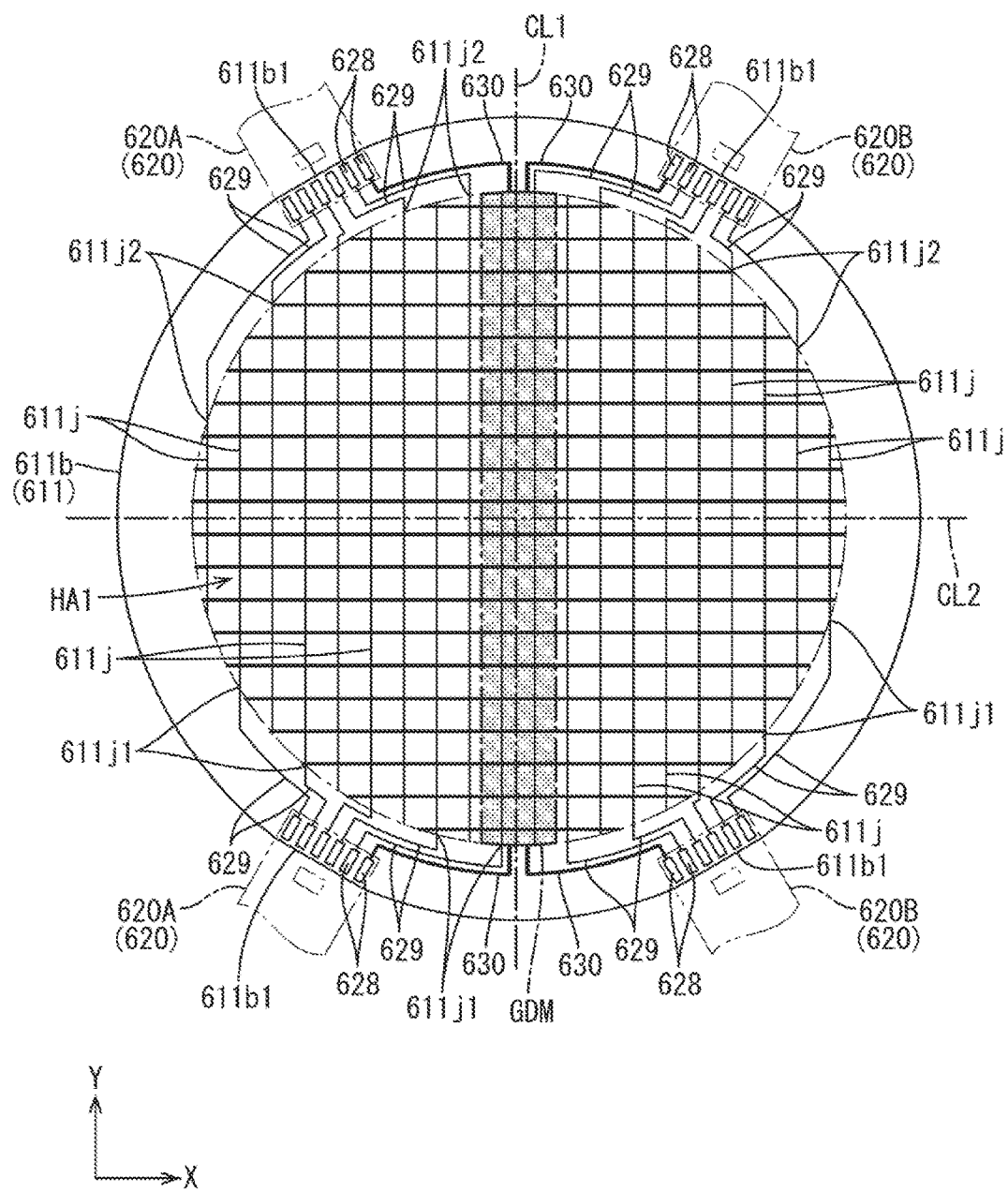
FIG. 19 is a plan view of an array substrate included in a liquid crystal panel according to a seventh embodiment of the present invention.

The board body portion 18a is circumferentially defined in LED mounted portions (light source mounted portions) 22 and LED intervening portions (light source intervening portions) 23 as described below. As illustrated in FIG. 19, the board body portion 18a includes the LED mounted portions 22 where the LEDs 17 are mounted and the LED intervening portions 23 where no LED 17 is mounted and that are between the adjacent LED mounted portions 22 adjacent in the circumferential direction. Each LED mounted portion 22 has a dimension in the circumferential direction equal to a width dimension of the LED 17. Namely, an area extending in the circumferential direction of the board body portion 18a where each LED 17 is mounted is the LED mounted portion 22. Each LED intervening portion 23 has a dimension in the circumferential direction equal to an interval between the adjacent LEDs 17 adjacent in the circumferential direction. The dimension of the LED intervening portion 23 in the circumferential direction is greater than the dimension of the LED mounted portion 22 in the circumferential direction. Namely, an LED non-mounted area of the board body portion 18a extending in the circumferential direction is the LED intervening portion 23. Further, the dimension of the LED intervening portion 23 in the circumferential direction is slightly greater than the width dimension of the flexible printed circuit board 20. The board body portion 18a includes the LED mounted portions 22 and the LED intervening portions 23 alternately and repeatedly in the circumferential direction and each of the number of the LED mounted portions 22 and the number of the LED intervening portions 23 is equal to the number of mounted LEDs 17. The traces are formed in the circumferential direction extending between the LED mounted portions 22 and the LED intervening portions 23 on the board body portion 18a.

As illustrated in FIG. 10, the extended portion 18b is continuous from a specific LED mounted portion 22 of the board body portion 18a with respect to the circumferential direction and the extended portion 18b extends radially from the specific LED mounted portion 22 linearly and outwardly. The extended portion 18b includes extended traces (not illustrated) that are continuous to the traces on the board body portion 18a. The extended portion 18b includes terminals (not illustrated) with being uncovered at a distal end portion thereof in the extending direction. The extended portion 18b is extended outside of the backlight device 12 through an opening outlet (not illustrated) that is formed in a part of the bottom portion 13a of the chassis 13. The extended portion 18b extended through the opening outlet is connected to an LED drive circuit board (not illustrated) that is mounted on the rear side of the chassis 13.

As illustrated in FIGS. 1 and 8, the light guide plate 14 is made of synthetic resin (acrylic resin such as PMMA) and has a substantially circular plan-view shape similar to that of the bottom portion 13a of the chassis 13. The light guide plate 14 has an outer diameter dimension smaller than that of the bottom portion 13a of the chassis 13. Namely, the light guide plate 14 has an outline along the arrangement of the LEDs 17 that are arranged in an annular form on the LED board 18. The light guide plate 14 is arranged within the chassis 13 such that a periphery thereof is surrounded by the side wall portion 13b. The light guide plate 14 has an outer peripheral surface and the outer peripheral surface includes an LED opposite portion (a light source opposite portion) that is opposite the LED 17 and an LED non-opposite portion (a light source non-opposite portion) that is not opposite the LED 17. The LED opposite portions are light entrance surfaces 14a through which the light from the LEDs 17 directly enters the light guide plate 14. The LED non-opposite portions are non-light entrance surfaces 14d through which the light from the LEDs 17 is less likely to directly enter the light guide plate 14. The outer peripheral surface of the light guide plate 14 includes the light entrance surfaces 14a and the non-light entrance surfaces 14d alternately in the circumferential direction of the light guide plate 13. The angular intervals of the light entrance surfaces 14a and the non-light entrance surfaces 14e are determined according to the angular intervals of the adjacent LEDs 17 with respect to the circumferential direction on the LED board 18. The outer peripheral surface of the light guide plate 14 includes the light entrance surface 14a in a light entrance surface forming area with respect to the circumferential direction and the light entrance surface forming area is substantially equal to a width dimension of the LED 17 and smaller than a non-light entrance surface forming area. The light guide plate 14 has a thickness dimension that is greater than the height dimension of the LED 17 and specifically, the thickness dimension of the light guide plate 14 is approximately 0.6 mm. In the present embodiment, the LED non-opposite portion is referred to as the non-light entrance surface 14d. However, it is not meant that light does not enter through the non-light entrance surface 14d at all. For example, light leaking outside through the non-light opposite surface 14d may reflect off the side wall portion 13b and return and enter through the non-light entrance surface 14d.

The light guide plate 14 has a pair of front and rear plate surfaces and as illustrated in FIG. 8, the front-side plate surface facing the front side (the liquid crystal panel 11 side) is a light exit surface 14b through which light exit toward the liquid crystal panel 11. The rear-side plate surface of the light guide plate 14 facing the rear side (the reflection sheet 16 side, the bottom portion 13a side) is an opposite plate surface (a reflection sheet-side plate surface) 14c that is an opposite surface from the light exit surface 14b. According to such a configuration, an arrangement direction in which the LEDs 17 and the light guide plate 14 are arranged is perpendicular to an arrangement direction in which the optical sheets 15 (the liquid crystal panel 11) and the light guide plate 14 are arranged. The light emitted by each LED 17 enters the light guide plate 14 through each light entrance surface 14a and travels within the light guide plate 14 toward the optical sheets 15 (the front side, the light exit side) and exits the light guide plate 14 through the light exit surface 14b that is the front-side plate surface. The light guide plate 14 includes a light reflecting pattern (not illustrated) of a light reflection portion on the opposite plate surface 14c. The light travelling within the light guide plate 14 reflects off the light reflecting pattern toward the light exit surface 14b to accelerate exiting of light through the light exit surface 14b. The light reflection portion including the light reflecting pattern is formed of multiple light reflecting dots and a distribution density of the light reflecting dots changes according to a distance from the light entrance surface 14a (the LED 17). Specifically, the distribution density of the light reflecting dots included in the light reflection portion is increased as is farther away from the light entrance surface 14a in the radial direction of the light guide plate 14 and is lowered as is closer to the light entrance surface 14a. The distribution density of the light reflecting dots is highest at a center of the light guide plate 14 and lowest at the outer peripheral edge portion of the light guide plate 14. The distribution density of the light reflecting dots with respect to the circumferential direction of the light guide plate 14 is highest in a middle portion of the non-light entrance surface 14d (a middle portion between the adjacent light entrance surfaces 14a) of the light guide plate 14 and lowest in a middle portion of the light entrance surface 14a (a middle portion between the adjacent non-light entrance surfaces 14d, on a vertical line to the light emission surface 17a). Thus, the optical design of the light reflecting pattern is optimized such that luminance evenness of the exit light exiting the light guide plate 14 through the light exit surface 14b is good.

As illustrated in FIGS. 1, 7 and 8, the optical sheets 15 have a substantially circular plan-view shape similar to that of the light guide plate 14 and having an outer diameter dimension slightly larger than that of the light guide plate 14. The optical sheets 15 are on the light exit surface 14b of the light guide plate 14 with respect to the front side and the optical sheets 15 are between the liquid crystal panel 11 and the light guide plate 14. Accordingly, the optical sheets 15 change optical properties of light that passes the optical sheets 15 from the light guide plate 14 and exits toward the liquid crystal panel 11. The optical sheets 15 according to the present embodiment include three optical sheets including a diffuser sheet 15a and two lens sheets 15b, 15c (a first lens sheet 15b and a second lens sheet 15c). The diffuser sheet 15a includes a substrate made of substantially transparent synthetic resin and diffuser particles for dispersing light. The diffuser particles are dispersed in the substrate. The diffuser sheet 15a is disposed right above the light guide plate 14 and is closest to the light guide plate 14 among the optical sheets 15.

As illustrated in FIGS. 1 and 8, the two lens sheets 15b, 15c are substantially transparent synthetic resin substrates having multiple unit lenses on one plate surfaces thereof. One of the two lens sheets 15b, 15c is directly layered on the diffuser sheet 15a and is the first lens sheet 15b and another one that is directly layered on the first lens sheet 15b and disposed close to the liquid crystal panel 11 is the second lens sheet 15c. The first lens sheet 15b includes unit lenses each of which extends in a first direction that is parallel to the plate surface thereof and the unit lenses are arranged in a second direction that is perpendicular to the first direction. The first lens sheet 15b selectively collects light in the second direction that is an arrangement direction in which the unit lenses are arranged and the light exits with being collected (anisotropic light collecting action). The second lens sheet 15c includes unit lenses each of which extends in the second direction that is parallel to the plate surface thereof and the unit lenses are arranged in the first direction that is perpendicular to the second direction. The second lens sheet 15c selectively collects light in the first direction that is an arrangement direction in which the unit lenses are arranged and the light exits with being collected. Thus, the first lens sheet 15b and the second lens sheet 15c are arranged such that the extending direction and the arrangement direction of the unit lenses are perpendicular to each other. The rear surface of the panel fixing tape 19 adheres to an outer peripheral edge portion of the second lens sheet 15c. The X-axis direction illustrated in each drawing matches the extending direction (a first direction) in which the unit lenses of the first lens sheet 15b extend and the Y-axis direction matches the extending direction (a second direction) in which the unit lenses of the second lens sheet 15c extend. In FIG. 1, the unit lenses of each of the lens sheets 15b, 15c are described with stripes that are parallel to the X-axis direction or the Y-axis direction.

As illustrated in FIGS. 1 and 8, the rear side surface of the light guide plate 14, that is the opposite plate surface 14c from the light exit surface 14b, is covered with the reflection sheet 16. The reflection sheet 16 may be a sheet member made of white synthetic resin having a highly light reflective surface. Therefore, the light travelling within the light guide plate 14 and exits the light guide plate 14 through the opposite plate surface 14c is reflected by the reflection sheet 16 toward the front side (the light exit surface 14b) effectively. The reflection sheet 16 has a substantially circular plan view shape similar to that of the light guide plate 14 and the optical sheets 15 and has an outer diameter dimension greater than that of the light guide plate 14. Most of the middle portion of the reflection sheet 16 is sandwiched between the light guide plate 14 and the bottom portion 13a of the chassis 13. An outer peripheral edge portion of the reflection sheet 16 is outside the outer peripheral surface of the light guide plate 14. Especially, the portion of the reflection sheet 16 between the light entrance surface 14a and the LED 17 reflects light from the LED 17 effectively toward the light entrance surface 14a and the reflected light enters through the light entrance surface 14a.

The resolution of display images displayed on the display area AA of the liquid crystal panel 11 has been enhanced and accordingly, the number of traces within the display area AA is likely to be increased. Therefore, the panel-side terminals 28 forming area in the array substrate 11b is increased and accordingly, the width of the flexible printed circuit board 20 is also increased. Accordingly, the panel-side terminals 28 forming area and the flexible printed circuit board 20 mounting area in the non-display area NAA of the array substrate 11b are also increased, and the frame width of the non-display area NAA is necessarily increased and the outer size of the liquid crystal panel 11 and the liquid crystal display device is necessarily increased.

In the liquid crystal display device 10 of the present embodiment, as illustrated in FIGS. 5 and 6, the array substrate 11b of the liquid crystal panel 11 includes the linear edge portions 11b1 at the outer peripheral edge portion thereof in the non-display area that is an outer portion of the array substrate 11b. The flexible printed circuit boards 20 are mounted on the array substrate 11b to substantially correspond to positions of the respective linear edge portions 11b1 in the circumferential direction. In the present embodiment, the number of linear edge portions 11b1 is equal to the number of flexible printed circuit boards 20 and specifically the number is two (even number). Accordingly, a width (a size) of each flexible printed circuit board 20 is reduced in a half and a length of each linear edge portion 11b1 is reduced in a half compared to a configuration including one linear edge portion and one flexible printed circuit board. Accordingly, the width of the non-display area NAA that is the outer portion of the liquid crystal panel 11 or the frame width is reduced and the frame size of the liquid crystal display device 19 can be effectively reduced and the device is less likely to be increased in size.

As illustrated in FIGS. 5 and 6, the two flexible printed circuit boards 20 are separately mounted in two areas, respectively, the two areas are defined by dividing the liquid crystal panel 11 in a half with a first center line (a center line) CL1 along the source lines 11j (the Y-axis direction). The panel-side terminals 28 to which the flexible printed circuit boards 20 are connected and the linear edge portions 11a1, 11b1 are arranged in the respective two areas similarly to the above arrangement. Specifically, the liquid crystal panel 11 is divided into a first half area HA1 and a second half area HA2 by the first center line CL1. The two flexible printed circuit boards 20 includes a first flexible printed circuit board (a first mounting component) 20A and a second flexible printed circuit board (a second mounting component) 20B. The first flexible printed circuit board 20A is mounted in the first half area HA1 and connected to the source lines 11j in the first half area HA1. The second flexible printed circuit board 20B is mounted in the second half area HA2 and connected to the source lines 11j in the second half area HA2. The source connection lines 29 include first source connection lines (first source connection lines) 29A and second source connection lines (second source connection lines) 29B. The first source connection lines 29A are disposed in the first half area HA1 and connect the source lines 11j in the first half area HA1 and the first flexible printed circuit board 20A. The second source connection lines 29B are disposed in the second half area HA2 and connect the source lines 11j in the second half area HA2 and the second flexible printed circuit board 20B. The first flexible printed circuit board and the first source connection lines are represented by the numerals with "A" and the second flexible printed circuit board and the second source connection lines are represented by the numerals with "B" to specify the flexible printed circuit boards 20 and the source connection lines 29 and no alphabet is added to generally refer the flexible printed circuit boards 20 and the source connection lines 29. In the present embodiment, a left area in the liquid crystal panel 11 with respect to the first center line CL1 in FIGS. 5 and 6 is the first half area HA1 and a right area in FIGS. 5 and 6 is the second half area HA2.

The TFTs 11g and the source lines 11j arranged in the first half area HA1 are assigned to the first flexible printed circuit board 20A mounted in the first half area HA1 and the TFTs 11g and the source lines 11j arranged in the second half area HA2 are assigned to the second flexible printed circuit board 20B mounted in the second half area HA2. Therefore, the source signals for display can be effectively supplied to each of the TFTs 11g in the display area AA. Specifically, the TFTs 11g and the source lines 11j arranged in the first half area HA1 are assigned to the first flexible printed circuit board 20A and the first flexible printed circuit board 20A is connected to the source lines 11j via the first source connection lines 29A. The TFTs 11g and the source lines 11j arranged in the second half area HA2 are assigned to the second flexible printed circuit board 20B and the second flexible printed circuit board 20B is connected to the source lines 11j via the second source connection lines 29B. Therefore, compared to a configuration in that the first flexible printed circuit board and the second flexible printed circuit board are connected to the source lines 11j in the first half area HA1 and the source lines 11j in the second half area HA2 freely and arbitrarily, extending length of the first source connection lines 29A and the second source connection lines 29B is smaller and routing path of the first and second source connection lines is less likely to be complicated. As the extending length of the first source connection lines 29A and the second source connection lines 29B is smaller, efficiency of the supply of the source signals to the source lines 11j is enhanced and distortion is less likely to be caused in the source signals and display quality is improved. The routing paths of the first source connection lines 29A and the second source connection lines 29B are less likely to be complicated and the frame width of the non-display area NAA is preferably reduced.

The liquid crystal panel 11 may be divided into two half parts by the second center line (the second center line) CL2 that is perpendicular to the source lines 11j and the first center line CL1 (the Y-axis direction), and as illustrated in FIGS. 5 and 6, the first flexible printed circuit board 20A and the second flexible printed circuit board 20B are collectively arranged in one of the two half parts (a lower part in FIG. 5). The panel-side terminals 28 to which the first flexible printed circuit board 20A and the second flexible printed circuit board 20B are connected and the linear edge portions 11a1, 11b1 are arranged similarly. The source connection lines 29 are arranged to connect one end portions 11j1 of the source lines 11j and the panel-side terminals, respectively. The one end portions 11j1 of the source lines 11j connected to the source connection lines 29 are on the flexible printed circuit board 20A, 20B side (on a lower side in FIG. 6) with respect to the second center line CL2. Specifically, the source connection lines 29 extends from the respective panel-side terminals 28 toward the display area AA and are curved and extend along a periphery of the display area AA to be away from the center of each flexible printed circuit board 20A, 20B. Each source connection line 29 extends in a substantially arched shape and is curved at a position that corresponds to the source line 11j to be connected with respect to the X-axis direction and extends in the Y-axis direction and is connected to the one end portion 11j1 of the source line 11j to be connected. The gate connection lines 30 are arranged to connect the panel-side terminals 28 and the end portions of the gate circuit portion GDM on the opposite side from the flexible printed circuit board 20A, 20B side with respect to the second center line CL2 (on the upper side in FIG. 6). Namely, the gate connection lines 30 are connected to the gate circuit portion GDM on the other end portion 11j2 side of the source lines 11j (opposite side from the end portions 11j1 that are connected to the source connection lines 29). Specifically, the gate connection line 30 is connected to the unit terminal that is farthest from the first center line CL1 among the unit terminals included in the panel-side terminals 28. The gate connection line 30 extends from the unit terminal along the periphery of the display area AA to be away from each flexible printed circuit board 20A, 20B and extends beyond the second center line CL2 and closer to the first center line CL1 to form a substantially arched shape. The gate connection line 30 is bent at a position that corresponds to the position of the gate connection portion GDM, which is to be connected, with respect to the X-axis direction and extends in the Y-axis direction. Then, the gate connection line 30 is connected to the gate circuit portion GDM, which is to be connected, from the other end portion 11j2 side of the source line 11j. The source connection lines 29 are made of a metal film same as that of the source lines 11j and the gate connection lines 30 are made of a metal film same as that of the gate lines 11i. The number of unit terminals included in the panel-side terminals 28 is greater than the total number of the source connection lines 29 and the gate connection lines 30.

According to such a configuration, the source connection lines 29 and the gate connection lines 30 are arranged dispersedly in each of the two areas that are opposite each other with respect to the second center line CL2 and therefore, the non-display area NAA is further reduced and the frame width is preferably reduced. The two flexible printed circuit boards 20A, 20B are arranged near the one end portions 11j1 of the source lines to which the source connection lines 29 are connected. Therefore, the extending length of each of the source connection lines 29 is reduced and distortion is less likely to be caused in the signals transmitted through the source lines 11j. The signals transmitted through the gate connection lines 30 may be amplified by the gate circuit portion GDM although the extending length of the gate connection lines 30 is relatively greater than the extending length of the source connection lines 29. Therefore, the distortion of the signals is less likely to be caused.

Next, the arrangement of the first flexible printed circuit board 20A and the second flexible printed circuit board 20B in the non-display area NAA of the liquid crystal panel 11 will be described in detail. As illustrated in FIG. 5, the first flexible printed circuit board 20A and the second flexible printed circuit board 20B are arranged symmetrically with respect to the first center line CL1. In other words, the first flexible printed circuit board 20A is arranged such that a center thereof with respect to a width direction substantially matches a center of the first half area HA1 with respect to the X-axis direction (a direction perpendicular to the source lines 11j and the first center line CL1, the extending direction in which the gate lines 11i and the second center line CL2 extend). The second flexible printed circuit board 20B is arranged such that a center thereof with respect to a width direction substantially matches a center of the second half area HA1 with respect to the X-axis direction. "The center of the flexible printed circuit board 20 with respect to the width direction" is a center of a source unit terminal group including multiple source unit terminals that are arranged in the width direction at one end portion 20a of the flexible printed circuit board 20. Therefore, if the number of the source unit terminals included in the source unit terminal group is an even number, the number of the source unit terminals on one side of the flexible printed circuit board 20 with respect to the center in the width direction thereof is equal to the number of the source unit terminals on another side with respect to the center in the width direction. A center of each of the linear edge portions 11a1, 11b1 with respect to the extending direction thereof substantially matches the center of each flexible printed circuit board 20A, 20B with respect to the width direction thereof. According to such arrangement, the center of each of the linear edge portions 11a1, 11b1 with respect to the extending direction thereof substantially matches the center of each of the half areas Ha1, HA2 with respect to the X-axis direction. More specifically, the first flexible printed circuit board 20A and the second flexible printed circuit board 20B are arranged such that a central angle between the first center line CL1 and each line connecting a center of each of the first flexible printed circuit board 20A and the second flexible printed circuit board 20B with respect to the width direction (a center with respect to the extending direction of the linear edge surfaces 11a1, 11b1) and a center C of the liquid crystal panel 11 is approximately 30 degrees. Thus obtained central angle is substantially equal to an angle (approximately 30 degrees) between each of the linear edge portions 11a1, 11b2 and the second center line CL2 (the X-axis direction). The positions of the linear edge portions 11a1, 11b1 substantially match the positions of the flexible printed circuit boards 20A, 20B, respectively, in the circumferential direction thereof. A central angle formed between a line connecting the center of the first flexible printed circuit board 20A with respect to the width direction thereof and the center C of the liquid crystal panel and a line connecting the center of the second flexible printed circuit board 20B with respect to the width direction thereof and the center C of the liquid crystal panel 11 is approximately 60 degrees. Thus obtained central angle is substantially equal to a total of an angle formed between the linear edge portion 11a1 and the second center line CL2 (the X-axis direction) and an angle formed between the linear edge portion 11b1 and the second center line CL2. The linear edge portions 11a1, 11b1 are included at portions of the outer peripheral edge portion of the liquid crystal panel 11 so as to substantially match respective positions of the respective flexible printed circuit boards 20A, 20B in the circumferential direction.

According to such a configuration, the mounting positions of the flexible printed circuit boards 20A, 20B (the positions of the panel-side terminals 28) in the non-display area NAA of the array substrate 11b are in a substantially middle portion of a source line 11j arrangement area with respect to the X-axis direction in each of the half areas HA1, HA2. Thus, the flexible printed circuit board 20A, 20B is less likely to be arranged locally on one side in the source line 11j arrangement area with respect to the X-axis direction. Therefore, the source connection lines 29 that are extended from each of the flexible printed circuit boards 20A, 20B to one end portion 11j1 of the source lines 11j arranged in each of the half areas HA1, HA2 are arranged evenly on both sides of each of the flexible printed circuit boards 20A, 20B with respect to a center thereof in the width direction. Accordingly, the non-display area NAA is further reduced and the frame width is preferably reduced.

The two flexile printed circuit boards 20 are mounted on the liquid crystal panel 11 as described above. End portions of the respective flexible printed circuit boards 20 opposite from the end portions connected to the liquid crystal panel 11 are connected to the control board 21 arranged on the rear surface side of the backlight device 12. Therefore, in a configuration that a flexible printed circuit board is folded around the outside of the LED 17 with respect to the radial direction of the backlight device 12, the frame width of the backlight device 12 is partially increased by a space through which the flexible printed circuit board passes. As illustrated in FIGS. 5, 7, and 10, in the LED board 18 included in the backlight device 12 of the present embodiment, a central angle formed between lines connecting each of adjacent LEDs 17 in the circumferential direction and the center C of the liquid crystal panel 11 is equal to or greater than a central angle formed between lines connecting each of the two side edges of the flexible printed circuit board 20 with respect to the extending direction of the linear edge portion 11a1, 11b1 and the center C of the liquid crystal panel 11. Further, the LED intervening portions 23 that are positioned corresponding to the respective flexible printed circuit boards 20 and the respective linear edge portion 11a1, 11b1 with respect to the circumferential direction are cut-off LED intervening portions (cut-off light source intervening portions) 24. In the cut-off LED intervening portion, an outer edge portion of the LED intervening portion 23 is selectively cut off. A flexible printed circuit board insertion space (a flexible printed circuit board insertion space) 25 is provided between each of the cut-off LED intervening portions 24 and the side wall portion 13b of the chassis 13 and the flexible printed circuit board 20 is inserted through each flexible printed circuit board insertion space 25. On the LED board 18, the LED intervening portion 23 has a larger space than that of the LED mounting portion 22 because the LED 17 is not mounted on the LED intervening portion 23. Therefore, an outer edge portion of the LED intervening portion 23 is cut off and the flexible printed circuit board insertion space 25 can be formed between the cut-off LED intervening portion 24 and the side wall portion 13b. A total of a dimension of the cut-off LED intervening portion 24 in the radial direction and a dimension of the flexible printed circuit board insertion space 25 in the radial direction is substantially equal to a dimension of the LED intervening portion 23 in the radial direction other than the cut-off LED intervening portions 24 or a dimension of the LED mounting portion 22 in the radial direction. According to such a configuration, the frame width is less likely to be locally increased in the circumferential direction and the frame width is small over an entire periphery compared to a configuration in that a flexible printed circuit board insertion space is provided between the LED mounting portion 22 and the side wall portion 13b or a configuration in that a flexible printed circuit board insertion space is provided between the side wall portion 13b and the LED intervening portion 23 without having a cut-off portion at an outer edge thereof. In FIG. 7, the flexible printed circuit boards 20 are illustrated by two-dot chain lines.

More specifically, as illustrated in FIG. 10, a central angle formed between lines connecting each of the adjacent LEDs 17 in the circumferential direction on the LED board 18 and the center C of the liquid crystal panel 11 is approximately 30 degrees. As illustrated in FIG. 5, a central angle formed between lines connecting each of the two side edges of the flexible printed circuit board 20 with respect to the extending direction of the linear edge portions 11a1, 11b1 and the center C of the liquid crystal panel 11 is slightly smaller than 30 degrees. Namely, the width dimension of the flexible printed circuit board (a dimension in a direction perpendicular to a length direction) is slightly smaller than a distance between the adjacent LEDs 17 in the circumferential direction, that is, a dimension of the LED intervening portion 23 in the circumferential direction. Among the LED intervening portions 23 that are arranged at intervals in the circumferential direction on the board body portion 18a of the LED board 18, two LED intervening portions 23 that are overlapped with the two flexible printed circuit boards 20 in a plan view are the cut-off LED intervening portions 24 having the outer edge portions being cut off linearly as illustrated in FIG. 10. The number of the cut-off LED intervening portions 24 is same as the number of the flexible printed circuit boards 20. The two cut-off LED intervening portions 24 are provided adjacent to and on both sides in the circumferential direction with respect to the LED intervening portion 23 overlapping the first center line CL1. The cut-off LED intervening portion 24 has an outer edge portion that is linearly cut off in parallel to the linear edge portion 11a1, 11b1 of the liquid crystal panel 11 (a plate surface of the flexible printed circuit board 20) and the cut-off portion has an arched shape. Therefore, the cut-off LED intervening portion 24 has a dimension in the radial direction that is increased as is closer to the adjacent LED mounting portion 22 in the circumferential direction and decreased as is farther away from the adjacent LED mounting portion 22. The cut-off LED intervening portion 24 has a smallest dimension in the radial direction at a middle portion thereof in the circumferential direction. The flexible printed circuit board insertion space 25 provided between the cut-off LED intervening portion 24 and the side wall portion 13b of the chassis 13 has a plan-view arched shape. The cut-off LED intervening portion 24 has a cut-off area at the outer edge portion (a forming area in the circumferential direction where the flexible printed circuit board insertion space 25 is formed) and the cut-off area, that is, a length dimension of a linear cut-off edge portion 24a is greater than a width dimension of the flexible printed circuit board 20. Therefore, the flexible printed circuit board 20 can be inserted through the flexible printed circuit board insertion space 25 without being folded in the width direction thereof. As illustrated in FIG. 9, the flexible printed circuit board 20 inserted through the flexible printed circuit board insertion space 25 is inserted through a chassis-side hole 26 and connected to the control board 21 on the rear side of the bottom portion 13a of the chassis 13. The chassis-side hole 26 is formed in a portion of the bottom portion 13a of the chassis 13 so as to overlap the flexible printed circuit board insertion space 25 in a plan view.

As is described before, the liquid crystal display device (the display device) 10 of the present embodiment includes the liquid crystal panel (the display panel) 11 and the flexible printed circuit boards (the mounting components) 20. The liquid crystal panel 11 has a substantially circular outer peripheral edge portion and includes linear edge portions 11a1, 11b1 obtained by forming linear portions on the outer peripheral edge portion. The flexible printed circuit boards 20 are mounted on the outer portion of the liquid crystal panel 11 so as to substantially match the positions of the linear edge portions 11a1, 11b1 in the circumferential direction.

According to such a configuration, the flexible printed circuit boards 20 are mounted on the outer portion of the liquid crystal panel 11 so as to substantially match the positions of the linear edge portions 11a1, 11b1 in the circumferential direction, and the linear edge portions 11a1, 11b1 are obtained by forming linear portions on the outer peripheral edge portion of the liquid crystal panel 11. With such a configuration, each of the flexible printed circuit boards 20 can be reduced in size and a length of each of the linear edge portions 11a1, 11b1 can be reduced. Accordingly, a width of the outer portion of the liquid crystal panel, that is, the frame width is reduced and the frame width of the liquid crystal display device 10 is preferably reduced and the liquid crystal display device 10 is less likely to be increased in size. In mounting of the flexible printed circuit boards 20, positions of the flexible printed circuit boards 20 can be adjusted with respect to the liquid crystal panel 11 using the linear edge portions 11a1, 11b1.

The liquid crystal panel 11 is divided into the display area AA displaying images and the non-display area NAA that is in the outer portion and surrounds the display area AA. The TFTs (the display elements) 11g arranged in a matrix and the gate circuit portion (a scanning circuit portion) GDM that scans the TFTs 11g sequentially and selectively drives the TFTs 11g are at least arranged in the display area AA. According to such a configuration, the non-display area NAA is reduced and the frame width is preferably reduced compared to a configuration in that the gate circuit portion is arranged in the non-display area that is in the outer portion of the liquid crystal panel 11.

In the liquid crystal panel 11, the source lines (data lines) 11j that are connected to the TFTs 11g are at least arranged in the display area AA, and the source connection lines (data connection lines) 29 that connect the flexible printed circuit boards 20 and the one end portions 11j1 of the source lines 11j and the gate connection lines (scanning connection lines) 30 that connect the flexible printed circuit boards 20 and the gate circuit portion GDM are at least arranged in the non-display area NAA. The flexible printed circuit boards 20 are arranged closer to the one end portions 11j1 than the other end portions 11j2 of the source lines 11j. The gate connection lines 30 are connected to the gate circuit portion GDM from the other end portion 11j2 side of the source lines 11j. According to such a configuration, the source connection lines 29 and the gate connection lines 30 are arranged dispersedly in the non-display area NAA. Therefore, the non-display area is further reduced in size and the frame width is preferably reduced. The flexible printed circuit boards 20 are arranged closer to the one end portions 11j1 of the source lines 11j that are to be connected to the source connection lines 29. Therefore, the extending length of the source connection liens 29 is reduced and distortion is less likely to be caused in the signals transmitted through the source lines 11j. The signals transmitted through the gate connection lines 30 may be amplified by the gate circuit portion GDM although the extending length of the gate connection lines 30 is relatively greater than the extending length of the source connection lines 29. Therefore, the distortion of the signals is less likely to be caused.

The liquid crystal panel 11 is divided into the display area AA displaying images and the non-display area NAA that is in the outer portion and surrounds the display area AA. The TFTs 11g arranged in a matrix and the source lines 11j that are connected to the TFTs 11g are at least arranged in the display area AA. In the configuration in that the liquid crystal panel 11 is divided into the first half area HA1 and the second half area HA2 by the first center line (the center line) CL1 that is parallel to the source lines 11j, the flexible printed circuit boards 20 at least includes the first flexible printed circuit board 20A that is arranged in the first half area HA1 and connected to the source lines 11j in the first half area HA1 and the second flexible printed circuit board 20B that is arranged in the second half area HA2 and connected to the source lines 11j in the second half area HA2. According to such a configuration, the TFTs 11g and the source lines 11j arranged in the first half area HA1 are assigned to the first flexible printed circuit board 20A mounted in the first half area HA1 and the TFTs 11g and the source lines 11j arranged in the second half area HA2 are assigned to the second flexible printed circuit board 20B mounted in the second half area HA2. Therefore, the signals for display can be effectively supplied to each of the TFTs 11g in the display area AA.

The source connection lines 29 that connect the flexible printed circuit boards 20 and the one end portions 11j1 of the source lines 11j are at least arranged in the non-display area NAA of the liquid crystal panel 11. The first flexible printed circuit board 20A is arranged such that a center thereof with respect to the extending direction of the linear edge portions 11a1, 11b1 substantially matches a center of the first half area HA1 with respect to the direction perpendicular to the source lines 11*j*. The second flexible printed circuit board 20B is arranged such that a center thereof with respect to the extending direction of the linear edge portions 11*a*1, 11*b*1 substantially matches a center of the second half area HA1 with respect to the direction perpendicular to the source lines 11*j*. According to such a configuration, the source connection lines 29 that are extended from each of the flexible printed circuit boards 20 to the one end portions 11*j*1 of the source lines 11*j* arranged in each of the half areas HA1, HA2 are arranged evenly on both sides with respect to the center of each flexible printed circuit board 20. Accordingly, the non-display area NAA is further reduced and the frame width is preferably reduced.

The backlight device (the lighting device) 12 providing light to the liquid crystal panel 11 includes at least the LEDs (the light sources) 17 arranged at intervals in the circumferential direction, and the light guide plate 14 that guides light emitted by the LEDs 17. The LEDs 17 are arranged such that a central angle formed between lines connecting each of the LEDs 17 that are adjacent to each other in the circumferential direction and the center C of the liquid crystal panel 11 is equal to or greater than a central angle formed between lines connecting each of the two side edges of the flexible printed circuit board 20 with respect to the extending direction of the linear edge portion 11*a*1, 11*b*1 and the center C of the liquid crystal panel 11. The flexible printed circuit board 20 is arranged between the adjacent LEDs 17 in the circumferential direction with a plan view. According to such a configuration, the LEDs 17 are arranged at equal intervals in the circumferential direction and therefore, light emitted by the LEDs 17 entering the light guide plate 14 is even in the circumferential direction and uneven luminance is less likely to be caused in the exit light from the backlight device 12.

Second Embodiment

A second embodiment of the present invention will be described with reference to FIG. 12 or 13. In the second embodiment, arrangement of the gate circuit portion GDM is altered. Configurations, operations, and effects similar to those of the first embodiment will not be described.

Figure 12:
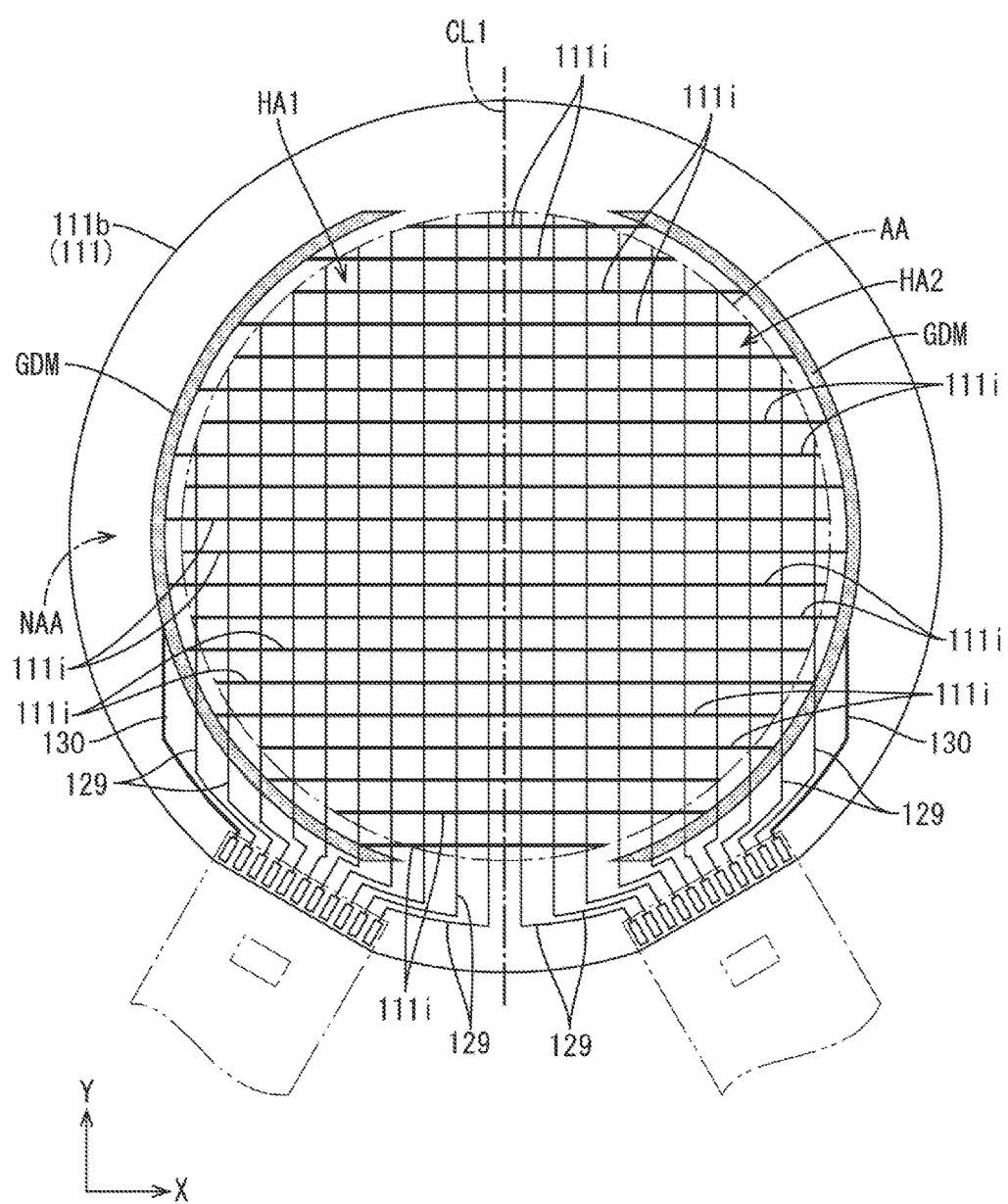
FIG. 12 is a plan view of an array substrate included in a liquid crystal panel according to a second embodiment of the present invention.
Figure 13:
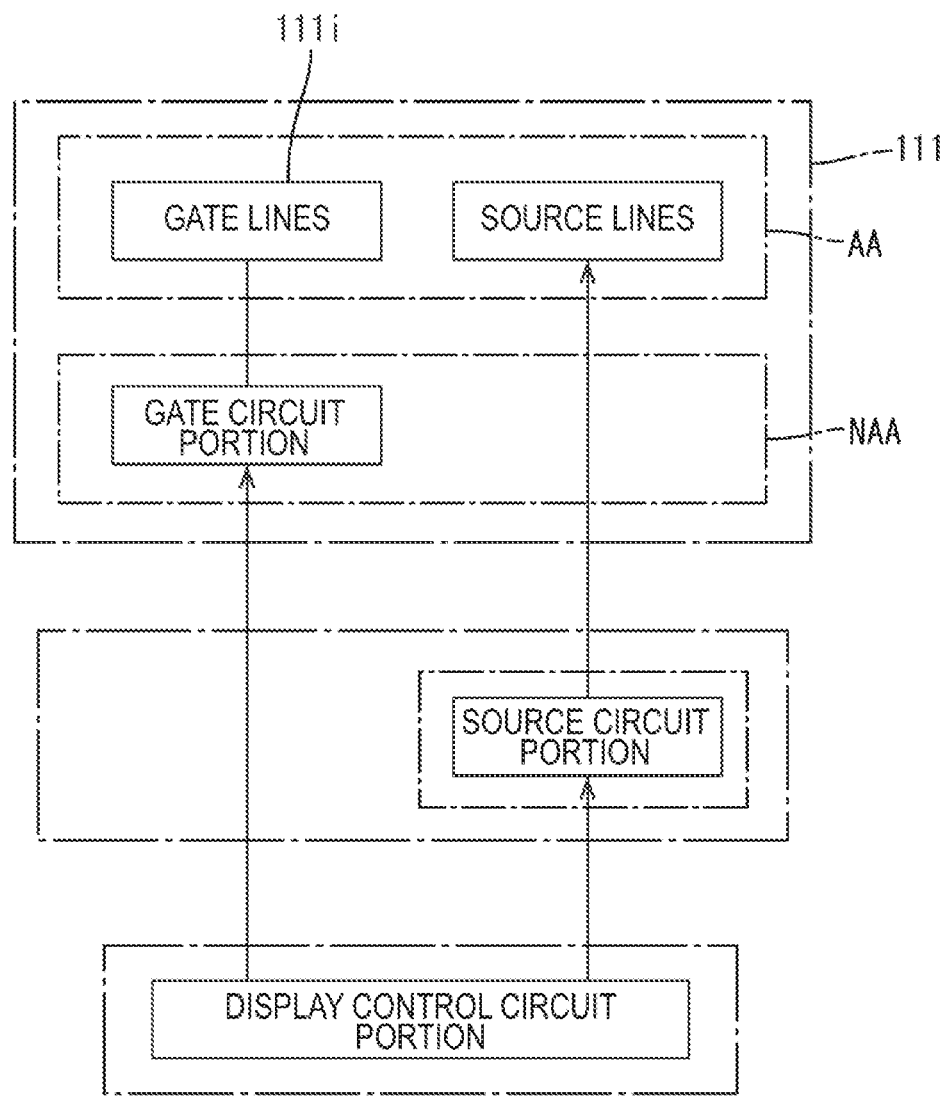
FIG. 13 is a block diagram relating display control of the liquid crystal display device.

As illustrated in FIGS. 12 and 13, the gate circuit portion GDM of the present embodiment is arranged in the non-display area NAA of an array substrate 111*b* of a liquid crystal panel 111. The gate circuit portion GDM includes a control circuit (such as circuit TFTs and circuit lines) and at least a part of the control circuit has light-blocking properties. All the gate circuit portion GDM including a light-blocking portion are arranged in the non-display area NAA and the transmission rate of light and the aperture ratio of each pixel in the display area are increased. The gate circuit portion GDM extends along the outline of the display area AA in the non-display area NAA and has a substantially semiannular shape and has a length in the Y-axis direction covering an area where the gate lines 111*i* are arranged. Two gate circuit portions GDM are arranged with having the first center line CL1 therebetween and one of the gate circuit portions GDM is in the first half area HA1 and the other one is in the second area HA2. Each of the gate lines 111*i* extends such that an end portion thereof reaches the non-display area NAA and the gate lines 111*i* are connected to each gate circuit portion GDM. The gate lines 111*i* that are adjacent to each other in the Y-axis direction are connected to different gate circuit portions GDM. Specifically, in FIG. 12, right-side end portions of odd-numbered gate lines 111*i* from the upper side with respect to the Y-axis direction are connected to the gate circuit portion GDM arranged in the second half area HA2. In FIG. 12, left-side end portions of even-numbered gate lines 111*i* from the upper side with respect to the Y-axis direction are connected to the gate circuit portion GDM arranged in the first half area HA1. Different end portions of the gate lines 111*i* are connected to different gate circuit portions GDM alternately with respect to the Y-axis direction. A part of the gate circuit portion GDM overlaps the source connection lines 129. Each of the gate connection lines 130 is connected to an intermediate portion of the gate circuit portion GDM with respect to a length direction thereof.

As described above, according to the present embodiment, a liquid crystal panel 111 is divided into the display area AA displaying images and the non-display area NAA that is in the outer portion and surrounds the display area AA. The TFTs that are arranged in a matrix are at least arranged in the display area AA. The gate circuit portions GDM that scan the TFTs sequentially and selectively drive the TFTs are at least arranged in the non-display area NAA. According to such a configuration, an area that effectively contributes to display in the display area AA is increased compared to a configuration in that a gate circuit portion is arranged in the display area AA. Therefore, luminance of display images is improved and display quality is improved.

Third Embodiment

A third embodiment of the present invention will be described with reference to FIG. 14 or 15. In the third embodiment, arrangement of drivers 232 differs from that of the first embodiment. Configurations, operations, and effects similar to those of the first embodiment will not be described.

Figure 14:
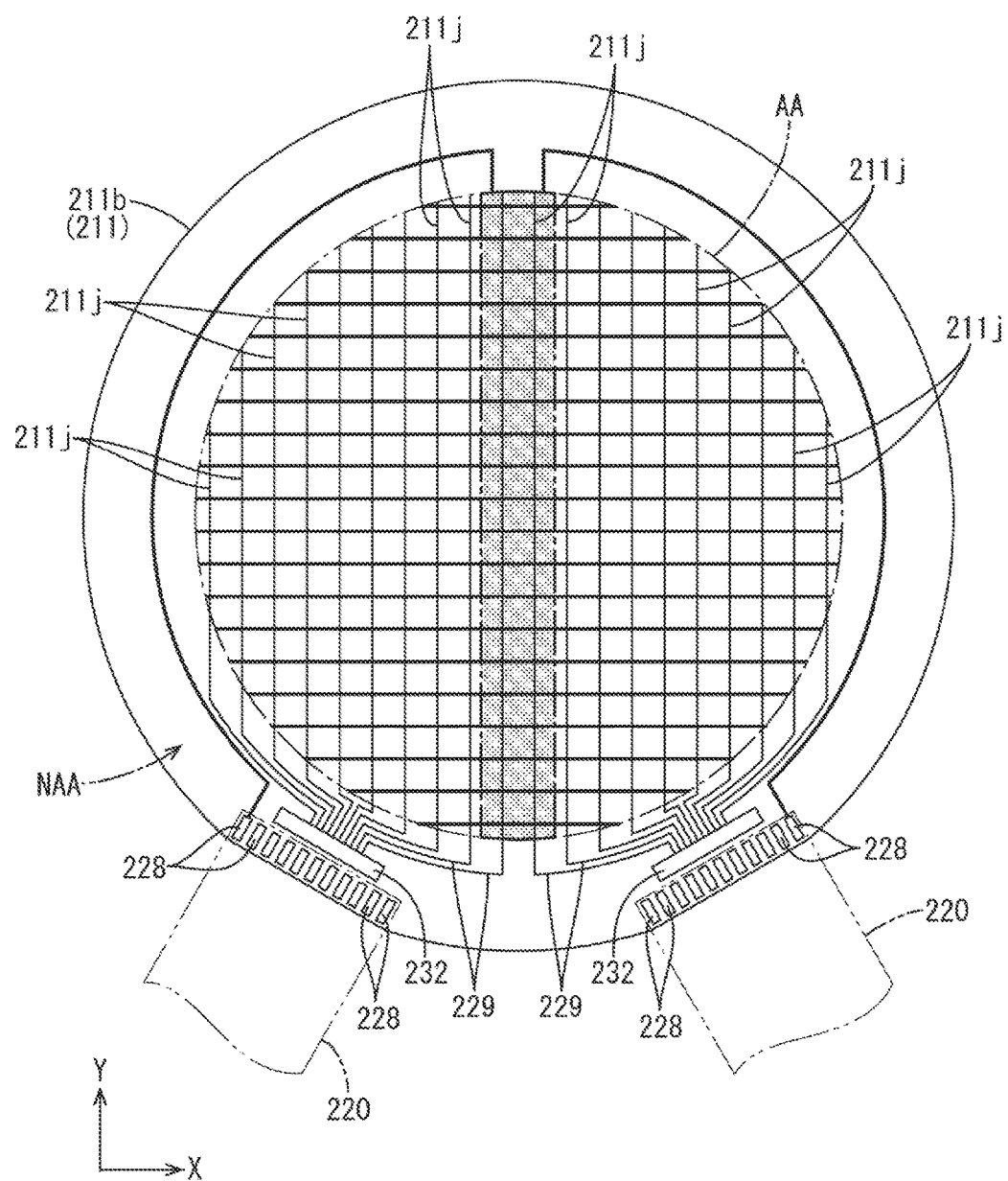
FIG. 14 is a plan view of an array substrate included in a liquid crystal panel according to a third embodiment of the present invention.
Figure 15:
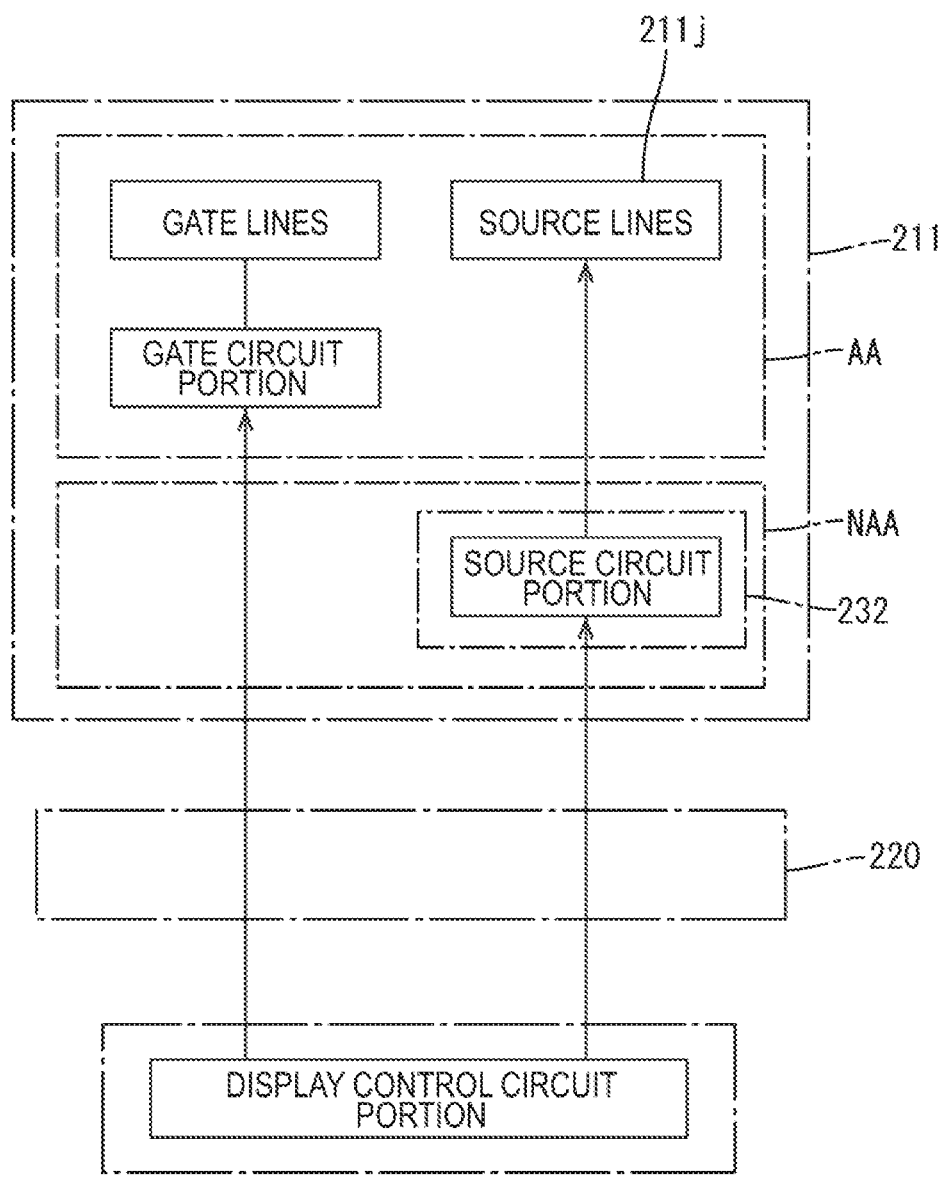
FIG. 15 is a block diagram relating display control of the liquid crystal display device.

As illustrated in FIGS. 14 and 15, drivers 232 of the present embodiment are arranged in the non-display area NAA of an array substrate 211*b* of a liquid crystal panel 211. Therefore, the drivers 232 are not mounted on flexible printed circuit boards 220. Each of the drivers 232 is directly mounted on a portion of the array substrate 21*b* in the non-display area NAA between panel-side terminals 228 and the display area AA with the COG (chip on glass) mounting technology. Driver terminals (not illustrated) that are connected to terminals on the drivers 232 and relay lines (not illustrated) that connect the driver terminals and the panel-side terminals 228 are mounted in driver 232 mounting areas in the non-display area NAA of the array substrate 211*b*. Therefore, signals transmitted from a flexible printed circuit board 220 are supplied to the driver 232 through the panel-side terminals 228, the relay lines, and the driver terminals. Source signals generated by a source circuit portion of the driver 232 are supplied to source lines 211*j* through source connection lines 229. According to such a configuration, a greater amount of source signals can be output by the drivers 232 mounted with COG mounting technology and such a configuration is especially effective in the liquid crystal panel 211 having enhanced resolution.

Fourth Embodiment

A fourth embodiment of the present invention will be described with reference to FIG. 16. In the fourth embodiment, arrangement of flexible printed circuit boards 320 differs from that of the first embodiment. Configurations, operations, and effects similar to those of the first embodiment will not be described.

Figure 16:
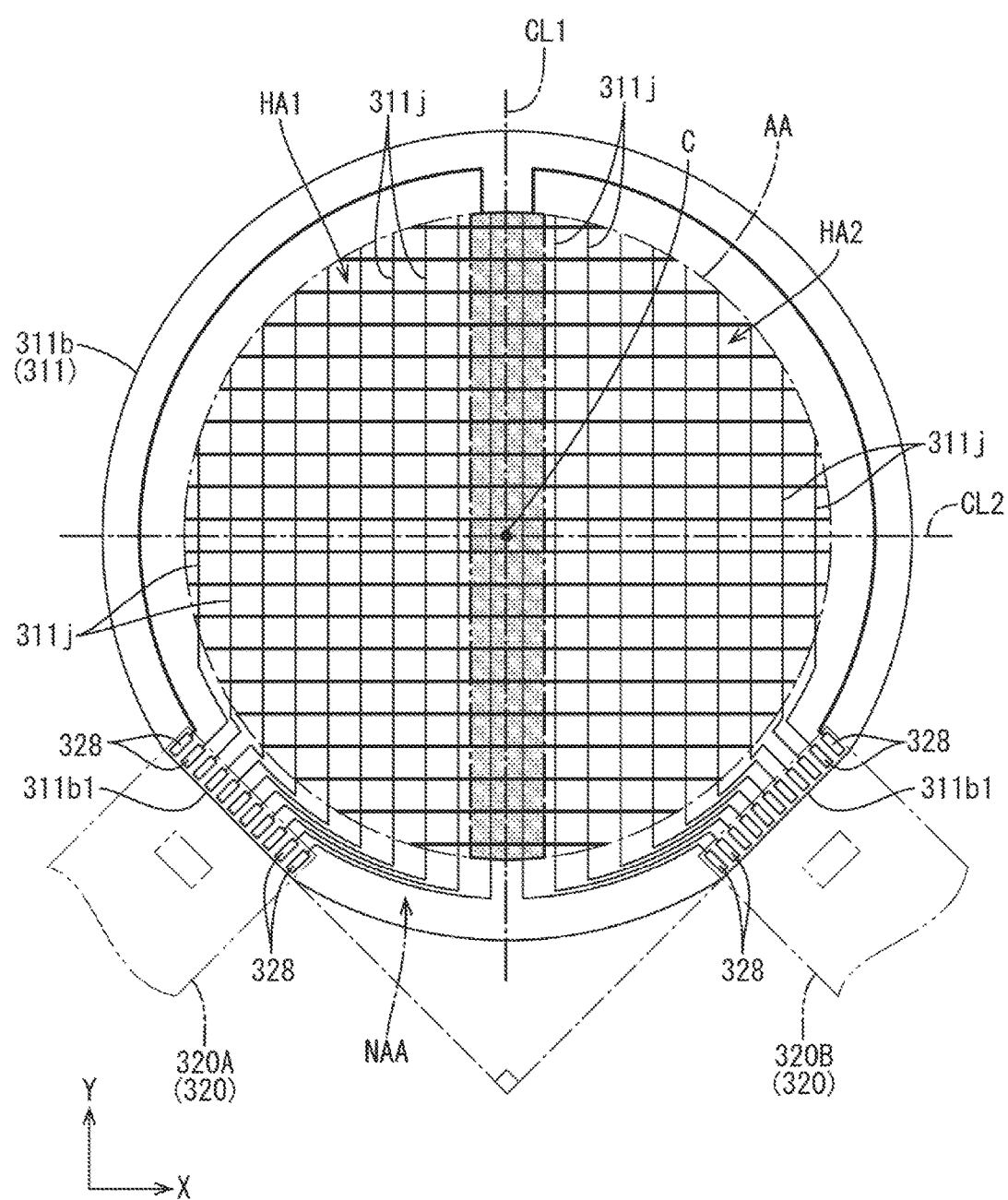
FIG. 16 is a plan view of an array substrate included in a liquid crystal panel according to a fourth embodiment of the present invention.

As illustrated in FIG. 16, two flexible printed circuit boards 320 of the present embodiment are arranged such that a central angle formed between lines one of which connects a center of a first flexible printed circuit board 320A with respect to a width direction (an extending direction of a linear edge portion 311b1) and a center C of a liquid crystal panel 311 and another one of which connects a center of a second flexible printed circuit board 320B with respect to the width direction (the extending direction of the linear edge portion 311b1) and the center C of the liquid crystal panel 311 is approximately 90 degrees (substantially a right angle). The liquid crystal panel 311 has linear edge portions 311b1. One of the linear edge portions 311b1 (a first linear edge portion) is provided to substantially correspond to a position of the flexible printed circuit board 320A in the circumferential direction and another one of the linear edge portions 311b1 (a second linear edge portion) is provided to substantially correspond to a position of the second flexible printed circuit board 320B in the circumferential direction. The linear edge portions 311b1 are provided such that a central angle formed between lines connecting a center of each of the linear edge portions 311b1 with respect to the extending direction thereof and the center C of the liquid crystal panel 311 is approximately 90 degrees. An angle formed between the linear edge portions 311b1 that are provided on positions of the outer peripheral edge portion of the liquid crystal panel 311 to substantially correspond to the flexible printed circuit boards 320A, 320B in the circumferential direction is approximately 90 degrees. A total of angles formed between each of the linear edge portions 311b1 and the second center line CL2 is approximately 90 degrees. In FIG. 16, extended lines extended from the linear edge portions 311b1 of the array substrate 311b are illustrated with two-dot chain lines. According to such a configuration, the extending directions of the two linear edge portions 311b1, which are provided in the non-display area NAA of the liquid crystal panel 311 so as to correspond to the positions of the flexible printed circuit boards 320A, 320B in the circumferential direction, are perpendicular to each other. Therefore, in mounting the flexible printed circuit boards 320A, 320B, a position of the liquid crystal panel 311 can be determined with respect to two directions that are perpendicular to each other with using the linear edge portions 311b1 that are provided to substantially correspond to positions of the flexible printed circuit boards 320A, 320B in the circumferential direction. Accordingly, the flexible printed circuit boards 320A, 320B can be mounted in correct positions with high accuracy. Mounting positions of the flexible printed circuit boards 320A, 320B (positions of the panel-side terminals 328) in the non-display area of the array substrate 311b are closer to an edge from a middle of an source line 311j arrangement area with respect to the X-axis direction where the source lines 311j are arranged in each of the half areas HA1, HA2 divided by the first center line CL1.

As described above, according to the present embodiment, the linear edge portions 311b1 include one that is provided to substantially match a position of the flexible printed circuit board 320A in the circumferential direction and another one that is provided to substantially match a position of the second flexible printed circuit board 320B in the circumferential direction. The linear edge portions 311b1 are provided such that a central angle formed between lines connecting a center of each of the linear edge portions 311b1 with respect to the extending direction thereof and the center C of the liquid crystal panel 311 is approximately 90 degrees. According to such a configuration, the extending directions of the linear edge portions 311b1, which are provided in the non-display area NAA of the liquid crystal panel 311 so as to substantially correspond to the positions of the flexible printed circuit boards 320A, 320B in the circumferential direction, are perpendicular to each other. Therefore, in mounting the flexible printed circuit boards 320A, 320B, a position of the liquid crystal panel 311 can be determined with respect to two directions that are perpendicular to each other with using the linear edge portions 311b1 that are provided to substantially match positions of the flexible printed circuit boards 320A, 320B in the circumferential direction. Accordingly, the flexible printed circuit boards 320A, 320B can be mounted in correct positions with high accuracy.

Fifth Embodiment

A fifth embodiment of the present invention will be described with reference to FIG. 17. In the fifth embodiment, arrangement of flexible printed circuit boards 420 differs from that of the first embodiment. Configurations, operations, and effects similar to those of the first embodiment will not be described.

Figure 17:
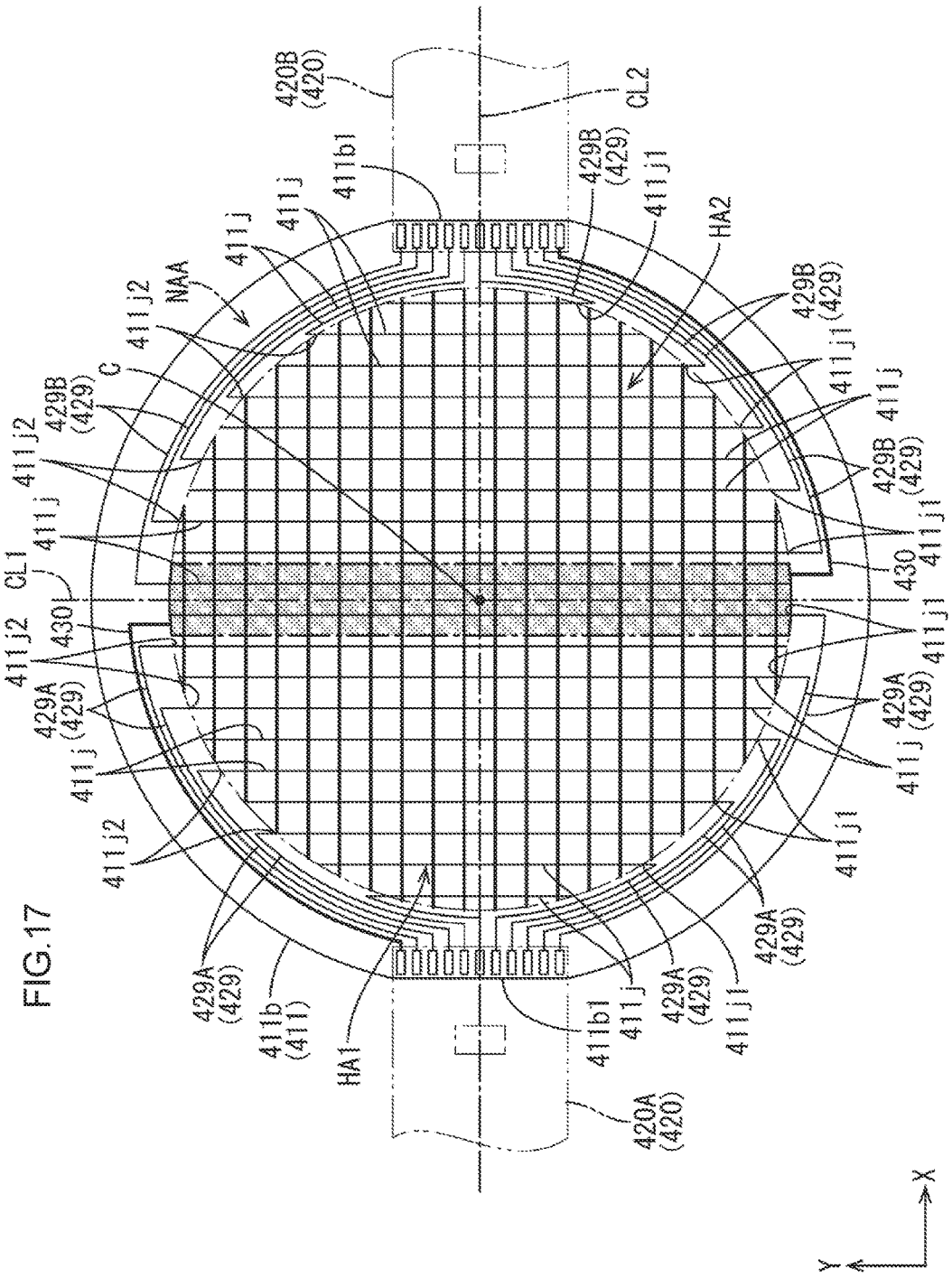
FIG. 17 is a plan view of an array substrate included in a liquid crystal panel according to a fifth embodiment of the present invention.

As illustrated in FIG. 17, two flexible printed circuit boards 420 of the present embodiment are arranged such that a central angle formed by a line connecting a center of a first flexible printed circuit board 420A with respect to a width direction thereof (an extending direction of a linear edge portion 411b1) and a center C of a liquid crystal panel 411 and a line connecting a center of a second flexible printed circuit board 420B with respect to a width direction thereof (an extending direction of the linear edge portion 411b1) and the center C of the liquid crystal panel 411 is approximately 180 degrees. The three center points are connected by the second center line CL2. Namely, the flexible printed circuit boards 420A, 420B are mounted such that length directions thereof are parallel to each other. Therefore, the linear edge portions 411b1 that are provided on the outer peripheral edge portion of the liquid crystal panel 411 to substantially match positions of the flexible printed circuit boards 420A, 420B in the circumferential direction are parallel to each other and perpendicular to the second center line CL2. Source connection lines 429 include ones that are connected to one end portions 411j1 of source lines 411j and other ones that are connected to other end portions 411j2 of the source lines 411j that are adjacent to the source lines 411j whose one end portions 411j1 are connected to the one source connection lines 429.

Specifically, the first source connection lines 429A arranged in the first half area HA1 include ones that are connected to one end portions 411j1 of odd-numbered source lines 411j from the first center line CL1 side with respect to the X-axis direction and other ones that are connected to other end portions 411j2 of even-numbered source lines 411j from the first center line CL1 side with respect to the X-axis direction. Similarly, the second source connection lines 429A arranged in the second half area HA2 include ones that are connected to one end portions 411j1 of odd-numbered source lines 411j from the first center line CL1 side with respect to the X-axis direction and other ones that are connected to other end portions 411j2 of even-numbered source lines 411j from the first center line CL1 side with respect to the X-axis direction. Gate connection lines 430 include one arranged in the first half area HA1 and another one arranged in the second half area HA2. Each of the gate connection lines 430 is arranged in each of side areas that are opposite each other with respect to the second center line CL2. Accordingly, the source connection lines 429 and the gate connection lines 430 are arranged dispersedly in the both areas divided by the second center line CL2 in the non-display area NAA of the array substrate 411b. Therefore, even if the number of source connection lines 429 is increased according to higher resolution, the non-display area NAA is not increased and the resolution can be enhanced with smaller frame width.

As described above, according to the present embodiment, in the non-display area NAA, the liquid crystal panel 411 includes at least the source connection lines 429 that connect the flexible printed circuit boards 420 and the source liens 411j. The first flexible printed circuit board 420A and the second flexible printed circuit board 420B are arranged such that a central angle formed by connecting the center of the first flexible printed circuit board 420A with respect to the extending direction of the linear edge portion 411b1 and the center of the second flexible printed circuit board 420B with respect to the extending direction of the linear edge portion 411b1 and the center C of the liquid crystal panel 411 is approximately 180 degrees. The source connection lines 429 include ones that are connected to one end portions 411j1 of the source lines 411j and other ones that are connected to other end portions 411j2 of the source lines 411j that are adjacent to the source lines 411j whose one end portions 411j1 are connected to the one source connection lines 429. Accordingly, the source connection lines 429 are arranged dispersedly in the non-display area NAA. Therefore, even if the number of source connection lines 429 is increased according to higher resolution, the non-display area NAA is not increased and the resolution can be enhanced with smaller frame width.

Sixth Embodiment

A sixth embodiment of the present invention will be described with reference to FIG. 18. In the sixth embodiment, arrangement of flexible printed circuit boards 520 differs from that of the fifth embodiment. Configurations, operations, and effects similar to those of the fifth embodiment will not be described.

Figure 18:
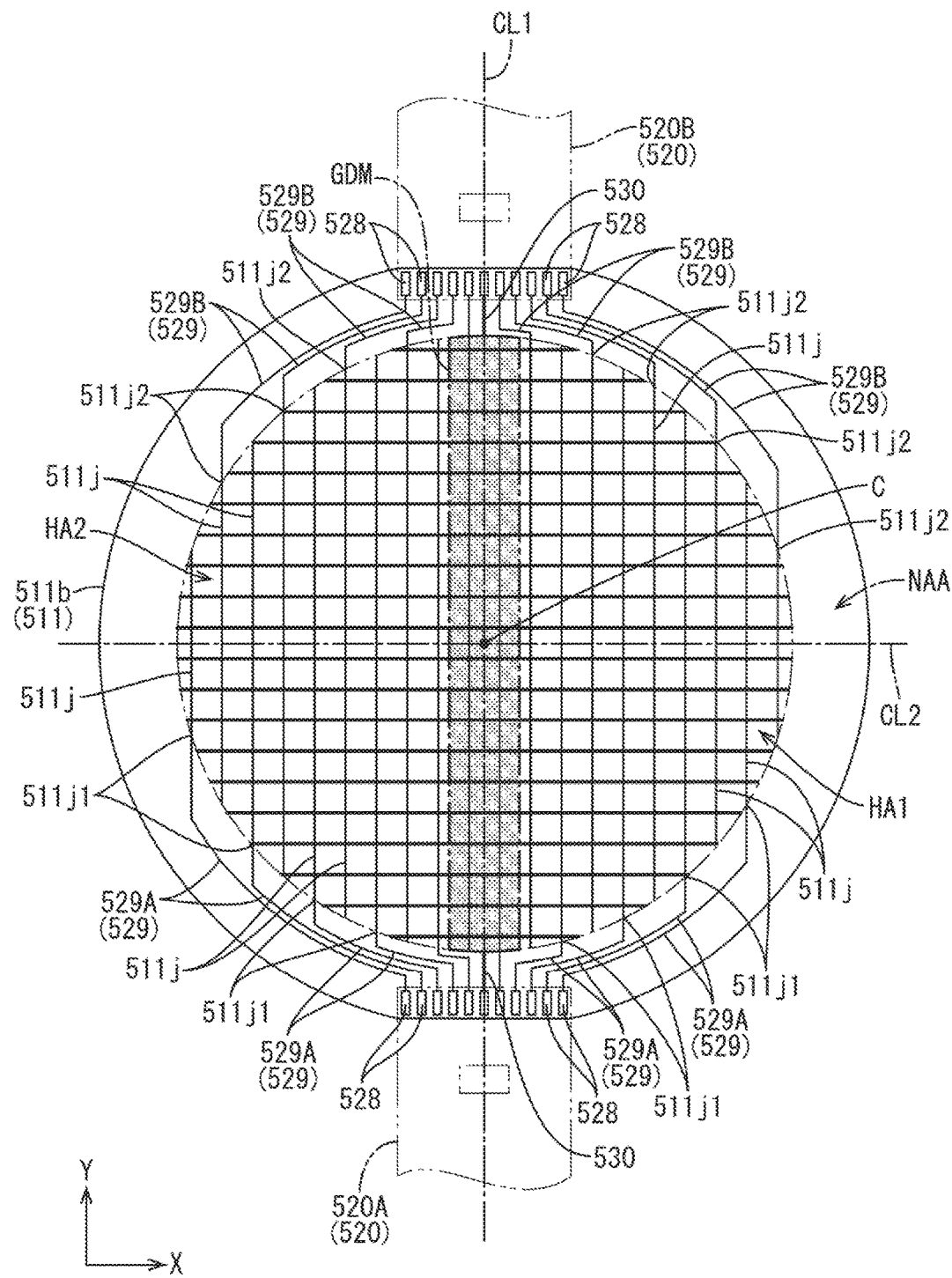
FIG. 18 is a plan view of an array substrate included in a liquid crystal panel according to a sixth embodiment of the present invention.

As illustrated in FIG. 18, two flexible printed circuit boards 520 according to the present embodiment are respectively arranged in both side areas that are opposite each other with respect to the second center line (center line) CL2 that is perpendicular to source lines 511j in the non-display area NAA of an array substrate 511b of a liquid crystal panel 511. The two flexible printed circuit boards 520 are arranged such that each center thereof with respect to a width direction and a center C of the liquid crystal panel 511 are connected by the first center line CL1. Namely, the two flexible printed circuit boards 520 of the present embodiment are arranged such that the two flexible printed circuit boards 420 of the fifth embodiment are rotated by 90 degrees. Only in the present embodiment, a lower area of the liquid crystal panel 511 in FIG. 18 with respect to the second center line CL2 is the first half area HA1 and an upper area in FIG. 18 with respect to the second center line CL2 is the second half area HA2. The flexible printed circuit board 520 and the source connection lines 529 arranged in the first half area HA1 are first flexible printed circuit board 520A and first source connection lines 529A and those arranged in the second half area HA2 are second flexible printed circuit board 520B and second source connection lines 529B.

The first flexible printed circuit board 520A is connected to one end portions 511j1 of source lines 511j via first connection lines 529A. The second flexible printed circuit board 520B is connected to other end portions 511j2 of the source lines 511j via second connection lines 529B. The source lines 511j whose one end portions 511j1 are connected to the first flexible printed circuit board 520A and the source lines 511j whose other end portion 511j are connected to the second flexible printed circuit board 520B are arranged alternately in the X-axis direction so as to be adjacent to each other. The source connection lines 529 include ones that are connected to the one end portions 511j1 of the source lines 511j and other ones that are connected to the other end portions 511j2 of the source lines 511j that are adjacent to the source lines 511j whose one end portions 511j1 are connected to the source connection lines 529. Specifically, the first source connection lines 529A arranged in the first half area HA1 are connected to one end portions 511j1 of odd-numbered (even-numbered ones from the right end in FIG. 18) source lines 511j from the left end in FIG. 18 with respect to the X-axis direction. The second source connection lines 529B arranged in the second half area HA2 are connected to other end portions 511j2 of even-numbered (odd-numbered ones from the right end in FIG. 18) source lines 511j from the left end in FIG. 18 with respect to the X-axis direction. The gate connection lines 530 are connected to a middle unit terminal of the panel-side terminals 528 and extend in the Y-axis direction and are connected to the gate circuit portion GDM. According to such a configuration, the source lines 511j that are arranged in the X-axis direction are connected to the first flexible printed circuit board 520A and the second flexible printed circuit board 520B alternately via the source connection lines 529A, 529B, respectively. Therefore, distribution density of the source connection lines 529 in a direction along the second center line CL2 is reduced and the resolution can be preferably increased.

As described above, according to the present embodiment, a liquid crystal panel 511 is divided into the display area AA displaying images and the non-display area NAA that is in an outer portion and surrounds the display area AA. The TFTs that area arranged in a matrix and source lines 511j that are connected to the respective TFTs are at least arranged in the display area AA. The source connection lines 529 that connect the flexible printed circuit boards 520 and the source lines 511j are at least arranged in the non-display area NAA. Each of the flexible printed circuit boards 520 is arranged in one side area and another side area of the liquid crystal panel 511 with respect to the second center line (the center line) CL2 that is perpendicular to the source lines 511j. The source lines 511j whose one end portions 511j1 are connected to the flexible printed circuit board 520 arranged in the one side area with respect to the second center line CL2 and the source lines 511j whose other end portions 511j2 are connected to the flexible printed circuit board 520 arranged in the other side area with respect to the second center line CL2 are alternately arranged. According to such a configuration, the one end portions 511j1 and the other end portions 511j2 of the source lines 511j are alternately connected to each of the flexible printed circuit boards 520 that are arranged in the one side area and the other side area with respect to the second center line CL2. Therefore, distribution density of the source connection lines 529 in a direction along the second center line CL2 is decreased and the resolution can be preferably increased.

Seventh Embodiment

A seventh embodiment of the present invention will be described with reference to FIG. 19. In the seventh embodiment, the number of flexible printed circuit boards 620 differs from that of the first embodiment. Configurations, operations, and effects similar to those of the first embodiment will not be described.

As illustrated in FIG. 19, according to the present embodiment, four flexible printed circuit boards 620 are mounted on a liquid crystal panel 611. The flexible printed circuit boards 620 include two first flexible printed circuit boards 620A that are arranged in the first half area HA1 divided by the first center line CL1 and two second flexible printed circuit boards 620B that are arranged in the second half area HA2. Respective one of the two first flexible printed circuit boards 620A and the two second flexible printed circuit boards 620B are arranged in one side area with respect to the second center line CL2 that is perpendicular to the first center line CL1 and respective other one of them are arranged in other side area with respect to the second center line CL2. Namely, four flexible printed circuit boards 620 are arranged in four areas, respectively, that are divided by the two center lines CL1, CL2 that are perpendicular to each other. Two sets of the first flexible printed circuit board 620A and the second flexible printed circuit board 620B are arranged symmetrically with respect to the second center line CL2. Accordingly, four linear edge portions 611*b*1 are included in the liquid crystal panel 611 by cutting off respective parts of an outer peripheral edge portion of the liquid crystal panel 611. The linear edge portions 611*b*1 are provided to substantially match positions of the two sets of the first flexible printed circuit board 620A and the second flexible printed circuit board 620B in the circumferential direction and are arranged symmetrically with respect to the second center line CL2. According to such a configuration, a width dimension of each of the first flexible printed circuit board 620A and the second flexible printed circuit board 620B and a mounting area of each of the first flexible printed circuit board 620A and the second flexible printed circuit board 620B in the non-display area NAA of the array substrate 611*b* are reduced to approximately a half of those of the first embodiment. A forming area of panel-side terminals 628 and the number of unit terminals provided in a portion of the non-display area NAA of the array substrate 611*b* in which each flexible printed circuit board 620 is mounted is reduced to approximately a half of those of the first embodiment. The number of the source connection lines 629 that are connected to each of the flexible printed circuit boards 620 is reduced to approximately a half of that of the first embodiment. Therefore, even if the resolution is further enhanced, the frame width of the non-display area NAA is not increased.

Specifically, a half of the source lines 611*j* arranged in the first half area HA1 are connected to each of the two first flexible printed circuit boards 620A and a half of the source lines 611*j* arranged in the second half area HA2 are connected to each of the two second flexible printed circuit boards 620B. One of the two first flexible printed circuit boards 620A is arranged in one side area of the first half area HA1 with respect to the second center line CL2 and connected to one end portions 611*j*1 of the source lines 611*j*. Another one of the two first flexible printed circuit boards 620A is arranged in another side area of the first half area HA1 with respect to the second center line CL2 and connected to other end portions 611*j*2 of the source lines 611*j*. The source lines 611*j* whose one end portions 611*j*1 are connected to the one first flexible printed circuit board 620A and the source lines 611*j* whose other end portions 611*j*2 are connected to the other first flexible printed circuit board 620A are arranged in adjacent to each other in the X-axis direction, or are arranged alternately. Similarly, one of the two second flexible printed circuit boards 620B is arranged in one side area of the second half area HA2 with respect to the second center line CL2 and connected to the one end portions 611*j*1 of the source lines 611*j*. Another one of the two second flexible printed circuit boards 620B is arranged in another side area of the second half area HA2 with respect to the second center line CL2 and connected to the other end portions 611*j*2 of the source lines 611*j*. The source lines 611*j* whose one end portions 611*j*1 are connected to the one second flexible printed circuit board 620B and the source lines 611*j* whose other end portions 611*j*2 are connected to the other second flexible printed circuit board 620B are arranged in adjacent to each other in the X-axis direction, or are arranged alternately. Thus, the adjacent source lines 611*j* that are arranged in the X-axis direction are connected to the flexible printed circuit boards 620 that are arranged in both side areas opposite each other with respect to the second center line CL2. Accordingly, the distribution density of the source lines 629 is lower in the circumferential direction and the resolution can be preferably enhanced. Each gate connection line 630 connects each of the flexible printed circuit boards 620 and the gate circuit portion GDM independently and is connected to a unit terminal of each panel-side terminal 628 that is closest to the first center line CL1.

As described above, according to the present embodiment, at least two first flexible printed circuit boards 620A and at least two second flexible printed circuit boards 620B are mounted in the non-display area NAA of the liquid crystal panel 611. The first flexible printed circuit boards 620A and the second flexible printed circuit boards 620B are arranged in two areas that are opposite each other with respect to the second center line (a second center line) CL2 that is perpendicular to the first center line CL1 and the first flexible printed circuit boards 620A and the second flexible printed circuit boards 620B are connected to the one end portions 611*j*1 and the other end portion 611*j*2 of the source lines 611*j*. According to such a configuration, at least four flexible printed circuit boards 620 can be provided and the resolution can be preferably enhanced. At least two first flexible printed circuit boards 620A and at least two second flexible printed circuit boards 620B are arranged in two areas that are opposite each other with respect to the second center line CL2 that is perpendicular to the first center line CL1 and connected to the one end portions 611*j*1 and the other end portion 611*j*2 of the source lines 611*j*. Therefore, even with the four flexible printed circuit boards 620, the non-display area AA is maintained small and the frame width can be preferably reduced.

Eighth Embodiment

An eighth embodiment of the present invention will be described with reference to FIG. 20. In the eighth embodiment, arrangement of flexible printed circuit boards 720 differs from that of the seventh embodiment. Configurations, operations, and effects similar to those of the seventh embodiment will not be described.

Figure 20:
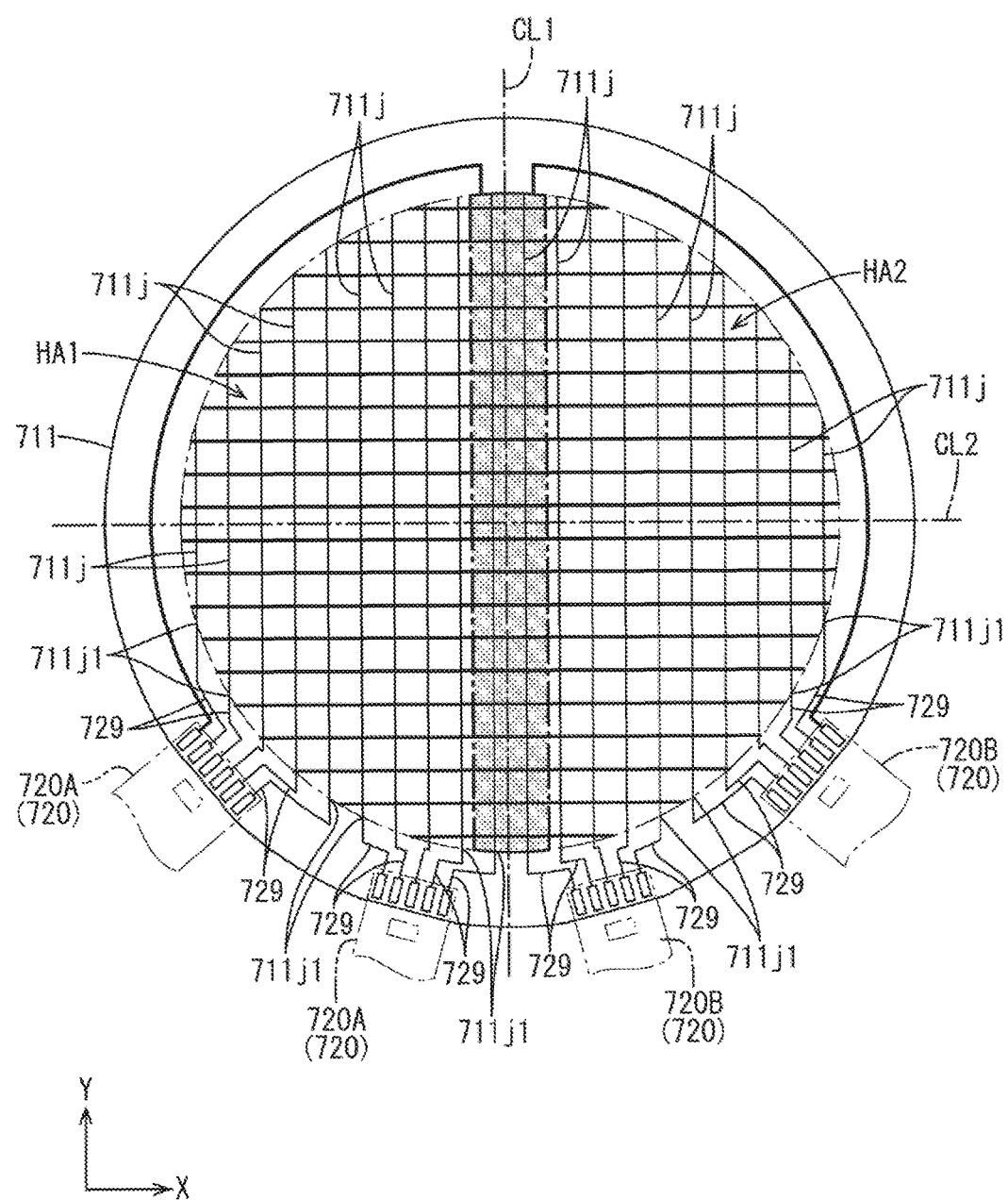
FIG. 20 is a plan view of an array substrate included in a liquid crystal panel according to an eighth embodiment of the present invention.

As illustrated in FIG. 20, four flexible printed circuit boards 720 according to the present embodiment are arranged collectively in one side area with respect to the second center line CL2. The four flexible printed circuit boards 720 include two first flexible printed circuit boards 720A that are arranged in the first half area HA1 divided by the first center line CL1 and two second flexible printed circuit boards 720B that are arranged in the second half area HA2. The four flexible printed circuit boards 720 are arranged in one side area (in a lower area in FIG. 20) with respect to the second center line CL2 and are connected to one end portions 711j1 of source lines 711j via source connection lines 729. One of the two first flexible printed circuit boards 720A and one of the two second flexible printed circuit boards 720B are arranged close to the first center line CL1 and other ones thereof are arranged farther away from the first center line CL1. Each of the half areas HA1, HA2 is further divided into a half with respect to the X-axis direction and four areas are provided, and the source lines 711j arranged in each of the four areas are assigned to each of the four flexible printed circuit boards 720. According to such a configuration, processing of the source signals supplied to each of the source lines 711j is simplified.

As described before, according to the present embodiment, at least two first flexible printed circuit boards 720A and at least two second flexible printed circuit boards 720B are arranged in the non-display area NAA of a liquid crystal panel 711 and are arranged collectively in one side area with respect to the second center line CL2 that is perpendicular to the first center line CL1 and are connected to one end portions 711j1 of the source lines 711j. With such a configuration, at least four flexible printed circuit boards are provided and the resolution is preferably enhanced. Further, at least two first flexible printed circuit boards 720A and at least two second flexible printed circuit boards 720B are arranged collectively in one side area with respect to the second center line CL2 that is perpendicular to the first center line CL1 and are connected to one end portions 711j1 of the source lines 711j. Therefore, processing of signals supplied to the source lines 711j is simplified.

Ninth Embodiment

A ninth embodiment of the present invention will be described with reference to FIG. 21. In the ninth embodiment, a method of injecting liquid crystal material differs from that of the first embodiment and the number of linear edge portions 811b1 is altered from that of the first embodiment. Configurations, operations, and effects similar to those of the first embodiment will not be described.

Figure 21:
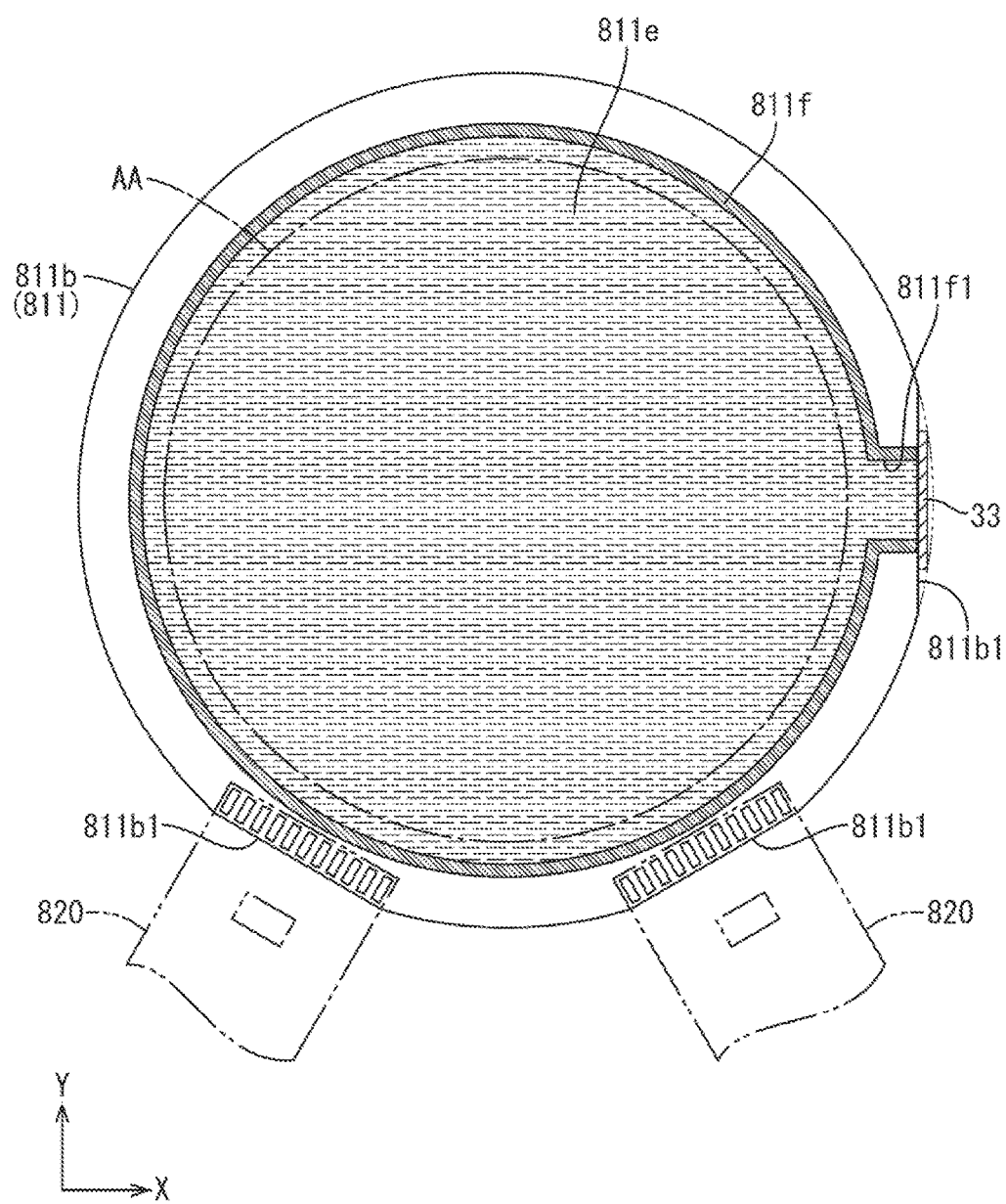
FIG. 21 is a plan cross-sectional view of a liquid crystal layer and a sealing member included in a liquid crystal panel according to a ninth embodiment of the present invention.

As illustrated in FIG. 21, a liquid crystal panel 811 of the present embodiment includes a liquid crystal layer 811e and liquid crystal material is injected with the vacuum injection method. A sealing member 811j sealing the liquid crystal layer 811e in the liquid crystal panel 811 has an annular shape having ends and the sealing member 811j is greater in size than the display area AA. A part of the sealing member 811j in the circumferential direction is open toward outside as an inlet hole 811f1 through which liquid crystal material is injected with the vacuum injection method. The liquid crystal panel 811 includes an inlet hole cover 33 that covers the inlet hole 811f1 such that the liquid crystal material does not leak through the inlet hole 811f1. The inlet cover 33 is disposed to cover the inlet hole 811f1 from the outside. The inlet hole 811f1 and the inlet hole cover 33 are provided not to overlap (match) each of flexible printed circuit boards 820 with respect to the circumferential direction of the liquid crystal panel 811.

The liquid crystal panel 811 includes two linear edge portions 811b1 at an outer peripheral edge portion thereof so as to substantially correspond to positions of the two flexible printed circuit boards 820 in a circumferential direction and further includes a linear edge portion 811b1 so as to substantially correspond to a position of the inlet hole 811g/1 and the inlet hole cover 33 in the circumferential direction. Namely, the linear edge portions 811b1 that are greater in number (three) than the number of the flexible printed circuit boards 820 are provided on the outer peripheral edge portion of the liquid crystal panel 811. The inlet hole cover 33 is disposed to cover the inlet hole 811f1 from the outside and therefore, the inlet hole cover 33 may be arranged to project outside from the outer peripheral edge portion of the liquid crystal panel 811 in the radial direction. The inlet hole cover 33 is disposed on the linear edge portion 811b1 that is recessed inwardly in the radial direction from an outline of substantially a perfect circle of the liquid crystal panel 811 (an outline illustrated with two-dotted chain line in FIG. 20) and extends along the linear edge portion 811b1. Therefore, even if the inlet hole cover 33 is disposed to project outwardly from the linear edge portion 811b1 in the radial direction, the inlet hole cover 33 is less likely to be outside the outline of the substantially perfect circle of the liquid crystal panel 811. Accordingly, a casing (not illustrated) in which the liquid crystal panel 811 is arranged has an outline of a perfect circle and the liquid crystal display device is less likely to be increased in size and has good design. In FIG. 21, only the array substrate 811b of a pair of substrates included in the liquid crystal panel 811 is illustrated. A CF substrate (not illustrated) also includes a linear edge portion so as to substantially match a position of the inlet hole 811f1 and the inlet hole cover 33 in the circumferential direction.

As described before, according to the present embodiment, the liquid crystal panel 811 includes the CF substrate (a first substrate), the array substrate (a second substrate) 811b that is bonded on the CF substrate, the liquid crystal layer 811e sandwiched between the CF substrate and the array substrate 811B, a sealing member 811f, and the inlet hole cover 33. The sealing member 811f extends in the circumferential direction around the liquid crystal layer 811e to seal it and includes the inlet hole 811f1 through which the liquid crystal material, which forms the liquid crystal layer 811e, is injected. The inlet hole cover 33 covers the inlet hole 811f1. The number of the linear edge portions 811b1 that are included at the outer peripheral edge portion of the liquid crystal panel 811 is greater than the number of the flexible printed circuit boards 820 to be mounted. One of the linear edge portions 811b1 on which no flexible printed circuit board 820 is disposed to substantially match a position of the inlet hole 811f1 in a circumferential direction. According to such a configuration, even if the inlet hole cover 33 covering the inlet hole 811f1 of the sealing member 811f is disposed to project outwardly from the outer peripheral edge portion, the outline of the liquid crystal panel 811 having the substantially perfect circle is less likely to be increased in size.

Tenth Embodiment

A tenth embodiment of the present invention will be described with reference to FIG. 22. In the tenth embodiment, the number of linear edge portions 911b1 is altered from that of the first embodiment. Configurations, operations, and effects similar to those of the first embodiment will not be described.

Figure 22:
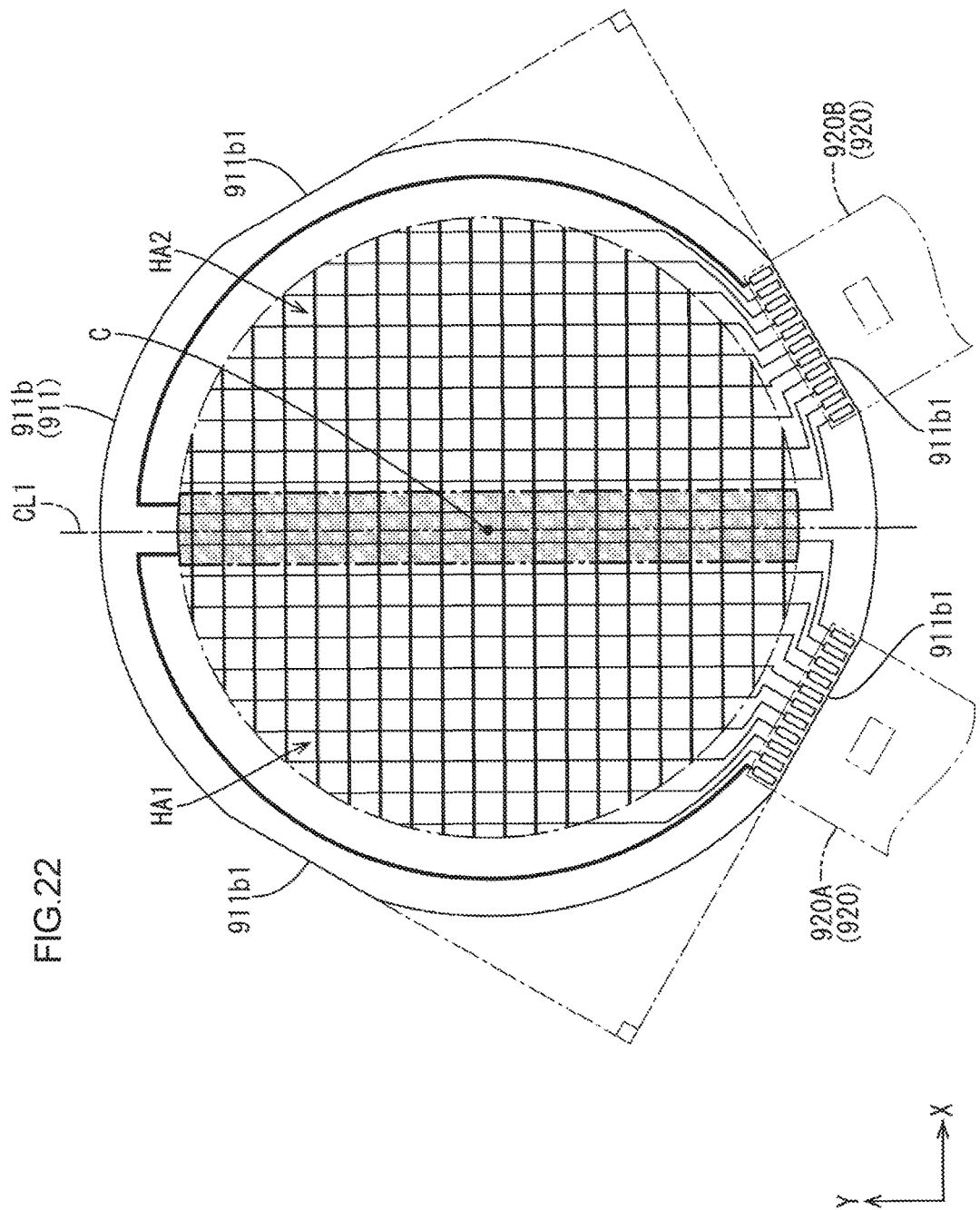
FIG. 22 is a plan view of an array substrate included in a liquid crystal panel according to a tenth embodiment of the present invention.

As illustrated in FIG. 22, the outer peripheral edge portion of a liquid crystal panel 911 of the present embodiment includes two linear edge portions 911b1 to substantially correspond to positions of two flexible printed circuit boards 920, respectively, in the circumferential direction and another two linear edge portions 911b1 that do not substantially correspond to positions of the two respective flexible printed circuit boards 920 in the circumferential direction. The flexible printed circuit boards 920 are not arranged on the latter two linear edge portions 911b1 and the latter two linear edge portions 911*b*1 are disposed away from the former two linear edge portions 911*b*1 (the linear edge portions 911*b*1 where the flexible printed circuit boards 920 are mounted, respectively) in the circumferential direction at approximately 90 degrees.

Specifically, in the first half area HA1 divided by the first center line CL1, the outer peripheral edge portion of the liquid crystal panel 911 includes the linear edge portion 911*b*1 where the first flexible printed circuit board 920A is mounted and the linear edge portion 911*b*1 where the first flexible printed circuit board 920A is not mounted. A central angle formed between lines connecting a center of each of the linear edge portions 911*b*1 and the center C of the liquid crystal panel 911 is approximately 90 degrees (a substantially right angle). An angle formed between the linear edge portion 911*b*1 where the first flexible printed circuit board 920A is mounted and the linear edge portion 911*b*1 where the first flexible printed circuit board 920A is not mounted is approximately 90 degrees. Similarly, in the second half area HA2 divided by the first center line CL1, the outer peripheral edge portion of the liquid crystal panel 911 includes the linear edge portion 911*b*1 where the second flexible printed circuit board 920B is mounted and the linear edge portion 911*b*1 where the second flexible printed circuit board 920B is not mounted. A central angle formed between lines connecting a center of each of the linear edge portions 911*b*1 and the center C of the liquid crystal panel 911 is approximately 90 degrees (a substantially right angle). An angle formed between the linear edge portion 911*b*1 where the second flexible printed circuit board 920B is mounted and the linear edge portion 911*b*1 where the second flexible printed circuit board 920B is not mounted is approximately 90 degrees. Extended lines extended from the linear edge portions 911*b*1 of the array substrate 11*b* are illustrated with two-dotted chain lines in FIG. 22.

According to such a configuration, in mounting the first flexible printed circuit board 920A, the linear edge portion 911*b*1 where the first flexible printed circuit board 920A is to be mounted and the linear edge portion 911*b*1 where the first flexible printed circuit board 920A is not to be mounted are contacted with positioning pins (not illustrated) such that a position of the liquid crystal panel 911 can be adjusted in the first half area HA1 with respect to two directions that are perpendicular to each other. In such a state, the first flexible printed circuit board 920A is mounted. Similarly, in mounting the second flexible printed circuit board 920B, the linear edge portion 911*b*1 where the second flexible printed circuit board 920B is to be mounted and the linear edge portion 911*b*1 where the second flexible printed circuit board 920B is not to be mounted are contacted with positioning pins (not illustrated) such that a position of the liquid crystal panel 911 can be adjusted in the second half area HA2 with respect to two directions that are perpendicular to each other. In such a state, the second flexible printed circuit board 920B is mounted.

According to the present embodiment, as described above, the number of the linear edge portions 911*b*1 that are included at the outer peripheral edge portion of the liquid crystal panel 911 is greater than the number of the flexible printed circuit boards 920 to be mounted. Among the linear edge portions 911*b*1, a central angle formed between a line connecting a center of the linear edge portion 911*b*1 where the flexible printed circuit board 920 is not mounted and the center C of the liquid crystal panel 911 and a line connecting a center of the linear edge portion 911*b*1 where the flexible printed circuit board 920 is mounted and the center C of the liquid crystal panel 911 is approximately 90 degrees.

According to such a configuration, in mounting the flexible printed circuit boards 920, a position of the liquid crystal panel 911 is adjusted with respect to two directions that are perpendicular to each other with using the linear edge portions 911*b*1. Accordingly, the flexible printed boards 920 can be mounted with high positioning accuracy.

Eleventh Embodiment

An eleventh embodiment of the present invention will be described with reference to FIGS. 23 to 25. In the eleventh embodiment, the number of linear edge portions 1011*b*1 is altered from that of the first embodiment. Configurations, operations, and effects similar to those of the first embodiment will not be described.

Figure 23:
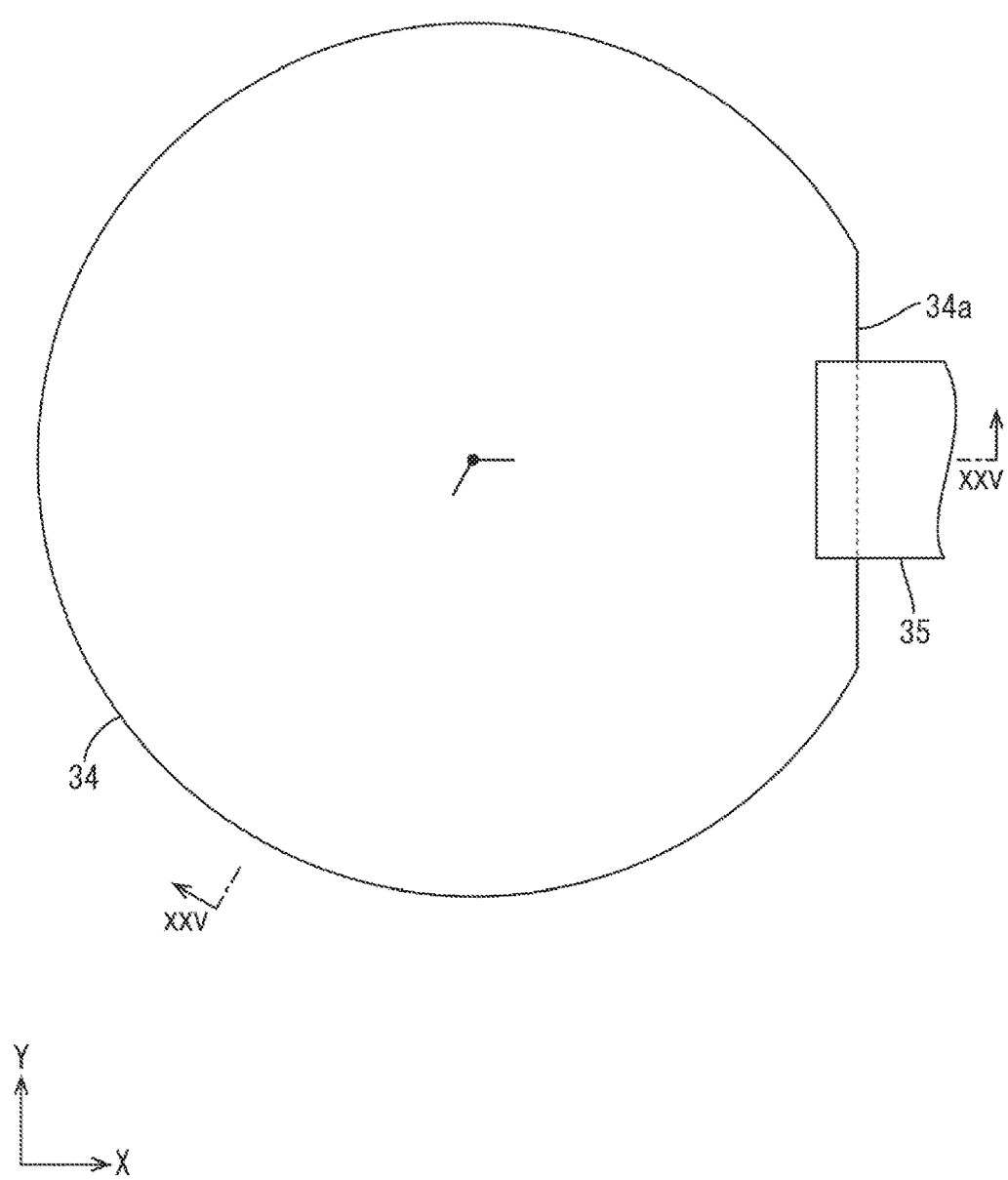
FIG. 23 is a plan view of a touch panel and a touch panel flexible printed circuit board according to eleventh embodiment of the present invention.
Figure 25:
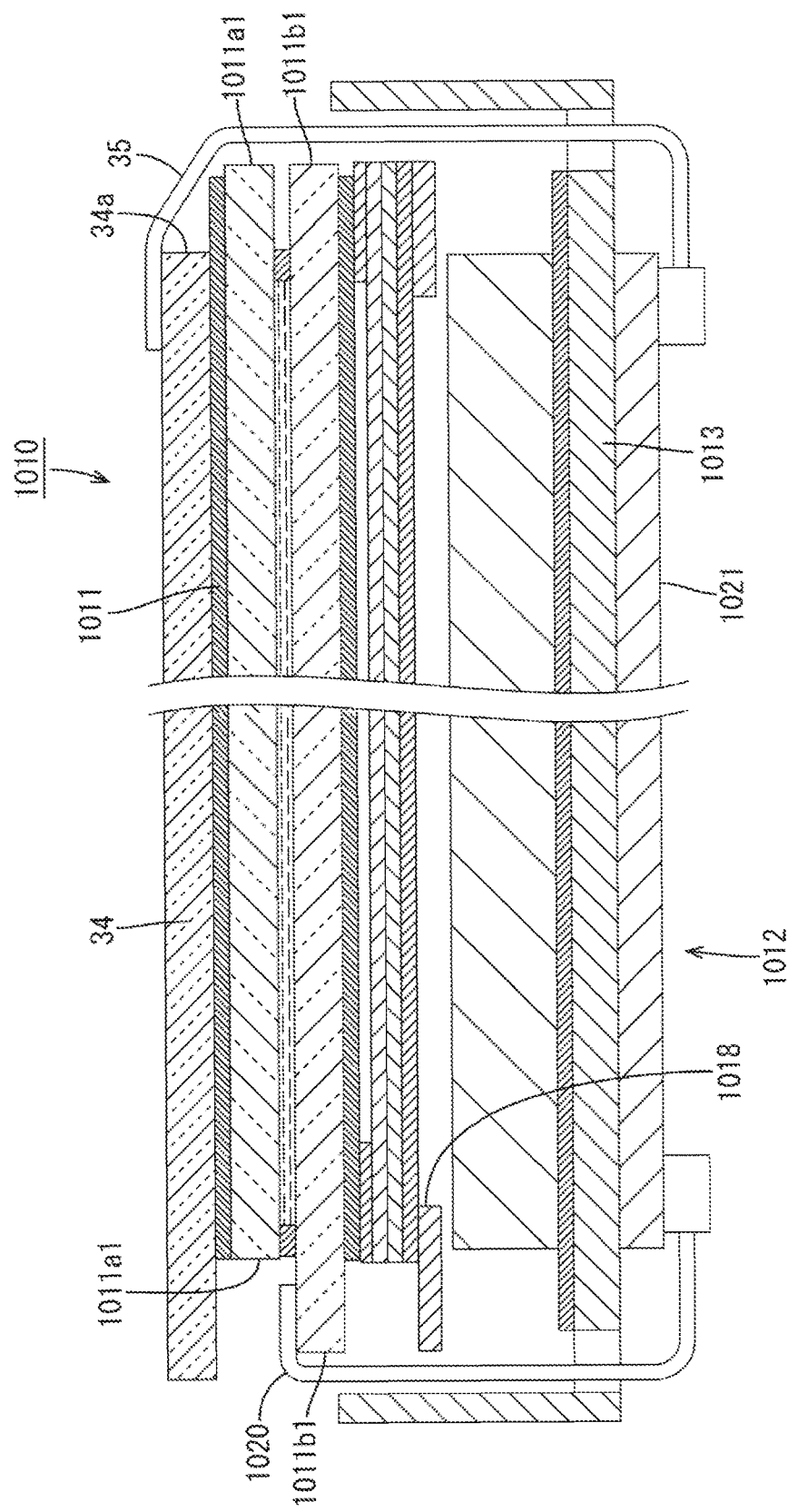
FIG. 25 is a cross-sectional view taken along line xxv-xxv in FIGS. 23 and 24.

As illustrated in FIGS. 23 and 25, a liquid crystal display device 1010 according to the present embodiment includes a touch panel (a position input device) 34 and a touch panel flexible printed circuit board (a functional component, a position input device mounting component) 35 that is connected to the touch panel 34. Position information can be input based on images displayed on a liquid crystal panel 1011 through the touch panel 34 by a user. The touch panel 34 is disposed on a front side of the liquid crystal panel 1011, that is, on an opposite side from the backlight device 1012 side. The touch panel 34 includes a substrate made of glass and having a substantially circular shape along an outline of the liquid crystal panel 1011, and a touch panel pattern disposed on a plate surface of the substrate and detecting an input position input by a user. The touch panel pattern is a projection type capacitance touch panel and is preferable for detecting multi-touch. The substrate of the touch panel 34 has an outer peripheral edge portion a part of which is cut off linearly to provide a linear cut-off edge portion 34*a*. One end portion of a touch panel flexible printed circuit board 35 is connected to (mounted on) the cut-off edge portion 34*a*. The touch panel flexible printed circuit board 35 transmits various signals for detecting positions. The cut-off edge portion 34*a* has terminals (not illustrated) that are to be connected to the terminals on the touch panel flexible printed circuit board 35. The touch panel flexible printed circuit board 35 includes a substrate made of synthetic resin (such as polyimide resin) and having an insulation property and flexibility and trace patterns (not illustrated) are formed on the substrate. The touch panel flexible printed circuit board 35 is folded in a substantially U-shape as a whole such that one end portion thereof is connected to the cut-off edge portion 34*a* of the touch panel 34 and another end portion thereof is connected to a control board (a touch panel control board) 1021 arranged on a rear side of the backlight device 1012. Various signals transmitted from the control board 1021 are transmitted to the touch panel 34 through the touch panel flexible board 35. Accordingly, control operations regarding detection of input positions input by a user are executed. In the present embodiment, the operations regarding the control of the liquid crystal panel 1011 and the touch panel 34 are executed via the control board 1021.

Figure 24:
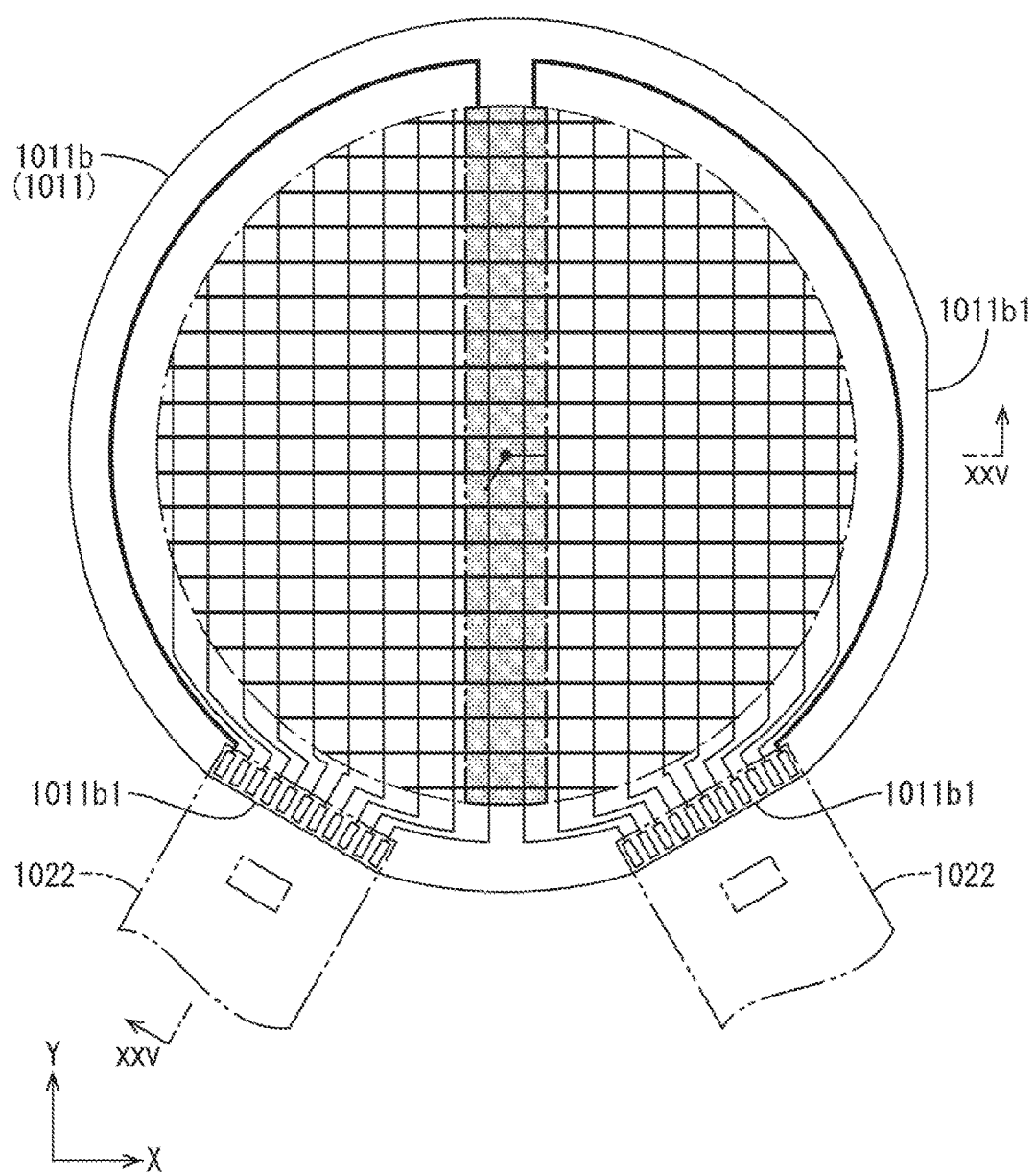
FIG. 24 is a plan view of an array substrate included in a liquid crystal panel.

As illustrated in FIGS. 23 and 24, the touch panel flexible printed circuit board 35 is arranged not to correspond to (overlap) a position of a flexible printed circuit board 1020 in the circumferential direction. The flexible printed circuit boards 1020 are connected to the liquid crystal panel 1011. The liquid crystal panel 1011 includes two linear edge portions 1011*a*1 and two linear edge portions 1011*b*1 at an outer peripheral edge portion thereof such that the linear edge portions 1011*a*1, 1011*b*1 are provided to substantially match positions of the two flexible printed circuit boards 1020 in the circumferential direction and further includes linear edge portions 1011a1, 1011b1 that are provided to substantially match a position of the touch panel flexible printed circuit board 35 in the circumferential direction. Namely, the linear edge portions 1011a1 or the linear edge portions 1011b1 that are greater in number (three) than the number of the flexible printed circuit boards 1020 are provided on the outer peripheral edge portion of the liquid crystal panel 1011. As illustrated in FIG. 25, one end portion of the touch panel flexible printed circuit board 35 is connected to the touch panel 34 and another end portion thereof is connected to the control board 1021 passing through a space within the backlight device 1012. The intermediate portion of the touch panel flexible printed circuit board 35 is disposed next to and radially outside the linear edge portions 1011a1, 1011b1 of the liquid crystal panel 1011 where the flexible printed circuit board 1020 is not arranged. According to such a configuration, the touch panel flexible printed circuit board 35 is less likely to be outside the outline of the substantially perfect circle of the liquid crystal panel 1011. Therefore, a casing (not illustrated) in which the liquid crystal panel 1011 is arranged has an outline of a perfect circle and the liquid crystal display device 1010 is less likely to be increased in size and has good design. The touch panel flexible printed circuit board 35 and each of the flexible printed circuit boards 1020 are dispersedly arranged in the circumferential direction so as not to overlap each other with plate surfaces thereof. Therefore, signals transmitted through each of the flexible printed circuit boards 35, 1020 are not affected by each other and distortion is less likely to be caused in the transmitted signals. An LED board 1018 and a chassis 1013 included in the backlight device 1012 have cut-off portions or opening portions through which the touch panel flexible printed circuit board 35 is passed. Further, the touch panel 34 has the cut-off edge portion 34a that is recessed inwardly in the radial direction from the linear edge portions 1011a1, 1011b1 of the liquid crystal panel 1011. Therefore, when the touch panel flexible printed circuit board 35 mounted on the cut-off edge portion 34a is folded back toward the rear side to be connected to the control board 1021, the folded portion of the touch panel flexible printed circuit board 35 has small curvature (small radius of curvature), and the folded portion is folded at a gentle folded angle. Accordingly, a reaction force that may act on the folded portion of the touch panel flexible printed circuit board 35 can be reduced and the touch panel flexible printed circuit board 35 has high connection reliability.

As described above, according to the present embodiment, the linear edge portions 1011a1, 1011b1 that are greater in number than the number of the flexible printed circuit boards 1020 are provided on the outer peripheral edge portion of the liquid crystal panel 1011. The touch panel flexible board (functional component) 35 is arranged outside and next to the linear edge portions 1011a1, 1011b, with a plan view, where the flexible printed circuit board 1020 is not arranged. According to such a configuration, the touch panel flexible printed circuit board 35 is less likely to project outside the outline of the liquid crystal panel 1011 having substantially a circular or ellipsoidal shape and the liquid crystal display device 1010 is less likely to be increased in size.

Twelfth Embodiment

A twelfth embodiment of the present invention will be described with reference to FIG. 26. In the twelfth embodiment, the number of linear edge portions 1111b1 is altered from that of the first embodiment and a camera 36 and an illuminance sensor 37 are included as functional components. Configurations, operations, and effects similar to those of the first embodiment will not be described.

Figure 26:
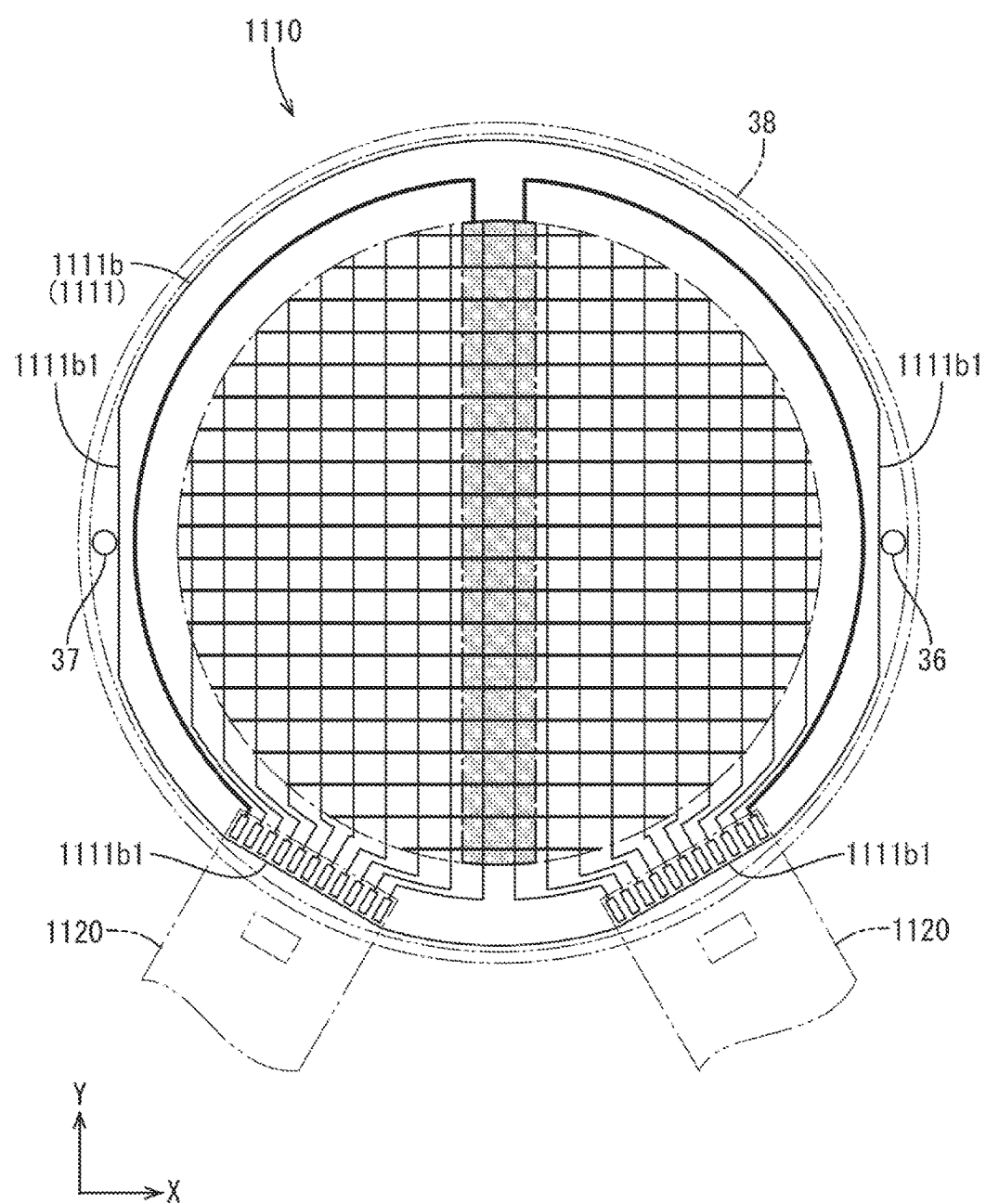
FIG. 26 is a plan view of an array substrate included in a liquid crystal panel according to a twelfth embodiment of the present invention.

As illustrated in FIG. 26, a liquid crystal display device 1110 of the present embodiment includes the camera (an imaging component) 36 and an illuminance sensor 37 are included as functional components. Images taken by the camera 36 appear on the liquid crystal panel 11 and brightness of images displayed on the liquid crystal panel 111 is adjusted based on brightness in the external environment detected by the illuminance sensor 37. The camera 36 and the illuminance sensor 37 are arranged so as not to match (overlap) a position of each of the flexible printed circuit boards 1120 in the circumferential direction. The liquid crystal panel 1111 includes at an outer peripheral edge portion thereof two linear edge portions 1111b1 that substantially match positions of the two flexible printed circuit boards 1120 in the circumferential direction and further includes linear edge portions 1111b1 that substantially match positions of the camera and the illuminance sensor 37 in the circumferential direction. Namely, the linear edge portions 1111b1 that are greater in number (three) than the number of the flexible printed circuit boards 1120 are provided on the outer peripheral edge portion of the liquid crystal panel 1111. The camera 36 and the illuminance sensor 37 are arranged radially outside and next to the linear edge portion 1111b1 of the liquid crystal panel 1111 where the flexible printed circuit board 1120 is not arranged. According to such a configuration, the camera 36 and the illuminance sensor 37 are less likely to project from the substantially perfect circular outline of the liquid crystal display panel 1111. Therefore, a casing 38 in which the liquid crystal panel 1111 is arranged has an outline of a perfect circle and the liquid crystal display device 1110 is less likely to be increased in size and has good design. The outline of the casing 38 is illustrated with two-dotted chain line in FIG. 26.

Thirteenth Embodiment

A thirteenth embodiment of the present invention will be described with reference to FIG. 27. In the thirteenth embodiment, a liquid crystal display device 1210 and a liquid crystal panel 1211 has an outer shape that differs from that of the first embodiment. Configurations, operations, and effects similar to those of the first embodiment will not be described.

Figure 27:
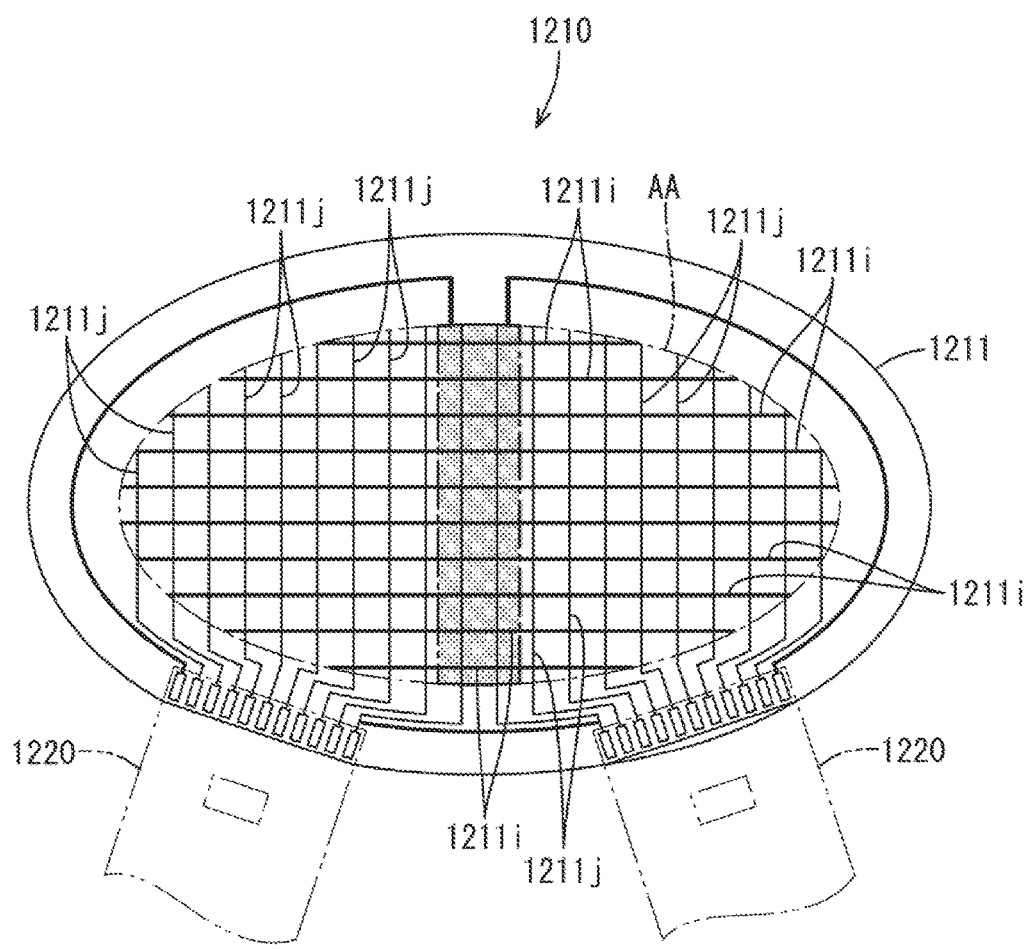
FIG. 27 is a plan view of an array substrate included in a liquid crystal panel according to a thirteenth embodiment of the present invention.

As illustrated in FIG. 27, a liquid crystal display device 1210 and a liquid crystal panel 1211 according to the present embodiment have a substantially laterally-long ellipsoidal plan view shape. With such a configuration, a lateral width of the display area AA that is an area where source lines 1211j are formed is greater than a vertical width of the display area AA that is an area where gate lines 1211i are formed. Therefore, flexible printed circuit boards 1220 are preferably arranged dispersedly in the lateral direction or a long-axis direction.

Fourteenth Embodiment

A fourteenth embodiment of the present invention will be described with reference to FIG. 28. In the fourteenth embodiment, the number of flexible printed circuit boards 1320 is altered from that of the first embodiment. Configurations, operations, and effects similar to those of the first embodiment will not be described.

Figure 28:
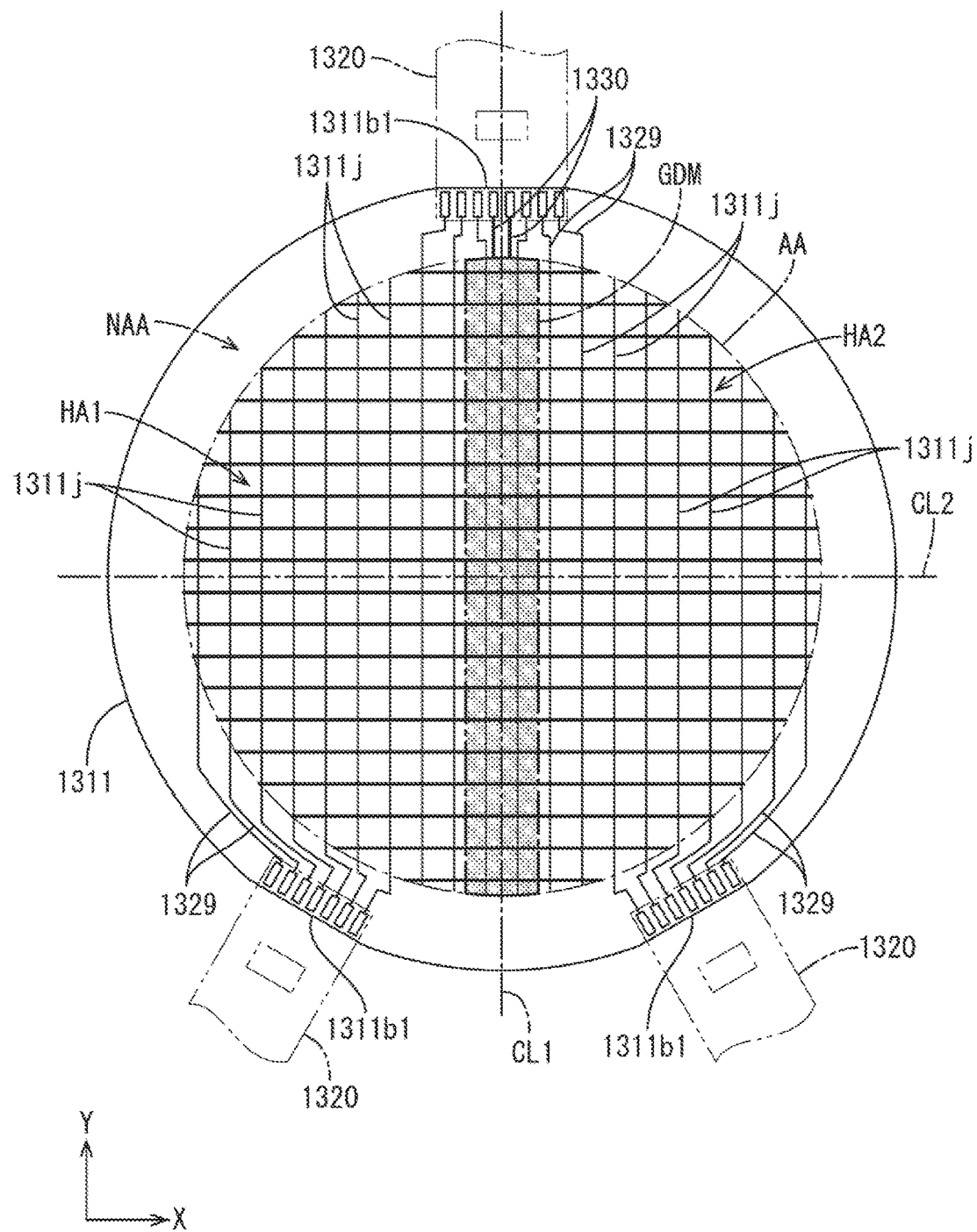
FIG. 28 is a plan view of an array substrate included in a liquid crystal panel according to a fourteenth embodiment of the present invention.

As illustrated in FIG. 28, three flexible printed circuit boards 1320 are included according to the present embodiment. Two of the three flexible printed circuit boards 1320 are arranged in the respective two half areas HA1, Ha2 divided by the first center line CL1 and the other one is arranged in an area ranging both of the two half areas HA1, HA2. The two flexible printed circuit boards 1320 arranged in the respective two half areas HA1, HA2 are arranged in one side area with respect to the second center line CL2 (in a lower area in FIG. 28). The flexible printed circuit board 1320 arranged in the area ranging both of the two half areas HA1, HA2 is arranged in another side area with respect to the second center line CL2 (in an upper area in FIG. 28) and is between the two flexible printed circuit boards 1320 with respect to the X-axis direction. More specifically, the flexible printed circuit board 1320 arranged in the area ranging both of the two half areas HA1, HA2 is positioned such that a center thereof with respect to a width direction is on the first center line CL1. The flexible printed circuit board 1320 arranged in the area ranging both of the two half areas HA1, HA2 is connected to source lines 1311$j$ that are in a middle portion of the display area AA with respect to the X-axis direction via source connection lines 1329. The two flexible printed circuit boards 1320 arranged in the respective two half areas HA1, HA2 are connected to the source lines 1311$j$ that are in both end portions of the display area AA with respect to the X-axis direction, respectively, via the source connection lines 1329. The flexible printed circuit board 1320 arranged in the area ranging both of the two half areas HA1, HA2 is connected to two gate connection lines 1330 that are connected to the gate circuit portion GDM. A liquid crystal panel 1311 includes three linear edge portions 1311$b$1 at an outer peripheral edge portion thereof so as to substantially match positions of the three flexible printed circuit boards 1320 in the circumferential direction, respectively. According to such a configuration, the frame width of the non-display area NAA is not increased even with enhancing the resolution.

Fifteenth Embodiment

A fifteenth embodiment of the present invention will be described with reference to FIG. 29. In the fifteenth embodiment, an outer shape of a liquid crystal panel 1411 is altered from that of the first embodiment. Configurations, operations, and effects similar to those of the first embodiment will not be described.

Figure 29:
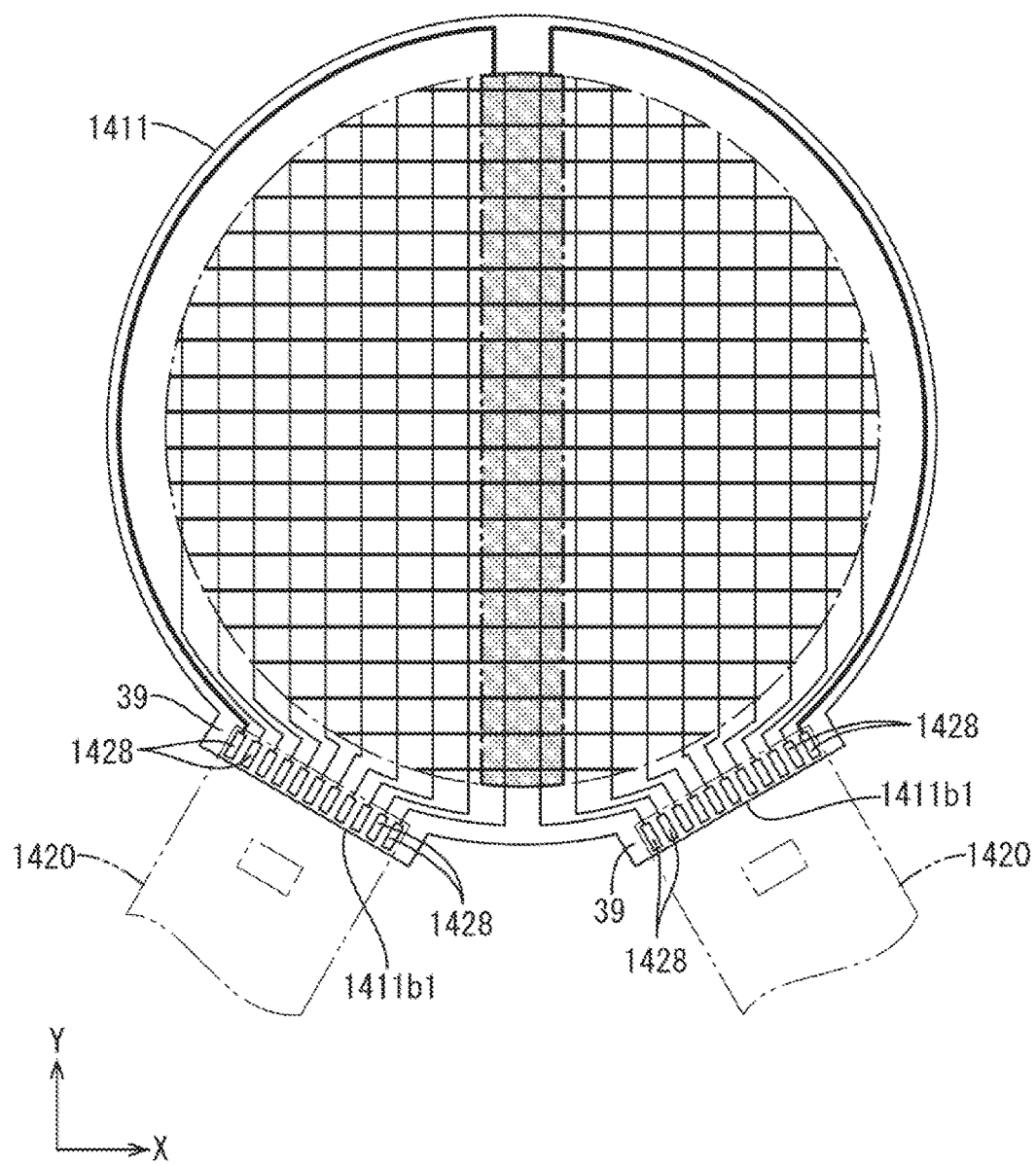
FIG. 29 is a plan view of an array substrate included in a liquid crystal panel according to a fifteenth embodiment of the present invention.

As illustrated in FIG. 29, the liquid crystal panel 1411 of the present embodiment has an outer peripheral edge portion that partially projects outward in a radial direction and includes projected portions 39. The projected portions 39 include panel-side terminals 1428 (mounting areas of flexible printed circuit boards 1420) and linear edge portions 1411$b$. With such a configuration, the width (size) of each flexible printed circuit board 1420 is reduced and the length of each linear edge portion 1411$b$ is reduced and therefore, the frame width is preferably reduced and the device is less likely to be increased in size.

Other Embodiments

The present invention is not limited to the embodiments described above with reference to the drawings and the following embodiments may be included in the technical filed of the present invention.

(1) In a modified embodiment of each of the above embodiments (except for the seventh, eighth, and fourteenth embodiments), one or both of the two flexible printed circuit boards may be arranged dispersedly in two half areas divided by the first center line and dispersedly in two areas divided by the second center line. Positions of the linear edge portions may be changed according to change of positions of the flexible printed circuit boards.

(2) In a modified embodiment of each of the above embodiments (except for the sixth and fourteenth embodiments), one of the flexible printed circuit boards may be arranged in an area ranging both of the half areas divided by the first center line. Positions of the linear edge portions may be changed according to change of positions of the flexible printed circuit boards.

(3) In a modified embodiment of each of the above embodiments (except for the fifth embodiment), one of the flexible printed circuit boards may be arranged in an area ranging both of the half areas divided by the second center line. Positions of the linear edge portions may be changed according to change of positions of the flexible printed circuit boards.

(4) In each of the above embodiments, the flexible printed circuit boards are arranged symmetrically with respect to the first center line. However, the flexible printed circuit boards may not be arranged symmetrically with respect to the first center line. Positions of the linear edge portions may be changed according to change of positions of the flexible printed circuit boards.

(5) In the above fifth to seventh embodiments, the flexible printed circuit boards are arranged symmetrically with respect to the second center line. However, the flexible printed circuit boards may not be arranged symmetrically with respect to the second center line. Positions of the linear edge portions may be changed according to change of positions of the flexible printed circuit boards.

(6) In each of the embodiments, the number of flexible printed circuit boards (the number of linear edge portions where the flexible printed boards are arranged) to be mounted is two to four. However, the number of flexible printed circuit boards to be mounted may be five or more. In such a case, the number of the flexible printed circuit boards to be mounted may be an even number or an odd number. The number of the linear edge portions where the flexible printed circuit boards are arranged may be changed according to change of the number of the flexible printed circuit boards to be mounted.

(7) In each of the above embodiments, the array substrate and the CF substrate of the liquid crystal panel include the linear edge portions, respectively. However, the linear edge portion may be included only in the array substrate but not in the CF substrate.

(8) In each of the ninth to twelfth embodiments, one or two linear edge portion(s) where the flexible printed circuit board is not arranged is/are included. However, three or more linear edge portions where the flexible printed circuit boards are not arranged may be included. The circumferential arrangement of the linear edge portions where the flexible printed circuit boards are not arranged may be altered if necessary.

(9) In each of the above embodiments, the LED board and the chassis, which are components of the backlight device, include the cut-off portion or the opening hole through which the flexible printed board is inserted. However, in a configuration that the outer edge portion of the LED board is not overlapped with the flexible printed circuit board, the cut-off portion may not be included in the outer edge portion of the LED board. In a configuration that the flexible printed circuit board is routed without being through the bottom portion of the chassis, the opening hole may not be provided in the bottom portion of the chassis. In a configuration that an outer edge portion of the reflection sheet, which is a component of the backlight device, is overlapped with the flexible printed circuit board, the outer edge portion of the reflection sheet may preferably have a cut-off portion through which the flexible printed circuit board is inserted.

(10) In each of the above embodiments, the specific arrangement and the specific routing paths of the source connection lines and the gate connection lines illustrated in the drawings may be altered if necessary.

(11) In each of the above embodiments, the source connection lines are made of a metal film same as that of the source lines and the gate connection lines are made of a metal film same as that of the gate lines. However, the source connection lines may be made of a metal film same as that of the gate lines and the gate connection lines may be made of a metal film same as that of the source lines. Each of the source connection line and the gate connection line may include a portion made of a metal film same as that of the gate lines and a portion made of a metal film same as that of the source lines.

(12) In each of the above embodiments, each of the flexible printed circuit boards is mounted such that a center of each flexible printed circuit board with respect to a width direction thereof substantially matches a center of each linear edge portion with respect to a extending direction thereof, and a position of the linear edge portion substantially matches a position of the flexible printed circuit board in the circumferential direction. However, each of the flexible printed circuit boards may be mounted such that a center of each flexible printed circuit board with respect to a width direction thereof does not match (is away from) a center of each linear edge portion with respect to a extending direction thereof, and a position of the linear edge portion substantially matches a position of the flexible printed circuit board in the circumferential direction.

(13) In the first embodiment, a center of each linear edge portion with respect to the extending direction thereof (the width direction of each flexible printed circuit board) matches a center of each half area with respect to a direction perpendicular to the source lines. The centers may not match exactly but may be displaced from each other as long as the centers thereof substantially match each other. In the first embodiment, the center of each flexible printed circuit board with respect to the width direction thereof matches a center of the source unit terminal group. However, the centers do not necessarily match each other. Specifically, in the configuration that the center of the flexible printed circuit with respect to the width direction thereof does not match the center of the source unit terminal group, the number of the source unit terminals included in the source unit terminal group may be "2n+1 (n is positive integer)", and the number of the source unit terminals arranged in one side area with respect to the center of the flexible printed circuit board with respect to the width direction thereof may be "n", and the number of the source unit terminals arranged in other side area with respect to the center of the flexible printed circuit board may be "n+1". In short, the number of the source unit terminals arranged in the one side area of the flexible printed circuit board with respect to the center thereof in the width direction may be different from the number of the source unit terminals arranged in the other side area of the flexible printed circuit board with respect to the center.

(14) The configuration of the second embodiment that the gate circuit portion is arranged in the non-display area may be included in the configuration of each of the third to fifteenth embodiments.

(15) The configuration of the third embodiment that the driver is directly mounted on the array substrate may be included in the configuration of each of the fourth to fifteenth embodiments.

(16) The arrangement of the flexible printed circuit boards described in the fourth embodiment may be included in the configuration of each of the seventh to fifteenth embodiments.

(17) The arrangement of the flexible printed circuit boards described in the fifth embodiment may be included in the configuration of each of the seventh to fifteenth embodiments.

(18) The arrangement of the flexible printed circuit boards described in the sixth embodiment may be included in the configuration of each of the seventh to fifteenth embodiments.

(19) The arrangement of the flexible printed circuit boards described in the seventh embodiment may be included in the configuration of each of the ninth to fifteenth embodiments.

(20) The arrangement of the flexible printed circuit boards described in the eighth embodiment may be included in the configuration of each of the ninth to fifteenth embodiments.

(21) The linear edge portion that is provided to substantially match a position of the inlet hole cover in the circumferential direction may be included in the configuration of each of the tenth to fifteenth embodiments. Especially, in combination with the configuration of the tenth embodiment, the linear edge portion may be used for positioning the liquid crystal panel with respect to the two directions that are perpendicular to each other. Depending on a thickness of the inlet hole cover, in combination with the configuration of the eleventh embodiment, the linear edge portion and the touch panel flexible printed circuit board may be arranged to substantially match each other in the circumferential direction. Depending on the thickness of the inlet hole cover, in combination with the configuration of the twelfth embodiment, the linear edge portion and the functional components such as the camera or the illuminance sensor may be arranged to substantially match each other in the circumferential direction.

(22) The linear edge portion where the flexible printed circuit board is not arranged and that is used for positioning according to the tenth embodiment may be included in the configuration of each of the eleventh to fifteenth embodiments. Especially, in combination with the configuration of the eleventh embodiment, the liquid crystal panel can be positioned with respect to the two directions that are perpendicular to each other with using the linear edge portion that is provided to substantially match a position of the touch panel flexible printed circuit board in the circumferential direction. In combination with the configuration of the twelfth embodiment, the liquid crystal panel can be positioned with respect to the two directions that are perpendicular to each other with using the linear edge portion that is provided to substantially match a position of the functional component such as a camera and an illuminance sensor in the circumferential direction.

(23) The linear edge portion that is provided to substantially match a position of the touch panel flexible printed circuit board of the eleventh embodiment in the circumferential direction may be included in the configuration of each of the twelfth to fifteenth embodiments. Especially, in combination with the configuration of the twelfth embodiment, the linear edge portion and the functional components such as the camera and the illuminance sensor are arranged to substantially match each other.

(24) In a modified embodiment of the eleventh embodiment, the touch panel flexible printed circuit board may be divided into a plurality of parts. The number and the arrangement of the linear edge portions of the liquid crystal panel may be altered according to the number of divided parts of the touch panel flexible printed circuit board.

(25) The linear edge portion that is provided to substantially match a position of a functional component such as the camera or the illuminance sensor in the circumferential direction described in the twelfth embodiment may be included in the configuration of each of the thirteenth to fifteenth embodiments.

(26) In the twelfth embodiment, the liquid crystal display device includes the camera and the illuminance sensor as the functional component. However, functional components other than the camera and the illuminance sensor (such as a switch or a connector) may be included in the liquid crystal display device.

(27) The liquid crystal panel having a substantially ellipsoidal shape described in the thirteenth embodiment may be included in the configuration of each of the fourteenth and fifteenth embodiments.

(28) In the thirteenth embodiment, the liquid crystal display device and the liquid crystal panel have a laterally-long ellipsoidal plan view shape. However, the liquid crystal display device and the liquid crystal panel may have a vertically-long ellipsoidal plan view shape.

(29) The arrangement of the flexible printed circuit boards described in the fourteenth embodiment may be included in the configuration of the fifteenth embodiment.

(30) In each of the above embodiments, the outer shape and the display area of the liquid crystal panel are substantially a circular shape or an ellipsoidal shape. The liquid crystal panel may have a substantially circular or ellipsoidal outer shape and have a display area of a polygonal shape such as a square. The outer shape of the liquid crystal panel may have a substantially circular shape (substantially ellipsoidal shape) and the display area may have a substantially ellipsoidal shape (substantially circular shape).

(31) In each of the above embodiments (except for the second embodiment), the gate circuit portion is arranged in a middle portion of the display area with respect to the X-axis direction. However, gate circuit portions may be arranged dispersedly with respect to the X-axis direction in both side areas divided by the first center line. The gate circuit portions may include one that is arranged to be overlapped with the first center line and one that is arranged not to be overlapped with the first center line. Specific number of the gate circuit portions and arrangement of the gate circuit portions in the display area may be altered.

(32) In each of the above embodiments, the gate circuit portion is arranged in the display area or the gate circuit portion is arranged in the non-display area. However, the gate circuit portion may be arranged in an area ranging both of the display area and the non-display area.

(33) Other than each of the above embodiments, the specific values such as a thickness of the light guide plate or a height of the LED included in the backlight device may be altered.

(34) In each of the above embodiments, the oxide semiconductor material is used as a material for the semiconductor film included in the channel portion of the TFT. Examples of such oxide semiconductor material may be In—Ga—Zn—O semiconductors (Indium Gallium Zinc Oxide) containing indium (In), gallium (Ga), zinc (Zn), and oxide (O) as main components. The In—Ga—Zn—O semiconductors are ternary oxide of indium (In), gallium (Ga), and zinc (Zn), and the ratio (composition ratio) of In, Ga, and Zn is not particularly limited but may be In:Ga:Zn=2:2:1, In:Ga:Zn=1:1:1, or In:Ga:Zn=1:1:2. The In—Ga—Zn—O semiconductors contains In, Ga, and Zn at a ratio of 1:1:1 are preferably used. The oxide semiconductors (In—Ga—Zn—O semiconductors) may be amorphous but may preferably be crystalline having crystalline qualities. The oxide semiconductors having the crystalline qualities may preferably be crystalline In—Ga—Zn—O semiconductors where c-axis is oriented substantially vertical to a layer surface. A crystal structure of the crystalline In—Ga—Zn—O semiconductors is described in Japanese Patent Unexamined Publication Application No. 2012-134475. For reference, the entire content of JPA 2012-134475 is hereby incorporated by reference.

(35) In each of the above embodiments, the semiconductor film of each TFT includes oxide semiconductor material. The semiconductor film may include amorphous silicon or polycrystalline silicon. For example, continuous grain silicon (CG silicon)) may be preferably used as the polycrystalline silicon.

(36) In each of the above embodiments, the LED board is fixed on the optical sheet (the diffuser sheet). However, the LED board may not be fixed on the optical sheet.

(37) In each of the above embodiments, the LED board is disposed on the front side of the light guide plate. The LED board may be disposed on the back side with respect to the light guide plate and the reflection sheet. In such a configuration, the LEDs are mounted on a front-side surface of the LED board.

(38) In each of the above embodiments, the LEDs are side-surface light emitting type LEDs. However, top-surface light emitting type LEDs may be used. All the intervals between the LEDs that are arranged in the circumferential direction on the LED board may not be equal. The LEDs may be arranged at various intervals. The number of the LEDs mounted on the LED board or intervals between the adjacent LEDs that are adjacent to each other in the circumferential direction on the LED board may be altered.

(39) In each of the above embodiments, the LED board is made of a film substrate but may be made of a plate substrate having a certain thickness.

(40) In each of the above embodiments, the LEDs are used as the light source. However, organic ELs may be used as the light source.

(41) In each of the above embodiments, the color filter included in the liquid crystal panel includes color portions of three colors including red, green, and blue. However, a color filter may include color portions of four colors or more.

(42) Other than each of the above embodiments, liquid crystal display devices including a parallax barrier panel or a cover glass may be included in the scope of the present invention.

(43) In each of the above embodiments, the liquid crystal display device of a transmission type is described and liquid crystal display devices of a semi-transmission type may be included in the scope of the present invention.

(44) In each of the above embodiments, the TFTs are used as the switching components of the liquid crystal panel. However, the technology described herein can be applied to liquid crystal display devices using switching components other than TFTs (e.g., thin film diodes (TFDs)). Further-more, it can be applied to black-and-white liquid crystal display devices other than the color liquid crystal display device.

(45) In each of the above embodiments, the pixel electrodes are arranged on the array substrate side with respect to the liquid crystal panel and the counter electrodes are arranged on the CF substrate side. However, the pixel electrodes and the counter electrodes may be arranged on the array substrate side in the liquid crystal panel such as a liquid crystal panel of the in-plane switching (IPS) mode or a fringe filed switching (FFS) mode.

(46) In each of the above embodiments, the liquid crystal display device includes the liquid crystal panel as the display panel. However, a display panel of micro electro mechanical systems (MEMS) that displays images with using light from a backlight device may be used. In the MEMES display panel, micro mechanical shutters as display pixels are planarly arranged in a matrix and each of the mechanical shutters is controlled to be open or closed to adjust the amount of transmission light from the backlight device for every display pixel. Thus, an image of a certain gradation is displayed.

EXPLANATION OF SYMBOLS 10, 1010, 1110, 1210: liquid crystal display device (display device), 11, 111, 211, 311 411, 511, 611, 711, 811, 911, 1011, 1111, 1211, 1311, 1411: liquid crystal panel (display panel), 11a: CF substrate (first substrate), 11a1, 1011a1: linear edge portion, 11b, 111b, 211b, 311b, 411b, 511b, 611b, 811b, 911b, 1911b, 1111b: array substrate (second substrate), 11b1, 311b1, 411b1, 611b1, 811b1, 911b1, 1011b1, 1111b1, 1311b1, 1411b1: linear edge portion, 11e, 811e: liquid crystal layer, 11f, 811f: sealing member, 11g: TFT (display element), 11i, 111i, 1211i: gate lines (scanning lines), 11j, 211j, 311j, 411j, 511j, 611j, 711j, 1211j: source lines (data lines), 11j1, 411j1, 511j1, 611j1, 711j1, 1311j1: one end portion, 11j2, 411j2, 511j2, 611j2: other end portion, 12, 1012: backlight device (lighting device), 14: light guide plate, 17: LED (light source), 20, 220, 320, 420, 520, 620, 720, 820, 920, 1020, 1120, 1220, 1320, 1420: flexible printed circuit board (mounting component), 20A, 320A, 420A, 520A, 620A, 720A, 910A: first flexible printed circuit board (first mounting component), 20B, 320B, 420B, 520B, 620B, 720B, 910B: second flexible printed circuit board (second mounting component), 29, 129, 229, 429, 529, 629, 729, 1329: source connection lines (data connection lines), 30, 130, 430, 530, 630, 1330: gate connection lines (scanning connection lines), 32, 232: driver (data circuit portion), 33: inlet hole cover, 35: touch panel flexible printed circuit board (functional component), 36: camera (functional component), 37: illumination sensor (functional component), 711f1: inlet hole, AA: display area, C: center, CL1: first center line (center line), CL2: second center line (center line, second center line), GDM: gate circuit portion (scanning circuit portion), HA1: first half area, HA2: second half area, NAA: non-display area (outer portion)

The invention claimed is:

1. A display device comprising:
a display panel having an outer peripheral edge portion having a substantially circular or ellipsoidal shape and including linear edge portions at the outer peripheral edge portion, each of the linear edge portions being linear at a part of the outer peripheral edge portion; and
mounting components mounted on an outer portion of the display panel to match arrangement of the linear edge portions in a circumferential direction, wherein
the display panel is divided into a display area displaying images and a non-display area that is in the outer portion and surrounds the display area,
display elements that are arranged in a matrix and a scanning circuit portion that scans the display elements sequentially and selectively drives the display elements are at least arranged in the display area,
data lines connected to the display elements are arranged in the display area of the display panel,
data connection lines connecting the mounting components and one end portions of the data lines and scanning connection lines connecting the mounting components and the scanning circuit portion are at least arranged in the non-display area of the display panel, and
the mounting components are arranged closer to the one end portions of the data lines than another end portions of the data lines, and the scanning connection lines connect the other end portions of the data lines and the scanning circuit portion.

2. The display device according to claim 1, wherein
the display panel is divided into a first half area and a second half area by a center line that is parallel to the data lines, and
the mounting components include at least a first mounting component that is arranged in the first half area and is connected to the data lines arranged in the first half area and a second mounting component that is arranged in the second half area and is connected to the data lines arranged in the second half area.

3. The display device according to claim 2, wherein
the first mounting component is arranged such that a center of the first mounting component with respect to an extending direction of the linear edge portions substantially corresponds to a center of the first half area with respect to a direction perpendicular to the data lines in the first half area, and
the second mounting component is arranged such that a center of the second mounting component with respect to an extending direction of the linear edge portions substantially corresponds to a center of the second half area with respect to a direction perpendicular to the data lines in the second half area.

4. The display device according to claim 2, wherein
one of the linear edge portions is included to correspond to the first mounting component in the circumferential direction and another one of the linear edge portions is included to correspond to the second mounting component in the circumferential direction, and
the linear edge portions are arranged such that a central angle formed between lines connecting a center of each of the linear edge portions with respect to an extending direction thereof and a center of the display panel is approximately 90 degrees.

5. The display device according to claim 2, wherein
the first mounting component and the second mounting component are arranged such that a central angle formed between lines connecting a center of each of the linear edge portions with respect to an extending direction thereof and a center of the display panel is approximately 180 degrees, and
the data connection lines include the data connection lines that are connected to one end portions of the data lines and the data connection lines that are connected to another end portions of the data lines that are arranged adjacent to the data lines whose one end portions are connected to the data connection lines.

6. The display device according to claim 2, wherein
the first mounting component includes at least two first mounting components that are mounted in the non-display area of the display panel and the second mounting component includes at least two second mounting components that are mounted in the non-display area, and
the first mounting components and the second mounting components are arranged dispersedly on both sides with respect to a second center line that is perpendicular to the center line and are connected to the one end portions and the other end portions of the data lines.

7. The display device according to claim 2, wherein
the first mounting component includes at least two first mounting components that are mounted in the non-display area of the display panel and the second mounting component includes at least two second mounting components that are mounted in the non-display area,
the first mounting components and the second mounting components are arranged collectively on one side with respect to a second center line that is perpendicular to the center line and are connected to the one end portions of the data lines.

8. The display device according to claim 1, wherein
the mounting components are arranged dispersedly on one side and another side of the display panel with respect to a center line that is perpendicular to the data lines, and
the data lines whose one end portions are connected to the mounting component arranged on the one side with respect to the center line and the data lines whose other end portions are connected to the mounting component on the other side with respect to the center line are alternately arranged.

9. The display device according to claim 1, wherein
a number of the linear edge portions included at the outer peripheral edge portion of the display panel is greater than a number of the mounting components that are mounted on the display panel, and
the linear edge portions include one linear edge portion where the mounting component is not arranged, and the one linear edge portion where the mounting component is not arranged is provided such that a central angle formed between a line connecting a center of the one linear edge portion where the mounting component is not arranged and a center of the display panel and a line connecting a center of the linear edge portion where the mounting component is arranged and the center of the display panel is approximately 90 degrees.

10. The display device according to claim 1, wherein the display panel includes:
a first substrate;
a second substrate bonded to the first substrate;
a liquid crystal layer sandwiched between the first substrate and the second substrate;
a sealing member extending along the circumferential direction to seal a periphery of the liquid crystal layer and having an inlet hole through which liquid crystal material of the liquid crystal layer is injected; and
an inlet hole cover covering the inlet hole, wherein
a number of the linear edge portions included at the outer peripheral edge portion of the display panel is greater than a number of the mounting components that are mounted on the display panel, and
the linear edge portions include one linear edge portion where the mounting component is not arranged and the one linear edge portion where the mounting component is not arranged is disposed such that a position thereof in the circumferential direction matches the inlet hole.

11. The display device according to claim 1, wherein
a number of the linear edge portions included at the outer peripheral edge portion of the display panel is greater than a number of the mounting components that are mounted on the display panel, and
the linear edge portions include one linear edge portion where the mounting component is not arranged and a functional component is arranged adjacent to and outside the one linear edge portion, with a plan view, where the mounting component is not arranged.

12. The display device according to claim 1, further comprising:
a lighting device providing the display panel with light, the lighting device including at least light sources arranged at intervals along the circumferential direction, and a light guide plate guiding light from the light sources, wherein
the light sources are arranged such that a central angle formed between lines connecting each of the light sources that are adjacent to each other in the circumferential direction and a center of the display panel is equal to or greater than a central angle formed between lines connecting each of two side edges of the mounting component with respect to an extending direction of the linear edge portion and the center of the display panel.

* * * * *